US012608668B1

(12) United States Patent
Hecht et al.

(10) Patent No.: US 12,608,668 B1
(45) Date of Patent: Apr. 21, 2026

(54) AUTOMATICALLY DETERMINING WORKSTREAMS FROM COMMON ACTIONS IN ONLINE APPLICATIONS

(71) Applicant: 8flow Inc., San Mateo, CA (US)

(72) Inventors: Boaz Hecht, Palo Alto, CA (US); Josh Russ, Los Angeles, CA (US); Yev Goldin, Los Angeles, CA (US)

(73) Assignee: 8flow Inc., San Mateo, CA (US)

( * ) Notice: Subject to any disclaimer, the term of this patent is extended or adjusted under 35 U.S.C. 154(b) by 0 days.

(21) Appl. No.: 19/076,692

(22) Filed: Mar. 11, 2025

Related U.S. Application Data

(60) Provisional application No. 63/710,963, filed on Oct. 23, 2024.

(51) Int. Cl.
| | |
|---|---|
| *G06Q 30/00* | (2023.01) |
| *G06F 9/54* | (2006.01) |
| *G06Q 10/0631* | (2023.01) |

(52) U.S. Cl.
CPC ....... *G06Q 10/06316* (2013.01); *G06F 9/548* (2013.01)

(58) Field of Classification Search
CPC .......................... G06Q 30/06–08; G06F 9/548
See application file for complete search history.

(56) References Cited

U.S. PATENT DOCUMENTS

| | | |
|---|---|---|
| 11,916,767 B1 | 2/2024 | Wu et al. |
| 2015/0007065 A1 | 1/2015 | Krishnamoorthy et al. |

| | | | |
|---|---|---|---|
| 2020/0097506 A1 | 3/2020 | Kephart et al. | |
| 2020/0380432 A1 | 12/2020 | Wang et al. | |
| 2021/0256076 A1* | 8/2021 | McMurray | G06F 16/958 |
| 2022/0300307 A1 | 9/2022 | Narayanan et al. | |
| 2022/0405658 A1 | 12/2022 | Mitra et al. | |
| 2023/0385085 A1 | 11/2023 | Singh | |
| 2024/0152840 A1 | 5/2024 | Lekas et al. | |
| 2024/0386216 A1* | 11/2024 | Sodhi | G06F 40/40 |

(Continued)

OTHER PUBLICATIONS

Zheng, Kai, et at., "Towards a Unified Paradigm: Integrating Recommendation Systems as a New Language in Large Models", arXiv:2412.16933v1 [cs.IR], Dec. 22, 2024 (Year: 2024).*

(Continued)

*Primary Examiner* — Ethan D Civan
(74) *Attorney, Agent, or Firm* — Baker Botts L.L.P.

(57) ABSTRACT

An embodiment uses a computer-implemented approach to identify and automate workstreams from common actions in online applications. A browser extension collects and processes user event metadata, which is used to train machine learning models for workflow automation. The extension reads relevant fields from web services and delivers prompts with high-level actions (HLAs) based on user or organizational details. These HLAs are appended to prompts and sent to a large language model (LLM) via an API call. The LLM responds with a solution and a sequence of actions, which the browser extension executes automatically. Users retain control to pause, accelerate, or modify these actions. This method ensures secure, end-to-end workflow automation across various computing devices, enabling efficient and autonomous resolution of tasks while maintaining user oversight. The browser extension processes metadata, not enterprise data, ensuring security and privacy.

24 Claims, 38 Drawing Sheets

(56) References Cited

U.S. PATENT DOCUMENTS

| | | | |
|---|---|---|---|
| 2025/0053430 A1* | 2/2025 | Jones | G06F 9/453 |
| 2025/0111149 A1* | 4/2025 | Namasivayam | G06F 11/3438 |
| 2025/0156681 A1* | 5/2025 | Palpant | G06N 20/00 |
| 2025/0258849 A1* | 8/2025 | Guy | G06F 16/3329 |

OTHER PUBLICATIONS

Yang, Jeong Rok, Notification Of Transmittal, PCT International Search Report, and Written Opinion of the International Searching Authority, Jan. 19, 2026, 9 Pages, PCT Form 220, PCT Form 210, and PCT Form 237, Korean Ministry of Intellectual Property, Daejeon, Republic of Korea.

* cited by examiner

FIG. 4

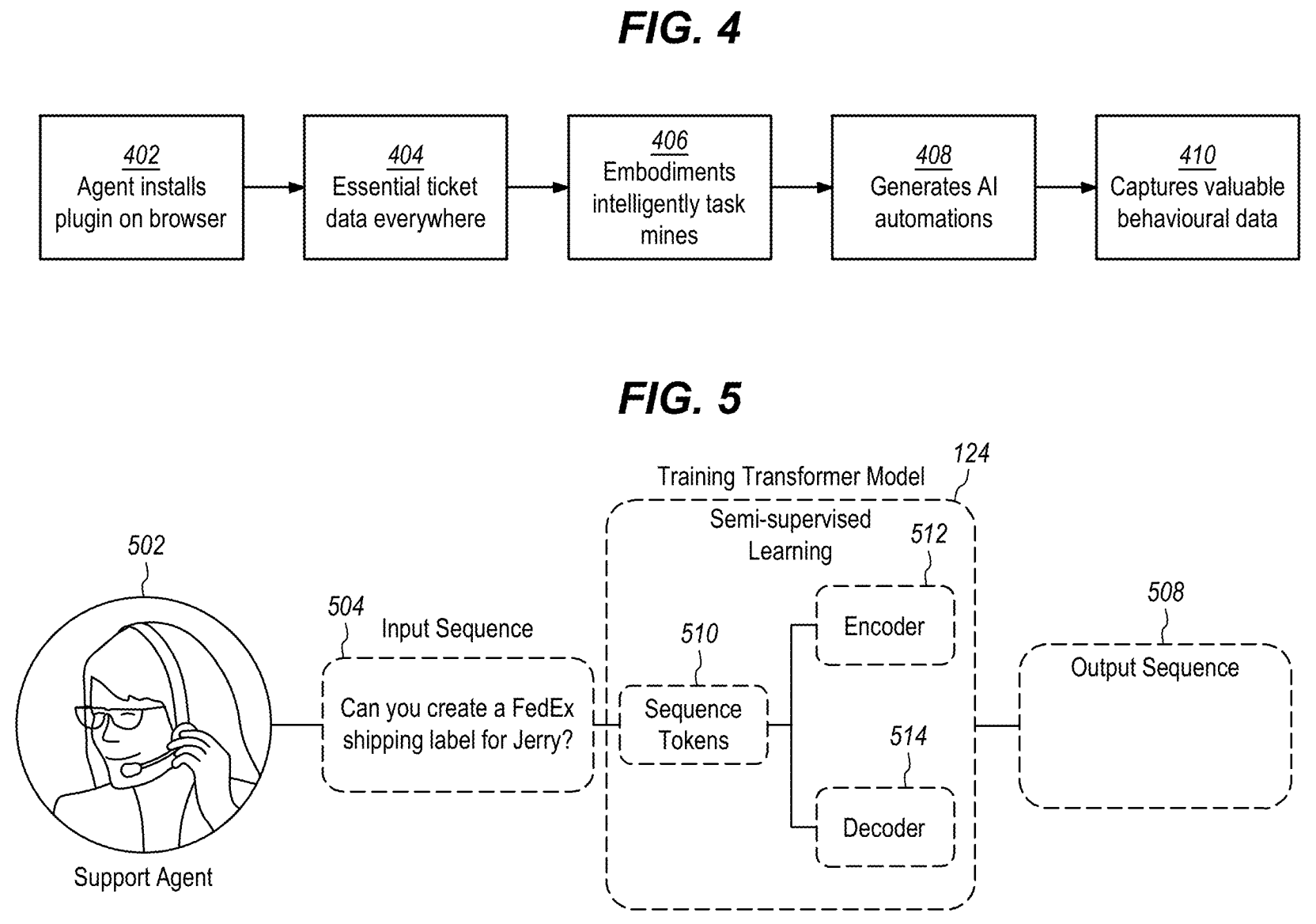

402
Agent installs plugin on browser

→

404
Essential ticket data everywhere

→

406
Embodiments intelligently task mines

→

408
Generates AI automations

→

410
Captures valuable behavioural data

FIG. 5

502
Support Agent

504 Input Sequence
Can you create a FedEx shipping label for Jerry?

124
Training Transformer Model
Semi-supervised Learning

510
Sequence Tokens

512
Encoder

514
Decoder

508
Output Sequence

*FIG. 6*

602
Agent is assigned ticket: RETURN ORDER

→

604
Agent selects data: order number, and customer name, email

→

606
Opens order system to transfer order number and selects data: customer name, return address, and customer address

→

608
Opens shipping system, transfers customer name, return address, and customer address. Select data: shipping confirmation code

→

610
Opens Order system to transfer the shipping confirmation code to confirm the return

→

612
Opens Zendesk to Attach shipping label to ticket which generates email to customer

→

614
Ticket Closed

---

620
Agent is assigned Tticket: NEED HELP INSTALLING

→

622
Agent selects data: part of description from the ticket

→

624
Opens knowledge base and transfers part of short description. Finds article and selects data: installation passage and article URL

→

626
Opens Zendesk and transfers installation passage and article URL in the ticket

→

628
Ticket Closed

---

630
Agent is assigned Task: CHANGE ADDRESS FOR RECENT ORDER

→

632
Agent selects data: order number and new address from the ticket

→

634
Opens order management system and transfers order number. Selects data: shipping confirmation code from order

→

636
Opens shipping URL and transfers shipping confirmation code. Finds shipment and edits details, transfers new address. Then selects data: new arrival window

→

638
Opens Zendesk. Transfers shipping confirmation code and new arrival window to update the ticket

→

639
Ticket Closed

---

640
Agent is assigned Task: UNCLEAR WARNING MESSAGE

→

642
Agent unsure of how to resolve. Selects data: description

→

644
Transfer description into ticket search. Finds 2 similar cases with a KB link attached. Clicks on link to KB system

→

646
Opens knowledge base reads article. Selects data: relevant passage and article URL.

→

648
Opens Zendesk, transfers relevant passage and article URL in the ticket

→

650
Ticket Closed

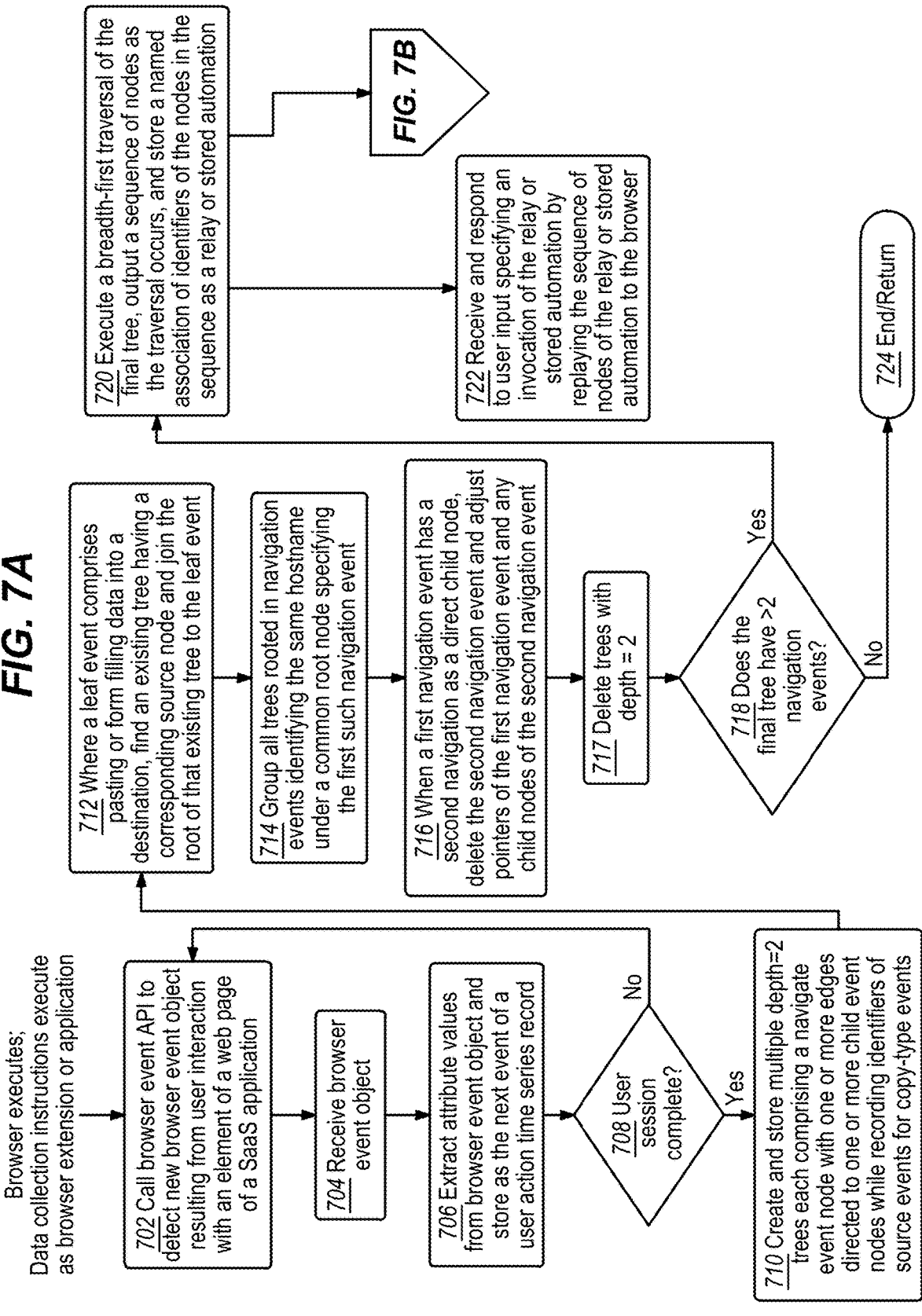

Browser executes;
Data collection instructions execute as browser extension or application

702 Call browser event API to detect new browser event object resulting from user interaction with an element of a web page of a SaaS application

704 Receive browser event object

706 Extract attribute values from browser event object and store as the next event of a user action time series record

708 User session complete?

No

Yes

710 Create and store multiple depth=2 trees each comprising a navigate event node with one or more edges directed to one or more child event nodes while recording identifiers of source events for copy-type events

712 Where a leaf event comprises pasting or form filling data into a destination, find an existing tree having a corresponding source node and join the root of that existing tree to the leaf event

714 Group all trees rooted in navigation events identifying the same hostname under a common root node specifying the first such navigation event

716 When a first navigation event has a second navigation as a direct child node, delete the second navigation event and adjust pointers of the first navigation event and any child nodes of the second navigation event

717 Delete trees with depth = 2

718 Does the final tree have >2 navigation events?

Yes

No

720 Execute a breadth-first traversal of the final tree, output a sequence of nodes as the traversal occurs, and store a named association of identifiers of the nodes in the sequence as a relay or stored automation

722 Receive and respond to user input specifying an invocation of the relay or stored automation by replaying the sequence of nodes of the relay or stored automation to the browser

724 End/Return

*FIG. 7B*

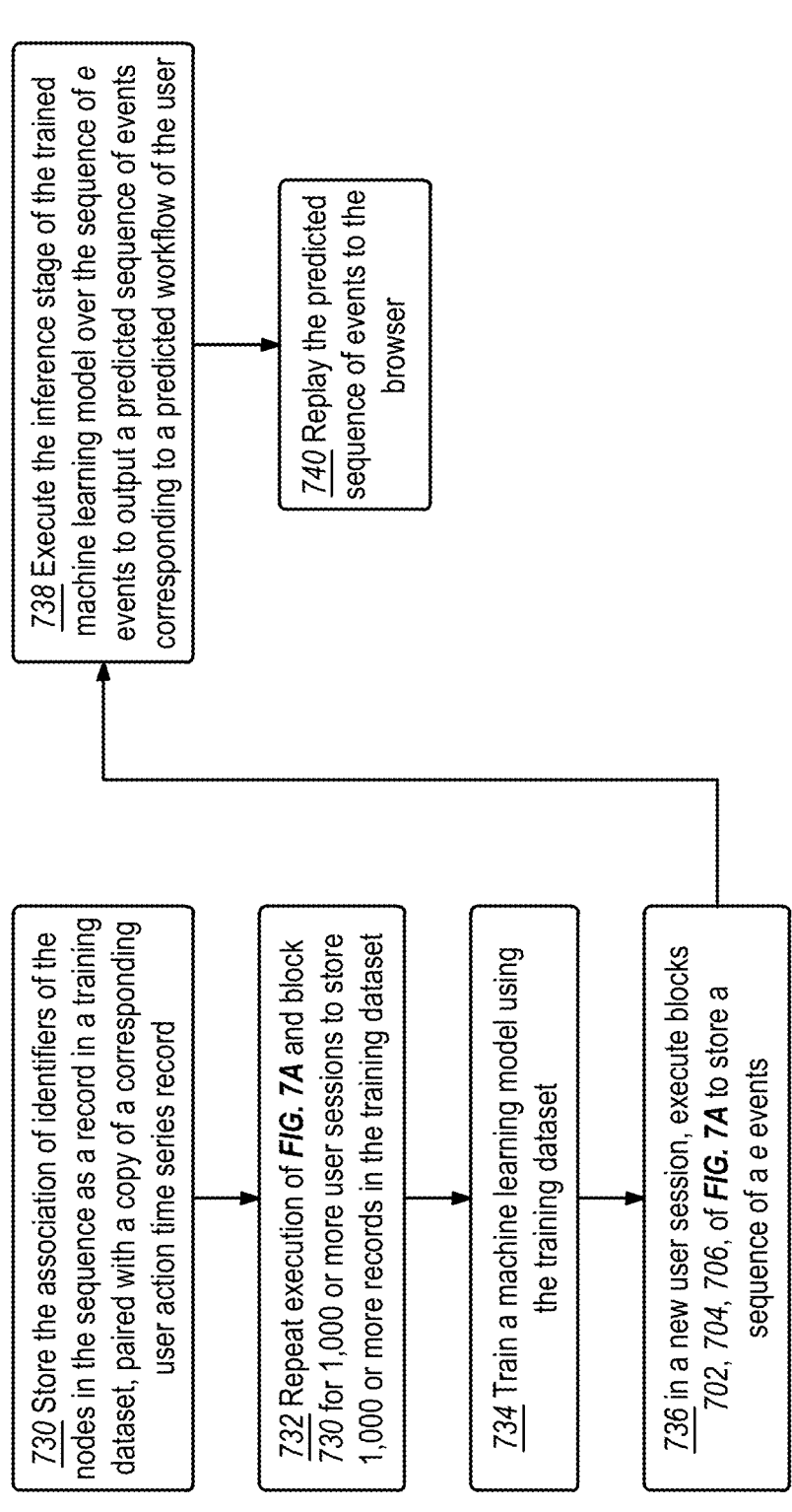

730 Store the association of identifiers of the nodes in the sequence as a record in a training dataset, paired with a copy of a corresponding user action time series record 732 Repeat execution of *FIG. 7A* and block 730 for 1,000 or more user sessions to store 1,000 or more records in the training dataset 734 Train a machine learning model using the training dataset 736 in a new user session, execute blocks 702, 704, 706, of *FIG. 7A* to store a sequence of a e events 738 Execute the inference stage of the trained machine learning model over the sequence of e events to output a predicted sequence of events corresponding to a predicted workflow of the user 740 Replay the predicted sequence of events to the browser

Figure 8B:
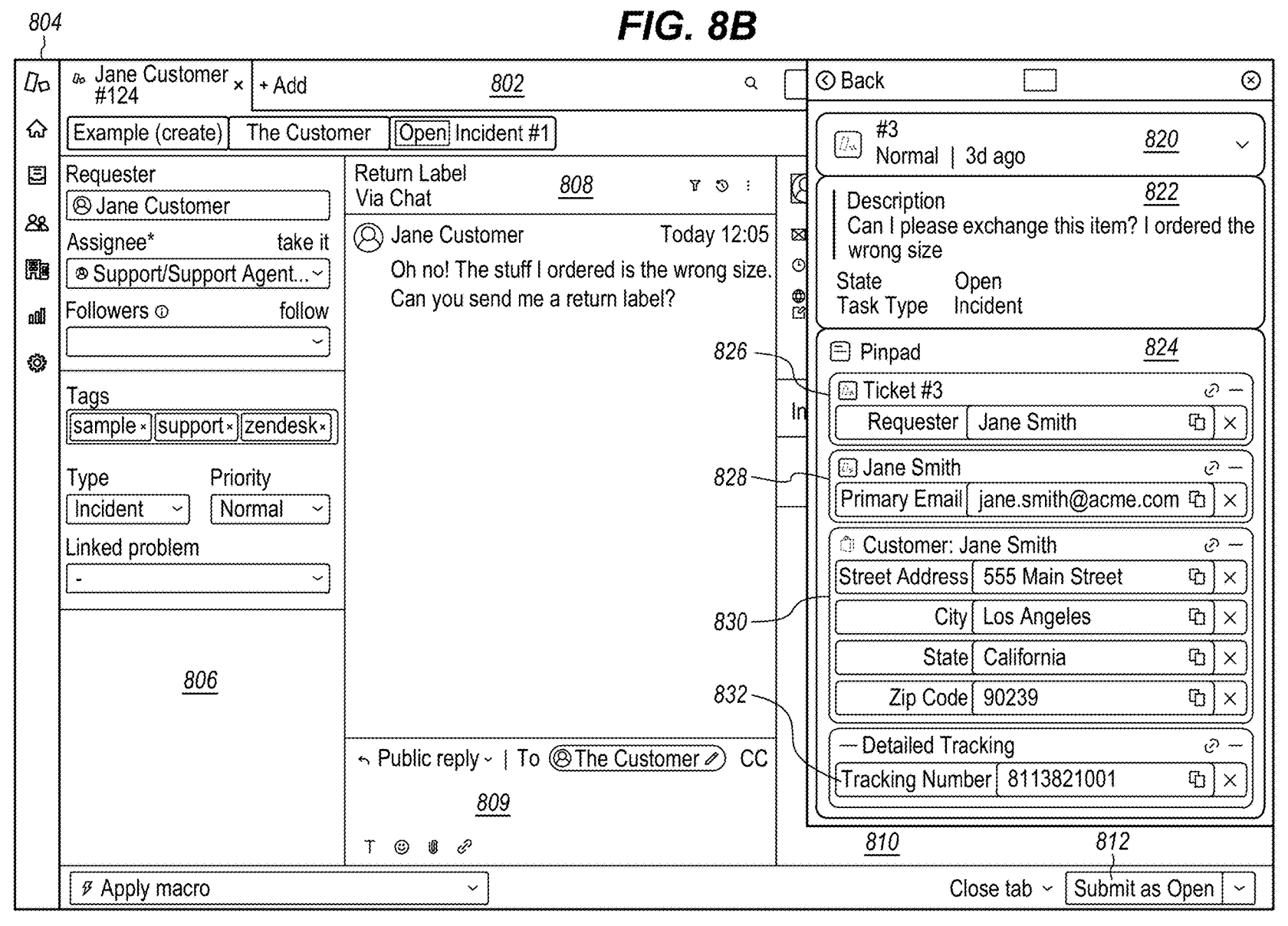

Jane Customer × | + Add
124

Example (create) | The Customer | [Open] Incident #1   _802_

Requester
@ Jane Customer                                    take it

Assignee*
@ Support/Support Agent... ˅

Followers ⊙                                          follow
|                                                    ˅

Tags
| sample × | support × | zendesk × |

Type                    Priority
| Incident ˅ |          | Normal ˅ |

Linked problem
| - |                                                ˅

_806_

⚡ Apply macro

---

Return Label                          _808_
Via Chat

⊙ Jane Customer                        Today 12:05

Oh no! The stuff I ordered is the wrong size.
   Can you send me a return label?

↩ Public reply ˅ | To  @ The Customer ✎  ⊙ CC

_809_

T ☺ 🖼 🔗                                          ˅

---

⊙ Back

📄  #3                              □    □         ⊗
   ⚡ Normal | 3d ago                   _820_        >

Description                                      _822_
Can I please exchange this item? I ordered the
wrong size State            Open
Task Type        Incident ▦ Pinpad                                          _824_

☑ Ticket #3                             🔗 — 
                                        ⌸  ×

Requester | Jane Smith                🔗
                                        ⌸  ×

☑ Jane Smith                            🔗 —
                                        ⌸  ×

Primary Email | jane.smith@acme.com   🔗
                                        ⌸  ×

☑ Customer: Jane Smith                  🔗 —
                                        ⌸  ×

Street Address | 555 Main Street      🔗
                                        ⌸  ×

City | Los Angeles                    🔗
                                        ⌸  ×

State | California                    🔗
                                        ⌸  ×

Zip Code | 90239                      🔗
                                        ⌸  ×

— Detailed Tracking                     🔗 —
                                        ⌸  ×

Tracking Number | 811382100 1         🔗
                                        ⌸  ×

_810_                _812_

Close tab ˅ | Submit as Open | >

Figure 10C:
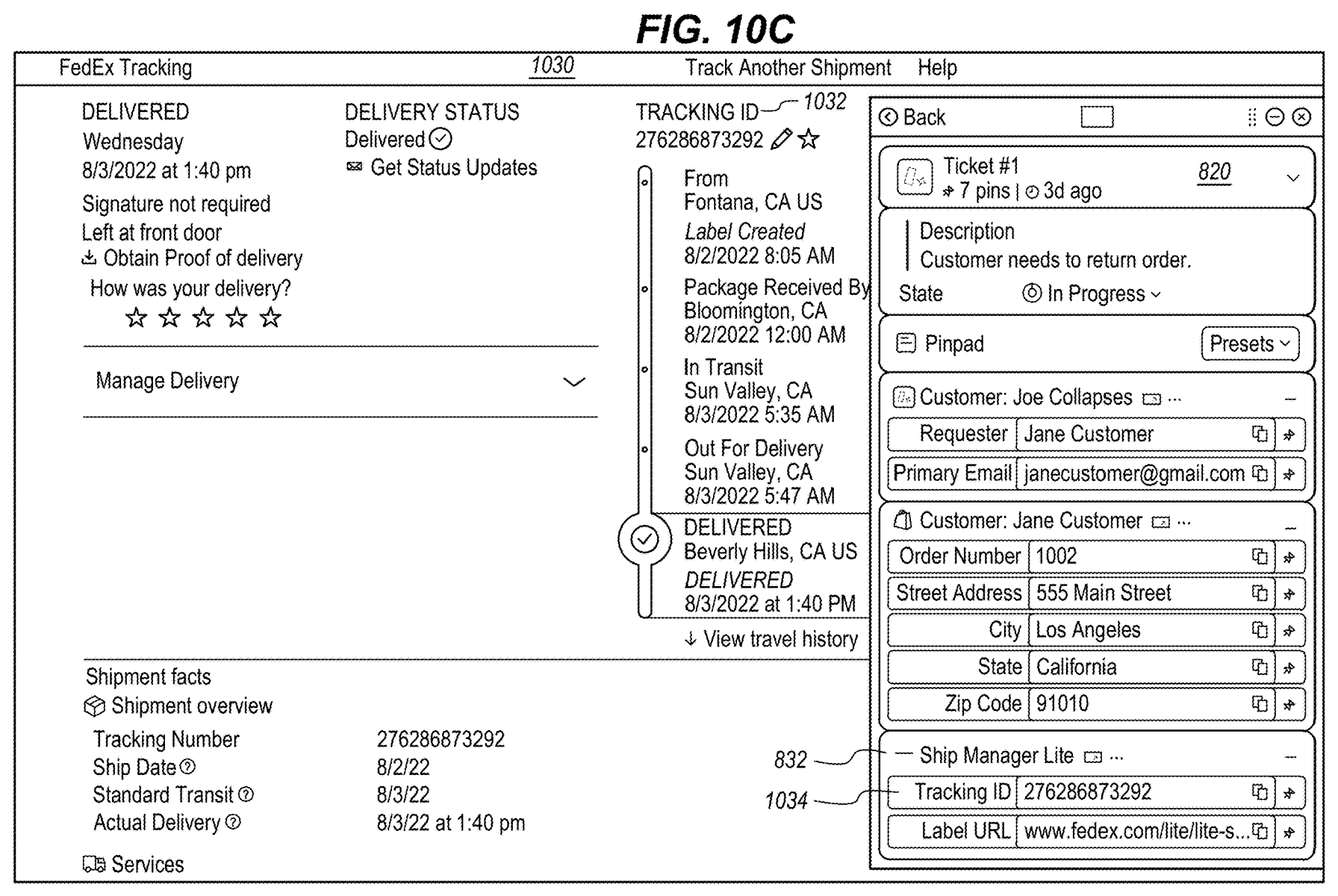

FedEx Tracking                    1030                    Track Another Shipment    Help DELIVERED
Wednesday
8/3/2022 at 1:40 pm
Signature not required
Left at front door
↳ Obtain Proof of delivery
How was your delivery?
☆ ☆ ☆ ☆ ☆

Manage Delivery

Shipment facts
◈ Shipment overview

Tracking Number    276286873292
Ship Date ⊘    8/2/22
Standard Transit ⊘    8/3/22
Actual Delivery ⊘    8/3/22 at 1:40 pm ⊡ Services DELIVERY STATUS
Delivered ⊙
✉ Get Status Updates

⟩

TRACKING ID —— 1032
276286873292 ✎ ☆

From
Fontana, CA US

Label Created
8/2/2022 8:05 AM

Package Received By
Bloomington, CA
8/2/2022 12:00 AM

In Transit
Sun Valley, CA
8/3/2022 5:35 AM

Out For Delivery
Sun Valley, CA
8/3/2022 5:47 AM

DELIVERED
Beverly Hills, CA US
DELIVERED
8/3/2022 at 1:40 PM

↳ View travel history

⊙ Back                                        820

▭

⊡    Ticket #1                              ⟩
       ⚲ 7 pins | ⊙ 3d ago

| Description
| Customer needs to return order.

State          ⊙ In Progress ⌄

▤ Pinpad                            Presets ⌄

▣ Customer: Joe Collapses ▭ ...          —

Requester    Jane Customer                ⎘  ⚲

Primary Email  janecustomer@gmail.com     ⎘  ⚲

▣ Customer: Jane Customer ▭ ...           —

Order Number    1002                      ⎘  ⚲

Street Address  555 Main Street           ⎘  ⚲

City    Los Angeles                       ⎘  ⚲

State   California                        ⎘  ⚲

Zip Code  91010                           ⎘  ⚲

— Ship Manager Lite ▭ ...                 —

Tracking ID    276286873292              ⎘  ⚲

Label URL   www.fedex.com/lite/lite-s...⎘ ⚲

Figure 12:
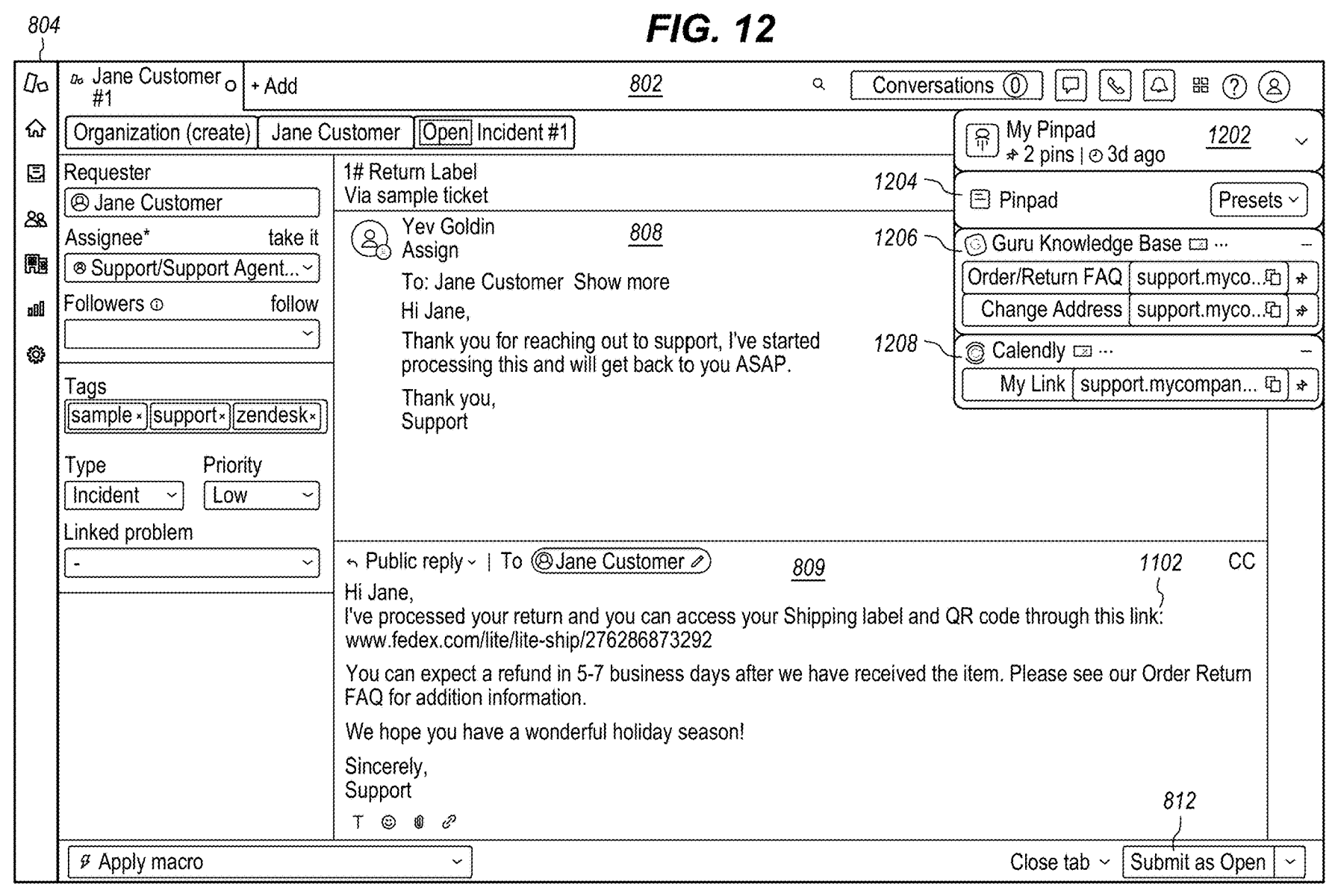

Organization (create) | Jane Customer | [Open] Incident #1

Jane Customer ○ | + Add
1

Requester
@ Jane Customer

Assignee*                    take it
@ Support/Support Agent...⌄

Followers ⓘ                 follow
                              ⌄

Tags
sample × | support × | zendesk ×

Type          Priority
Incident ⌄    Low ⌄

Linked problem
-                            ⌄

1# Return Label
Via sample ticket                        _808_

Yev Goldin   Assign
To: Jane Customer  Show more

Hi Jane,

Thank you for reaching out to support, I've started
processing this and will get back to you ASAP.

Thank you,
Support

↰ Public reply ⌄ | To @Jane Customer ✎        _809_

Hi Jane,

I've processed your return and you can access your Shipping label and QR code through this link:
www.fedex.com/lite-ship/27628687 3292

You can expect a refund in 5-7 business days after we have received the item. Please see our Order Return
FAQ for addition information.

We hope you have a wonderful holiday season!

Sincerely,
Support

T ☺ 🖉 ⛓                                      _1102_

CC

⚡ Apply macro                    ⌄

Conversations ⓪        _1202_

My Pinpad
⚲ 2 pins | ⏱ 3d ago

⊟ Pinpad                         _1204_

◎ Guru Knowledge Base ▱ ...      _1206_

Order/Return FAQ | support.myco..🗗
Change Address | support.myco..🗗

◎ Calendly ▱ ...                 _1208_
My Link | support.mycompan...🗗

Close tab ⌄                      _812_        Submit as Open ⌄

Presets ⌄

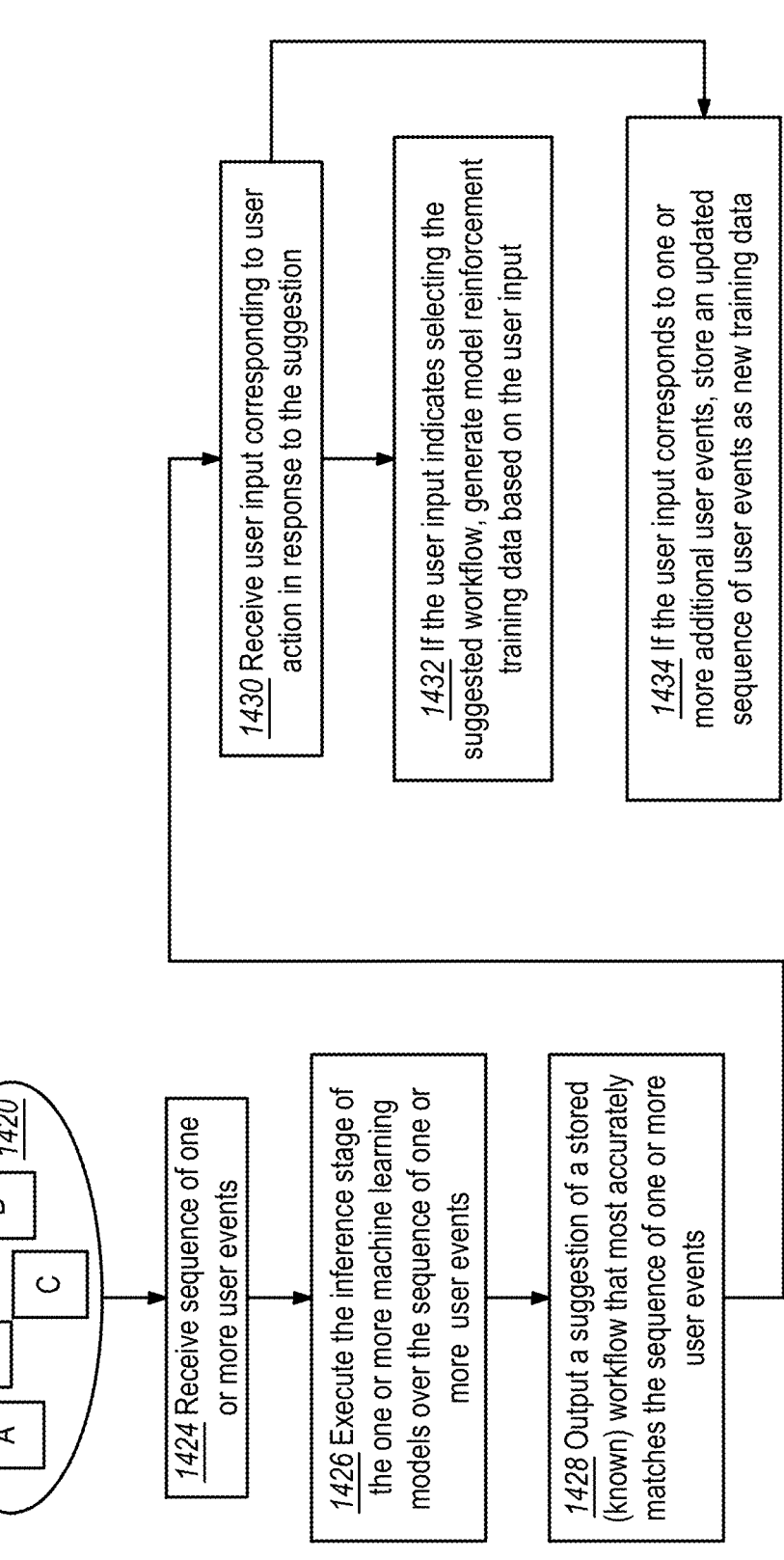

1420

_1424_ Receive sequence of one or more user events

_1426_ Execute the inference stage of the one or more machine learning models over the sequence of one or more user events _1428_ Output a suggestion of a stored (known) workflow that most accurately matches the sequence of one or more user events _1430_ Receive user input corresponding to user action in response to the suggestion _1432_ If the user input indicates selecting the suggested workflow, generate model reinforcement training data based on the user input _1434_ If the user input corresponds to one or more additional user events, store an updated sequence of user events as new training data

*FIG. 14C*

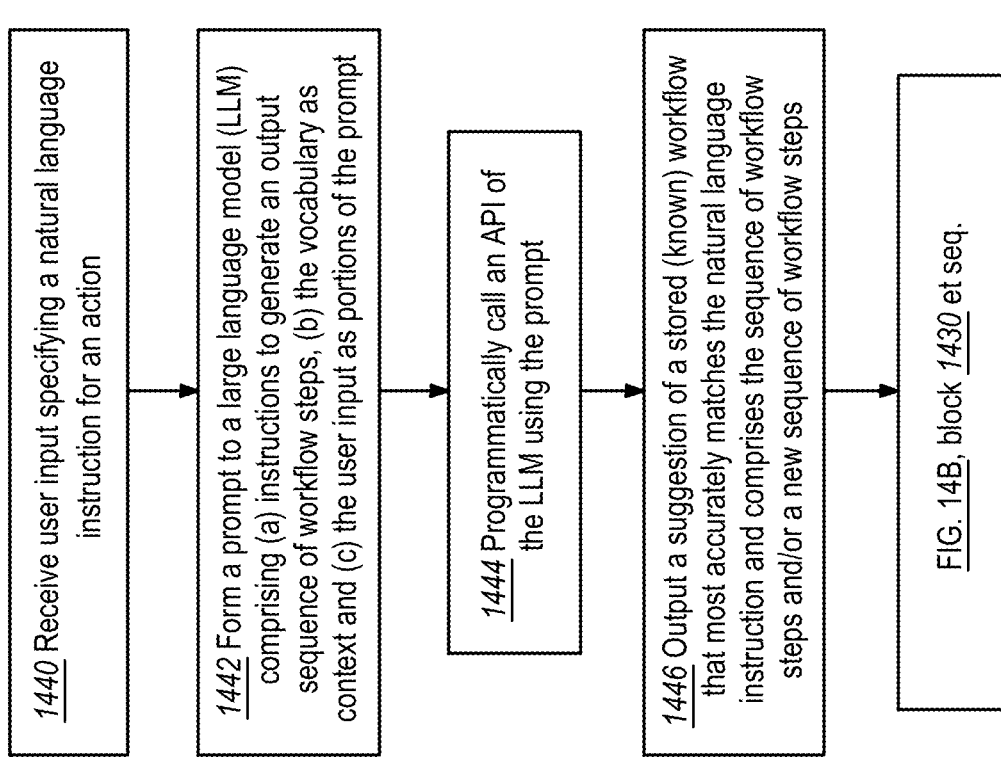

*1440* Receive user input specifying a natural language instruction for an action

*1442* Form a prompt to a large language model (LLM) comprising (a) instructions to generate an output sequence of workflow steps, (b) the vocabulary as context and (c) the user input as portions of the prompt

*1444* Programmatically call an API of the LLM using the prompt

*1446* Output a suggestion of a stored (known) workflow that most accurately matches the natural language instruction and comprises the sequence of workflow steps and/or a new sequence of workflow steps FIG. 14B, block *1430* et seq.

Fig. 15C

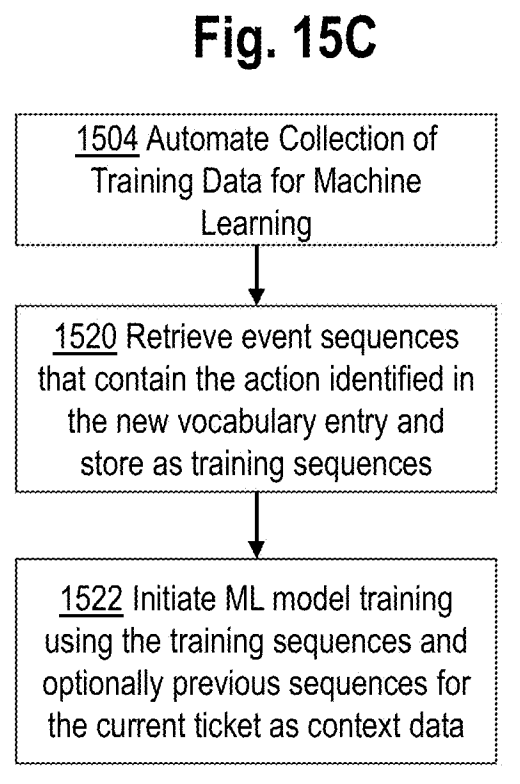

1504 Automate Collection of Training Data for Machine Learning

1520 Retrieve event sequences that contain the action identified in the new vocabulary entry and store as training sequences 1522 Initiate ML model training using the training sequences and optionally previous sequences for the current ticket as context data

Fig. 15D

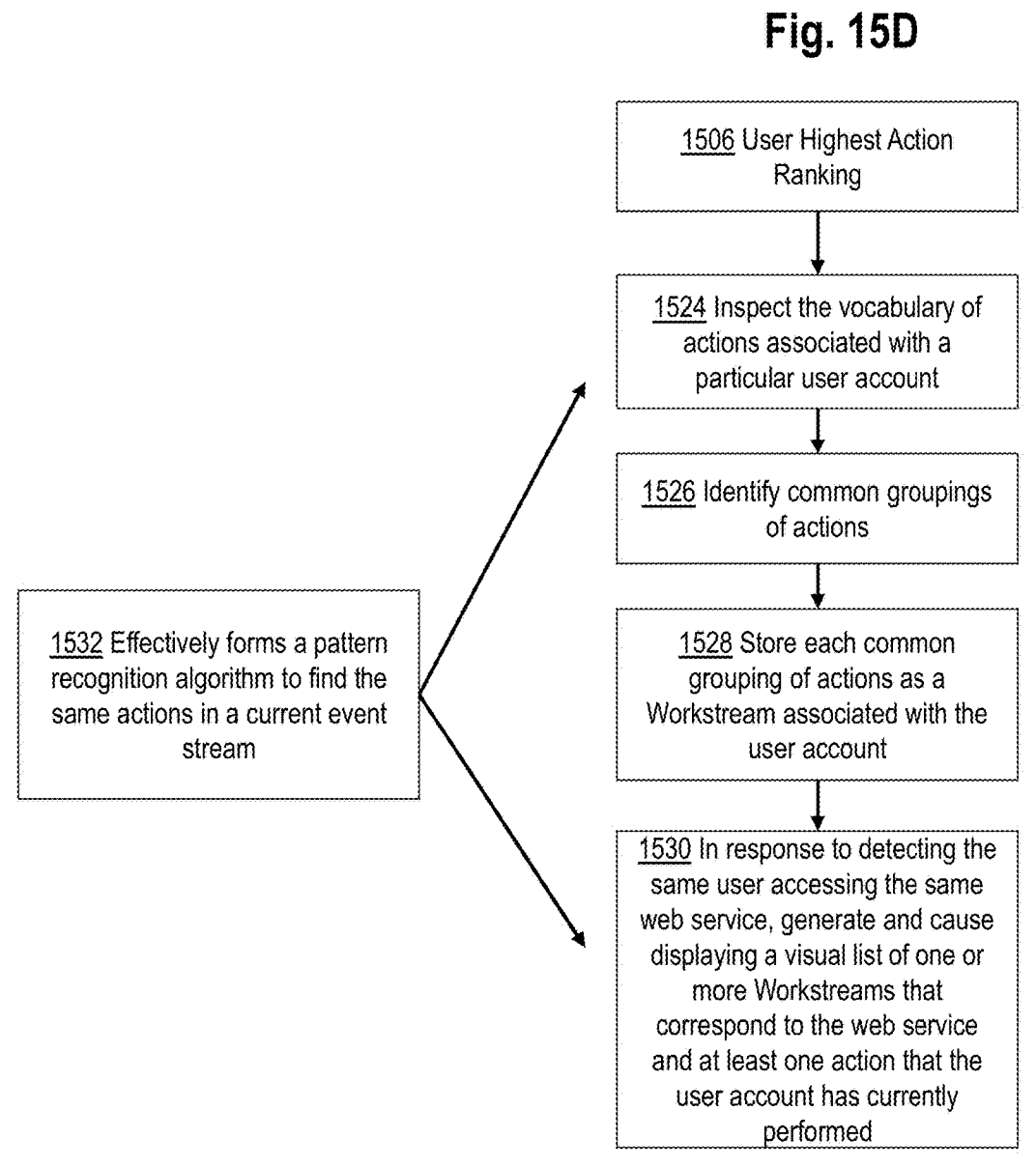

1506 User Highest Action Ranking

→

1524 Inspect the vocabulary of actions associated with a particular user account

→

1526 Identify common groupings of actions

→

1528 Store each common grouping of actions as a Workstream associated with the user account

→

1530 In response to detecting the same user accessing the same web service, generate and cause displaying a visual list of one or more Workstreams that correspond to the web service and at least one action that the user account has currently performed 1532 Effectively forms a pattern recognition algorithm to find the same actions in a current event stream Show me tree with connections > 5

Fig. 17A

I am giving you JSON description of user actions in browser:
{
   "sequence_index": 42,
   "max_relationship_property_count": 149,
   "min_relationship_property_count": 42,
   "parsed_url": "https://$OKTA_INSTANCE.okta-emea.com/admin/user/profile/view/$OKTA_USER_ID",
   "nodes": [
      {
         "node_id": 2614,
         "event_type": "nav_event"
      },
      {
         "node_id": 2615,
         "event_type": "click_event",
         "element_id": "admin-user-profile-toolbar",
         "inflow_count": 149
      },
      {
         "node_id": 2616,
         "event_type": "click_event",
         "element_id": "reset-authenticators-dropdown-option",
         "inflow_count": 138
      },
      {
         "node_id": 2617,
         "event_type": "click_event",
         "inflow_count": 42
      }
   ]
}

Your response should have 3 parts:
1) Verbal "Description" of all user actions
2) Short "Action Name" for the whole group of events as 1-3 word summary of performed actions
3) One sentence "Summary" of actions at the end of your response.

1702

< 9/10 >

Description:

The user navigated to the profile view page of a specific user within the Okta admin console. After reaching the page, they interacted with the toolbar on the profile page by clicking on it. Subsequently, they selected an option from a dropdown menu labeled "reset-authenticators-dropdown-option," indicating an intention to reset the user's authenticators. Finally, the user clicked on another element, although the specific element is not identified.

Action Name:

Reset Authenticators

1704

Summary:

The user accessed a user profile in Okta and initiated the process to reset the user's authenticators.

Fig. 17B

I am giving you JSON describing user actions in browser:
{
    "sequence_index": 19,
    "max_relationship_property_count": 149,
    "min_relationship_property_count": 80,
    "parsed_url": "https://$OKTA_INSTANCE.okta-emea.com/admin/user/profile/view/$OKTA_USER_ID",
    "nodes": [
        {
            "node_id": 2614,
            "event_type": "nav_event"
        },
        {
            "node_id": 2786,
            "event_type": "click_event",
            "element_id": "spotlight",
            "inflow_count": 149
        },
        {
            "node_id": 2787,
            "event_type": "paste",
            "element_id": "spotlight",
            "inflow_count": 89
        },
        {
            "node_id": 2749,
            "event_type": "click_event",
            "element_id": "spotlight",
            "inflow_count": 80
        }
    ]
}

1706

Your response should have 3 parts:
1) Verbal "Description" of all user actions
2) Short "Action Name" for the whole group of events as 1-3 word summary of performed actions
3) One sentence "Summary" of actions at the end of your response.

< 10/10 >

 Description:

The user navigates to a specific profile view in their OKTA instance, indicating they are accessing or managing a user's profile. The first action is a navigation event, signifying that the user has arrived at the profile page. Then, the user interacts with the spotlight search or input feature by clicking on it. Following this, the user pastes some content into the spotlight field, likely to search or input specific data. Finally, the user clicks on the spotlight element again, possibly to confirm or execute the action associated with the pasted content.

Action Name:

Spotlight Interaction

1708

Summary:

The user accessed a profile page in OKTA, interacted with the spotlight search by clicking and pasting content into it, and then confirmed the interaction with a final click.

Fig. 18B

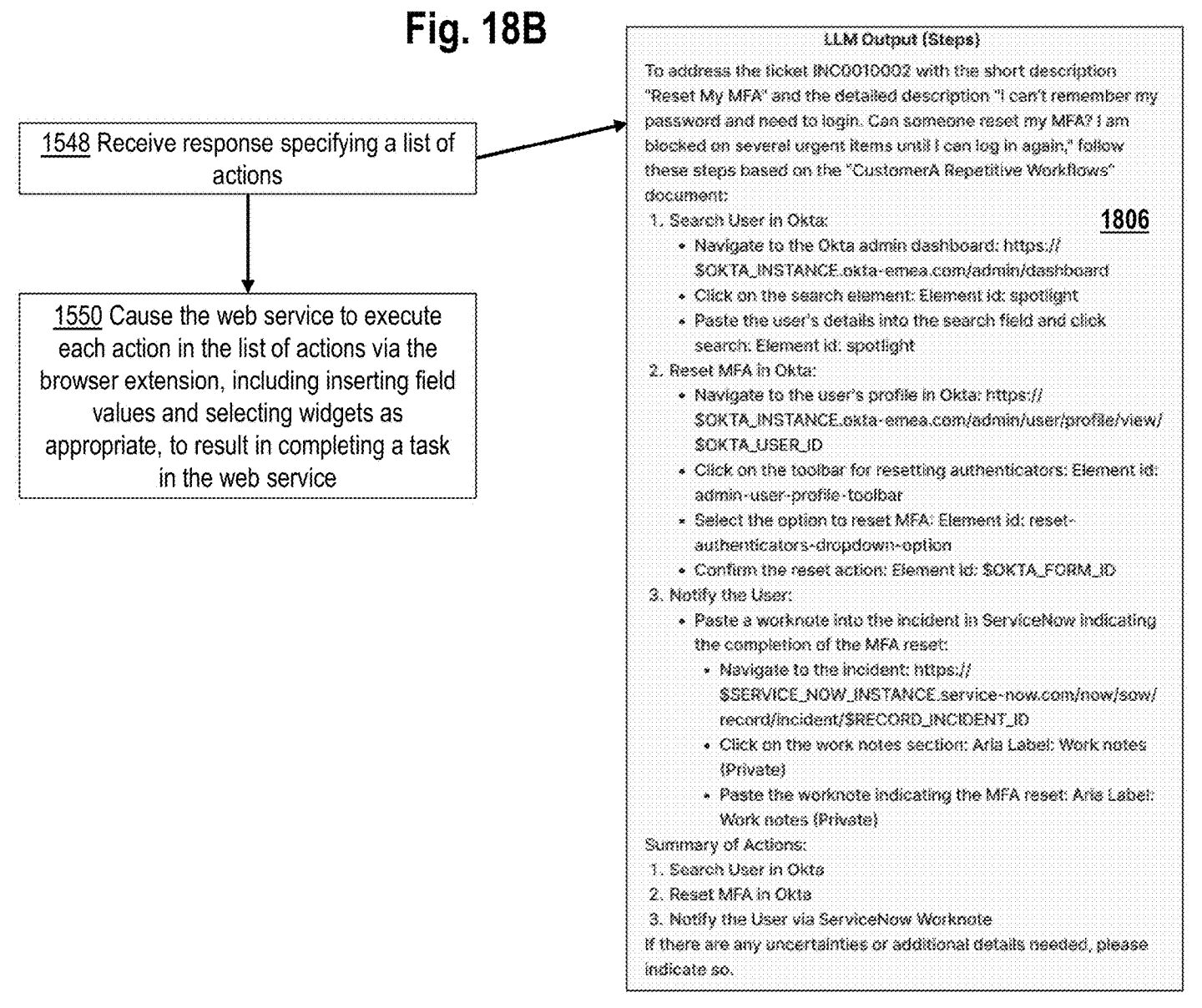

1548 Receive response specifying a list of actions

1550 Cause the web service to execute each action in the list of actions via the browser extension, including inserting field values and selecting widgets as appropriate, to result in completing a task in the web service

LLM Output (Steps)

1806

To address the ticket INC0010002 with the short description "Reset My MFA" and the detailed description "I can't remember my password and need to login. Can someone reset my MFA? I am blocked on several urgent items until I can log in again," follow these steps based on the "CustomerA Repetitive Workflows" document:

1. Search User in Okta:
   - Navigate to the Okta admin dashboard: https:// $OKTA_INSTANCE.okta-emea.com/admin/dashboard
   - Click on the search element: Element id: spotlight
   - Paste the user's details into the search field and click search: Element id: spotlight 2. Reset MFA in Okta:
   - Navigate to the user's profile in Okta: https:// $OKTA_INSTANCE.okta-emea.com/admin/user/profile/view/ $OKTA_USER_ID
   - Click on the toolbar for resetting authenticators: Element id: admin-user-profile-toolbar
   - Select the option to reset MFA: Element id: reset-authenticators-dropdown-option
   - Confirm the reset action: Element id: $OKTA_FORM_ID 3. Notify the User:
   - Paste a worknote into the incident in ServiceNow indicating the completion of the MFA reset:
     - Navigate to the incident: https:// $SERVICE_NOW_INSTANCE.service-now.com/now/sow/ record/incident/$RECORD_INCIDENT_ID
     - Click on the work notes section: Aria Label: Work notes (Private)
     - Paste the worknote indicating the MFA reset: Aria Label: Work notes (Private)

Summary of Actions:
1. Search User in Okta
2. Reset MFA in Okta
3. Notify the User via ServiceNow Worknote If there are any uncertainties or additional details needed, please indicate so.

AUTOMATICALLY DETERMINING WORKSTREAMS FROM COMMON ACTIONS IN ONLINE APPLICATIONS

CROSS-REFERENCE TO RELATED APPLICATIONS

This application claims the benefit of provisional application 63/710,963, filed Oct. 23, 2024, the entire contents of which are hereby incorporated by reference for all purposes as if fully set forth herein.

COPYRIGHT NOTICE

TECHNICAL FIELD

The present disclosure relates to artificial intelligence and machine learning, including Gated Restricted Unit (GRU) models. The disclosure also relates to software-implemented processes of continuously creating user experience data to generate automated actions for process automation.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by their inclusion in this section.

Knowledge workers such as customer support agents often work across a group of software applications all day, every day, to get work done. For example, in response to a phone call or chat session in which a customer communicates a question or request to an agent, the agent may start working with a request ticketing system, switch to one or more websites or web-based applications to view information, click on functions and thus submit uniform resource locators (URLs) to websites or web-based applications, and return to the ticketing system to close the request. Support is a world of many applications, tabs, workflows, and data transfers. During these actions, to accomplish a sub-task to close a ticket, agents may repeatedly select the same websites, web applications, or types of information. Over time, agents may interact with many customers, callers, or other requesters, each of whom is requesting assistance with transactions having different details concerning products, services, prices, and dates. However, resolving requests for all such customers still requires the repeated use of the same websites or web applications in a routinized manner, while selected transaction details differ.

For example, handling an order return has been observed to require 50 or more clicks or selections of information across different systems. Assume an agent is assigned a case in a ticketing system to process an order return. The ticketing system could be Zendesk or another. To initiate the return, the agent must copy three fields from the ticket: customer name, email, and order number—seven clicks. The agent must open the ordering system and find the order by pasting the order number. The agent might verify the customer's name and contact information and initiate a return on the order. The agent then needs to copy the return address, customer name, and customer address—perhaps 18 clicks. The agent then must open a shipping system like FedEx, UPS, or USPS to obtain a shipping label. For this, the agent inputs the return address, customer name, and customer address, receives the shipping label, and must copy the shipping confirmation code—requiring 15 clicks. The agent must return to the ordering system and paste the shipping confirmation code to confirm the return and initiate a back-end return workflow—5 clicks. The agent then must return to the ticketing system and attach the shipping label, generating an email with the shipping label to send to the user—7 clicks. These repeated flows of clicks, network accesses, or other web interactions are inefficient, time-consuming, slow, and not a good use of human time.

Based on the foregoing, the referenced technical fields have developed an acute need for better ways to implement computer learning of online workflows so that the machine knows what to do next and the agents guide the machine learning to improve.

SUMMARY

The appended claims may serve as a summary of the invention.

BRIEF DESCRIPTION OF THE DRAWINGS

In the drawings:

FIG. 4 illustrates a process of installing and executing a workflow automation program.

FIG. 5 illustrates a process of executing an inference stage of a machine learning model to predict a sequence of operations for execution using web-based applications.

FIG. 6 illustrates four example user workflows involving interactions with and transfers of data between multiple different web-based applications.

FIG. 7A illustrates a program flow of one embodiment of creating and storing data useful in workflow automations and training machine learning models.

FIG. 7B illustrates a program flow of one embodiment of training a machine learning model and executing the inference stage of the machine learning model.

FIG. 8B illustrates an example of a graphical user interface of a web-based software application in association with an extension panel that implements aspects of the present disclosure.

FIG. 10C illustrates another GUI with the extension panel and an automatic data update in the extension panel.

FIG. 11 illustrates the GUI of FIG. 8B and FIG. 9 with updates to the extension panel and a reply from the agent.

FIG. 12 illustrates the GUI of FIG. 11 after the agent has sent the reply message to the customer.

FIG. 13A, FIG. 13B, FIG. 13C, and FIG. 13D illustrate examples of graphical user interfaces that can be used in another embodiment.

FIG. 14A, FIG. 14B, and FIG. 14C illustrate examples of programmed processes, of one embodiment, to train and use machine-learning models to automatically learn workflows in web-based applications from user events and to generate suggestions of workflows in response to sequences of user events or natural language input.

FIG. 15C illustrates a computer-implemented method of automating the collection of training data for machine learning.

FIG. 15D illustrates a computer-implemented process of determining the user's highest action ranking.

FIG. 17A and FIG. 17B illustrate examples of prompts to an LLM followed by example responses.

FIG. 18A and FIG. 18B illustrate a computer-implemented process of agent-assisted workflows.

FIG. 19A, FIG. 19B, FIG. 19C, and FIG. 19D illustrate computer display devices showing example graphical user interfaces during the execution of agent-assisted actions based on the techniques that have been described for FIG. 18A and FIG. 18B.

DETAILED DESCRIPTION

Figure 1:
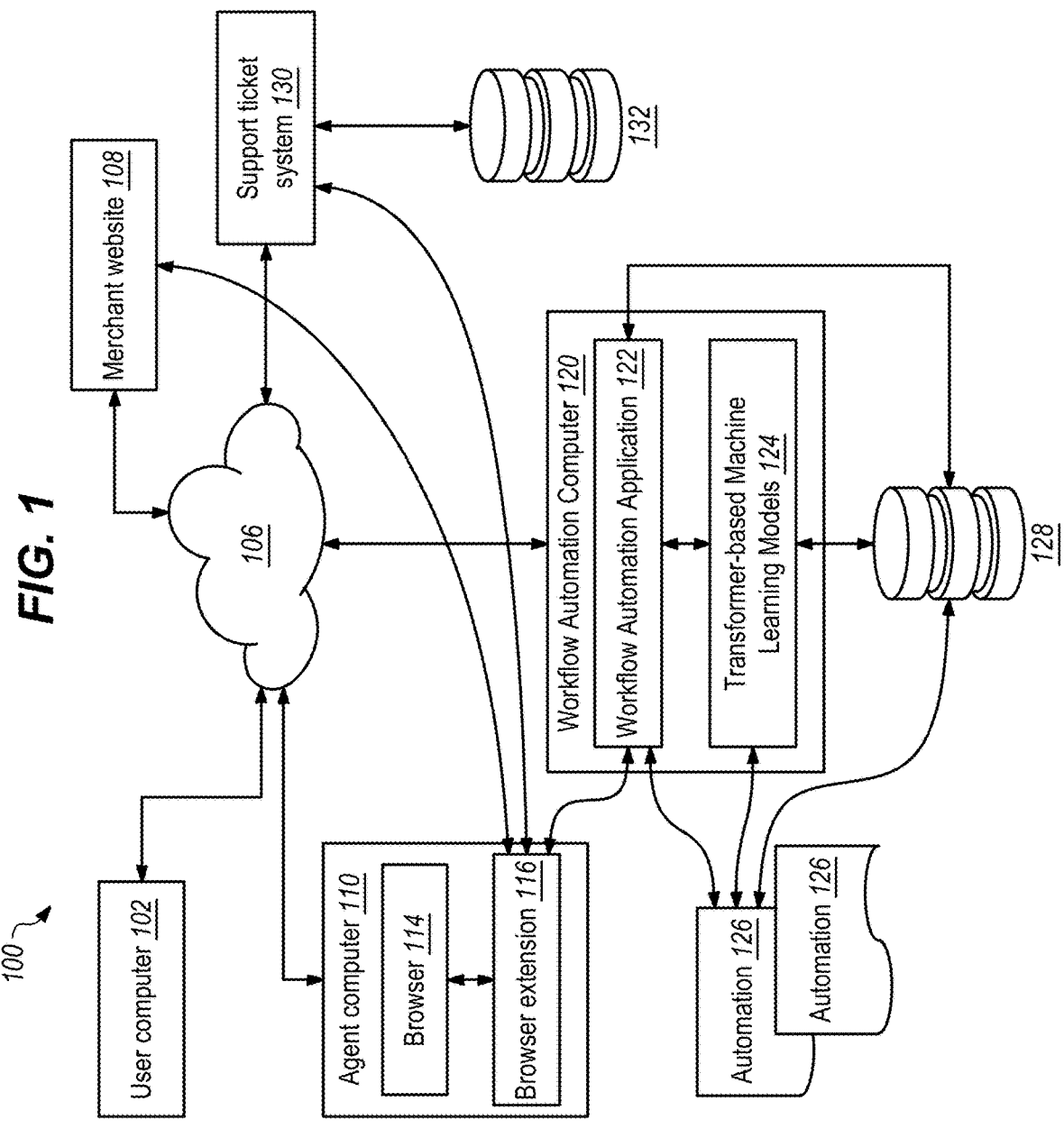
FIG. 1 illustrates a distributed computer system showing the context of use and principal functional elements with which one embodiment could be implemented.

In the following description, for the purposes of explanation, numerous specific details are set forth to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail outlined in this disclosure is the same level of detail that persons of skill in the art normally use to communicate with one another to express algorithms to be programmed or the structure and function of programs to implement the inventions claimed herein.

This disclosure may describe one or more different inventions, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described concerning one or more particular embodiments or drawing figures, but such features are not limited to usage in the one or more particular embodiments or figures for which they are described. Thus, the present disclosure is neither a literal description of all embodiments of one or more inventions nor a listing of features of one or more of the inventions that must be present in all embodiments.

Headings of sections and the title are provided for convenience but are not intended to limit the disclosure in any way or as a basis for interpreting the claims. Devices that are described as in communication with each other need not be in continuous communication with each other unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate a variety of possible embodiments and to fully illustrate one or more aspects of the inventions. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or occurrences, or some steps may be executed more than once in a given embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. General Overview

Embodiments provide the end-to-end ability in an online web-based application to collect, process, and execute enterprise workflows securely across all kinds of computing devices. Certain embodiments use a browser extension, implemented as an enterprise-grade, secure software application or app that processes the metadata representing user events, clicks, and key presses, structuring the metadata so it can be queried by any AI model to resolve specific workflows autonomously. Browser extensions Chrome, Firefox, Edge, or other browsers can be implemented and can run the actions specified. Thus, in an embodiment, sensitive corporate data does not transfer from the browser extension to server-side components outside the browser, as only metadata is collected.

Thereafter, when a user operates the browser to access a web-based service, the browser extension is programmed to read relevant fields from a ticket, record, or other work structure provided by the web service and displayed via the browser. The browser extension can be programmed to deliver a prompt with instructions on how to use "High-Level Actions" (HLA) with relevant information on the user or organization. The browser extension, alone or in networked communication with server-side software components, exchanging only metadata and not enterprise data, is programmed to calculate an embedding based on the above prompt and retrieve relevant HLAs via RAG-based LLM prompts based on the ticket, record, or other request and the organization's specific details. Relevant HLAs are appended to the previous prompt along with the browser extension's Action Space definition. The result is transmitted as a fully-formed prompt to an LLM, typically by a call to a well-known, public, or commercial API or endpoint call over a network. In response, the LLM delivers a response stating how to solve the ticket along with a sequence of actions to accomplish the goal. These actions include one or more of the steps defined in the HLAs. The browser extension automatically parses and executes the actions on the website, web service, or other networked resource. In this manner, common actions of agents or other users at web-based services can be fully automated while retaining complete user control to pause, accelerate, or modify actions that the browser extension executes automatically.

In one embodiment, one or more machine learning models are trained and programmed to support the automated creation and transmission of network requests to networked resources, such as the automatic submission of uniform resource locators (URLs) to websites or web-based applications, based on observing network traffic between an agent and one or more network resources and predicting sequences of network requests that represent repetitive workflows that are likely to be reused for different requesters with different transaction details. For example, in a customer service representative application, the disclosed technologies can observe network traffic representing repeated similar workflows of an agent with a ticketing system and one or more networked resources such as websites and use the observed data to train a machine learning model. The trained model then can execute an inference stage to predict workflows that the agent is likely to need or use again for different requesters who are associated with different transaction details. Predicted workflows associated with high confidence values can be digitally stored in a database as associations of data termed automations, then replayed on demand when a similar request occurs. When an automation is replayed, the system automatically transmits URLs or other networked requests to third-party applications, systems, or services to execute the tasks that had been observed in the training stage for customer- or request-specific transactions or data. In this manner, the disclosed technology can determine, create, and store definitions of repetitive workflows that can be replayed automatically, with or without guidance from the agent, to automate the repetitive workflows using customer- or request-specific transaction details or data. Model training can be based on data collected from thousands of agents working on thousands of instances of web applications, producing millions of operational events in the database. Model training or re-training also can be based on comparing manual actions that agents perform to predicted actions output from the model and determining a degree of accuracy of the output predictions.

An embodiment can be viewed as managing a digital agent's clipboard supported with AI-based automations. The support agent has access to data for a ticket via an extension panel across all the tabs of their browser, with the extension panel continuously visible and superimposed over web pages of any tab. Thus, the agent never must return to the ticketing system to obtain data or perform basic actions. An embodiment executes to pin data from key fields to a ticket record, visually exposed in the extension panel, enabling the same data to be selected and applied to fields across systems. Embodiments also allow agents to pin fields across systems. The AI model learns the agent's behavior and suggests editable shortcuts. Workflows can be saved for powerful automations that can be used repeatedly.

Embodiments can be implemented in phases, stages, or multiple federated applications. For example, the first implementation phase can comprise agent automation and data. Agents use software programmed according to embodiments which learns their workflows and offers helpful automations. Managers and executives can access a powerful analytics suite with invaluable data across agent workflows. For example, analytics reports based on the data collected in embodiments can answer questions such as: How often are agents copying and pasting out of each system? How many tabs does each agent have open on average? Why is Agent A closing tickets faster than Agent B? How much time does each agent spend on each application? What are the top fields used in each system? Which agent's workflow is the right one? How do hardware or network speeds affect agent performance?

In this context, agents may work in dozens of software applications all day to complete work. A manager can call, email, or text team members to complete a task, but an individual contributor is always X number of clicks away from completing work. Therefore, such individuals should be able to instruct a computing system what to do without needing to click, copy, and paste as frequently as in past approaches.

The disclosed embodiments can also enhance workflow visibility by making records of one user's relays and automations visible to multiple other users to evaluate efficiency or adherence to policies. In this manner, embodiments can help management identify non-compliant agent actions that may implicate losses or increased costs of a service business.

Embodiments also promote the reduced use of computing resources and computing time by enabling the standardization of workflows based on objective data about what operations agents conduct and how they transfer data between systems. Agent training can be improved because managers acquire the right data to support agent improvements and can correct issues about which they were previously unaware, as embodiments can provide more accurate data points for coaching. Agents can find focus difficult when many tabs are open and extensive copy and paste is required to complete a ticket. Slower processes can frustrate customers, and manual data transfers are more prone to error.

In one embodiment, a browser extension passively observes and collects data representing user events such as mouse clicks, tab selections, or other online activity in web-based applications, which later can be used to extract valuable insights about the agent's use of the application. In this context, for any embodiment described in this disclosure, the term "browser extension" refers broadly to a browser extension program, a browser plug-in, an application program that is hosted on an agent computer or user computer, or a browser that is natively programmed to, or executing browser-executable code programmed to, execute one or more programmatic calls to an application programming interface of a workflow automation application.

In an embodiment, an AI engine, as further described, can be programmed to combine data representing user behavior with task-mining processes to predict and optimize workflows while giving operational efficiency insights. Workflow analysis enables understanding how agents resolve similar tickets differently, enabling optimization of resolution paths for computing resource efficiency and/or other different outcomes. Analyzing process differences between top and bottom-performing agents enables the constant optimization of team performance. Secure and correct processes can be determined based on granular process mining and data analysis to enhance data loss prevention and provide integration points and insights.

From the perspective of an agent using an agent computer, as further described, the machine learning models and artificial intelligence support of embodiments appear as a personal assistant that learns continuously from the agent's inputs, signals, use, and behavior interacting with online applications, becoming more effective over time. In an embodiment, the machine learning model is trained based on all data from all agents of an organization to enable different agents of the same organization to benefit from all usage of all agents. Specific programmed AI/ML functions can include:

Smart data—suggests data based on ticket type and ongoing usage.

Relays—Creates shortcuts and automations after observation of user behavior.

Form filling—Auto fills multiple text fields contextually based on URL values.

Advanced workflows—Stringing together multiple relays for an advanced sequence.

Text autocomplete—Analyzing all free-text comments of individuals and teams to complete responses.

Knowledge base suggestions—Cross-system knowledge base suggestions based on ticket type and previously used articles.

Embodiments of the disclosure encompass the subject matter of the following numbered clauses:

1. A workflow automation computer system comprising: one or more hardware processors; one or more network interfaces that are communicatively coupled to one or more internetworks and capable of network communication with a browser extension hosted on an agent computer, a relational database system, and a support ticket system; and one or more non-transitory computer-readable storage media coupled to the one or more hardware processors and storing: one or more trained machine learning models; and one or more sequences of instructions which, when executed using one or more processors, cause the one or more processors to execute: receiving, from the browser extension, one or more browser event objects, extracting attribute values from the one or more browser event objects, and storing, in the relational database system, the one or more browser event objects and attribute values as one or more events of user action time series records; creating and storing in memory multiple trees having a depth=2, each of the trees comprising a plurality of nodes corresponding to browser event objects and a plurality of edges that connect the nodes to one or more child event nodes while recording identifiers of source events for copy-type events; for a particular child event node that represents browser event objects corresponding to pasting or form-filling data, identifying an existing tree among the trees having a corresponding source node, and joining a root node of that existing tree to the particular child event node; grouping all trees rooted in navigation events identifying a particular hostname under a common root node that specifies a first navigation event; for the first navigation event having a second navigation event as a direct child node, deleting the second navigation event; deleting from the memory all the trees having the depth=2; and in response to determining that a final tree has >2 navigation events, creating and storing a relay based on the final tree.

2. The workflow automation computer system of clause 1, further comprising sequences of instructions which, when executed using the one or more processors, cause the one or more processors to create and store the relay based on the final tree by executing a breadth-first traversal of the final tree, outputting a sequence of nodes as the traversal occurs, and storing an association of the identifiers of the nodes in the sequence as the relay.

3. The workflow automation computer system of clause 2, further comprising sequences of instructions which, when executed using the one or more processors, cause the one or more processors to execute: receiving input from the agent computer specifying an invocation of the relay; and replaying the sequence of nodes of the relay to a browser hosted on the agent computer via the browser extension 4. The workflow automation computer system of clause 2, further comprising sequences of instructions which, when executed using the one or more processors, cause the one or more processors to execute: storing the association of the identifiers of the nodes in the sequence as a record in a training dataset in association with a copy of a corresponding user action time series record; training the machine learning model using the training dataset; during a new user session, storing a sequence of events based on the one or more browser event objects; executing an inference stage of the machine learning model over the sequence of events to output a predicted sequence of events corresponding to a predicted workflow of the user computer; and replaying the predicted sequence of events to a browser hosted on the agent computer via the browser extension 5. The workflow automation computer system of clause 4, further comprising sequences of instructions which, when executed using the one or more processors, cause the one or more processors to repeat the execution of the sequences of instructions corresponding to functions of clause 1 for 1,000 or more user sessions to store 1,000 or more records in the training dataset.

6. The workflow automation computer system of clause 5, further comprising sequences of instructions which, when executed using the one or more processors, cause the one or more processors to store the sequence of events based on the one or more browser event objects by repeating the execution of receiving, from the browser extension, the one or more browser event objects.

7. The workflow automation computer system of clause 1, further comprising sequences of instructions which, when executed using the one or more processors, cause the one or more processors to execute receiving, from the browser extension, the one or more browser event objects, and extracting the attribute values in part by the browser extension calling a browser event API of a browser hosted on the agent computer.

8. The workflow automation computer system of clause 1, further comprising sequences of instructions which, when executed using the one or more processors, cause the one or more processors to execute: receiving input from the agent computer specifying an invocation of the relay; and replaying the relay to a browser hosted on the agent computer via the browser extension.

9. The workflow automation computer system of clause 1, each of the trees comprising a navigate event node with one or more edges directed to one or more child event nodes.

10. The workflow automation computer system of clause 1, further comprising sequences of instructions which, when executed using the one or more processors, cause the one or more processors to execute adjusting pointers of the first navigation event and any child nodes of the second navigation event.

11. One or more non-transitory computer-readable storage media storing one or more trained machine learning models and one or more sequences of instructions which, when executed using one or more processors, the one or more processors being are communicatively coupled to one or more network interfaces that are communicatively coupled to one or more internetworks and capable of network communication with a browser extension hosted on an agent computer, a relational database system, and a support ticket system, cause the one or more processors to execute: receiving, from the browser extension, one or more browser event objects, extracting attribute values from the one or more browser event objects, and storing, in the relational database system, the one or more browser event objects and attribute values as one or more events of user action time series records; creating and storing in memory multiple trees having a depth=2, each of the trees comprising a plurality of nodes corresponding to browser event objects and a plurality of edges that connect the nodes to one or more child event nodes while recording identifiers of source events for copy-type events; for a particular child event node that represents browser event objects corresponding to pasting or form-filling data, identifying an existing tree among the trees having a corresponding source node, and joining a root node of that existing tree to the particular child event node; grouping all trees rooted in navigation events identifying a particular hostname under a common root node that specifies a first navigation event; for the first navigation event having a second navigation event as a direct child node, deleting the second navigation event; deleting from the memory all the trees having the depth=2; and in response to determining that a final tree has >2 navigation events, creating and storing a relay based on the final tree.

12. The one or more non-transitory computer-readable storage media of clause 11, further comprising sequences of instructions which, when executed using the one or more processors, cause the one or more processors to create and store the relay based on the final tree by executing a breadth-first traversal of the final tree, outputting a sequence of nodes as the traversal occurs, and storing an association of the identifiers of the nodes in the sequence as the relay.

13. The one or more non-transitory computer-readable storage media of clause 12, further comprising sequences of instructions which, when executed using the one or more processors, cause the one or more processors to execute: receiving input from the agent computer specifying an invocation of the relay; and replaying the sequence of nodes of the relay to a browser hosted on the agent computer via the browser extension.

14. The one or more non-transitory computer-readable storage media of clause 12, further comprising sequences of instructions which, when executed using the one or more processors, cause the one or more processors to execute: storing the association of the identifiers of the nodes in the sequence as a record in a training dataset in association with a copy of a corresponding user action time series record; training the machine learning model using the training dataset; during a new user session, storing a sequence of events based on the one or more browser event objects; executing an inference stage of the machine learning model over the sequence of events to output a predicted sequence of events corresponding to a predicted workflow of the user computer; and replaying the predicted sequence of events to a browser hosted on the agent computer via the browser extension.

15. The one or more non-transitory computer-readable storage media of clause 14, further comprising sequences of instructions which, when executed using the one or more processors, cause the one or more processors to repeat the execution of the sequences of instructions corresponding to functions of clause 11 for 1,000 or more user sessions to store 1,000 or more records in the training dataset.

16. The one or more non-transitory computer-readable storage media of clause 15, further comprising sequences of instructions which, when executed using the one or more processors, cause the one or more processors to store the sequence of events based on the one or more browser event objects by repeating the execution of receiving, from the browser extension, the one or more browser event objects.

17. The one or more non-transitory computer-readable storage media of clause 11, further comprising sequences of instructions which, when executed using the one or more processors, cause the one or more processors to execute receiving, from the browser extension, the one or more browser event objects, and extracting the attribute values in part by the browser extension calling a browser event API of a browser hosted on the agent computer.

18. The one or more non-transitory computer-readable storage media of clause 11, further comprising sequences of instructions which, when executed using the one or more processors, cause the one or more processors to execute: receiving input from the agent computer specifying an invocation of the relay; and replaying the relay to a browser hosted on the agent computer via the browser extension.

19. The one or more non-transitory computer-readable storage media of clause 11, each of the trees comprising a navigate event node with one or more edges directed to one or more child event nodes.

20. The one or more non-transitory computer-readable storage media of clause 11, further comprising sequences of instructions which, when executed using the one or more processors, cause the one or more processors to execute adjusting pointers of the first navigation event and any child nodes of the second navigation event.

1.1 Distributed Computer System Example

FIG. 1 illustrates a distributed computer system showing the context of use and principal functional elements with which one embodiment could be implemented. In an embodiment, the computer system comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of computer-implemented automation of workflows associated with networked resources. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

An embodiment's infrastructure can follow the following general design and operating principles. It interacts with external data, user interactions, and user events and data. Concerning external data, an embodiment can be programmed to connect to one or more external systems to present meaningful data to an agent. These operations can use existing browser tokens, normalize data received from APIs of external systems, and poll the external systems regularly to maintain updated data. Concerning user interactions, an embodiment maintains UI components the user can access across web tabs. An extension panel, autofill menu or suggestion panel, and on-page interactions support automatically tracking and entering data across systems. Smart pins of key data, relays, and other automations support similar operations. Concerning user events and data, an embodiment is programmed to gather data that can yield operational insights as users solve tickets. Embodiments capture copy, paste, and tab changes as events. The event data can be mined to derive relays and automations. The data can be used to generate an executive report.

Embodiments can also be programmed to support data security principles. Embodiments characterize data in three ways: customer data, metadata, and user behavior data. Customer data comprises content within business applications and stays local to an agent's computer. Metadata comprises structural, operational, and workflow data from websites and systems and feeds into the AI core of the system. User behavior data describes how users interact with systems and optimize individually and collectively for future workflows.

In the example of FIG. 1, one or more user computers 102 and agent computers 110 are communicatively coupled, directly or indirectly, to a data communication network 106. Each user computer 102 and agent computer 110 can comprise a desktop computer, laptop computer, tablet computer, or another mobile computing device in various embodiments. For purposes of illustrating a clear example, FIG. 1 shows one user computer 102 and one agent computer 110, but other embodiments can support any number of such computers by changing the processing power of server-side elements.

Typically, the user computer 102 is associated with a consumer, customer, or another individual undertaking a transaction with a networked resource, including but not limited to a merchant website 108. The user computer 102 hosts or executes one or more application programs, including but not limited to a web browser by which the user computer 102 interacts with the merchant website 108 or a web-based application of the merchant website. For purposes of illustrating a clear example, a single merchant website 108 is shown, but other embodiments can comprise any number of networked resources like the merchant website. The merchant website 108 can comprise any system by which the user computer 102 can read information, view products and services, and/or purchase or order products or services. The merchant can offer or supply goods or services in any field, including consumer goods, travel, music and entertainment, industrial products, or other commodities. While the label "merchant" is used to illustrate one clear example, the merchant website 108 could also be a website, web application, or web server associated with a government agency, educational institution, nonprofit enterprise, or other entity or enterprise.

Agent computer 110 typically is associated with a customer service representative (CSR), customer service agent, or other agent or representative whose role is to assist users of the user computer 102 in creating, reading, updating, or deleting one or more transactions associated with the merchant website 108. Each agent computer 110 hosts or executes a web browser 114 and a browser extension 116, the functions of which are further described in other sections herein. The agent computer 110 can download the browser extension 116 from an app store, from the workflow automation computer 120, or another networked server.

A support ticket system 130 is communicatively coupled to network 106 and to ticket database 132. The support ticket system 130 can comprise any support ticket system or ticketing system that is commercially available at the time of this writing. Examples include ZENDESK and SERVICE-NOW. The support ticket system 130 comprises a web-based application that the agent computer 110 can access and use via browser 114. The ticket database 132 stores many database records for issues, customer requests, tickets, and related data.

In an embodiment, a workflow automation computer 120 is communicatively coupled to network 106 and hosts and executes a workflow automation application 122, which is programmed to execute the features and functions that are described in the supplemental specification and certain other sections herein. The workflow automation application 122 is compatible with the browser extension 116 and can establish a network connection to the browser extension. In an embodiment, as the agent computer 110 is interacting with the support ticket system 130, the merchant website 108, and zero or more other networked resources, the browser extension 116 observes network traffic between the agent computer and other computers, captures signals representing the network traffic, and stores the signals or data derived from or based on the signals in the database 128. Traffic typically comprises URLs, data entered in fields or forms, form submission actions, selections of functions or options, or any other signal that the agent computer 110 can communicate or submit to the other computers shown in FIG. 1.

Further, the workflow automation application 122 is programmed to transmit data and presentation instructions to the browser extension 116 to cause the browser extension to create and display one or more windows, panels, or other graphical user interface (GUI) elements near, on, or over a conventional browser window of the browser 114. For example, as the agent computer 110 browses pages of the support ticket system 130 and/or the merchant website 108, the browser extension 116 is programmed to receive data from the workflow automation application 122 and present the data in one or more one or more windows, panels, or other GUI elements near, on, or over a window of the browser 114.

The workflow automation computer 120 also hosts, trains, and executes the inference stage of one or more machine learning models 124. In one embodiment, the workflow automation computer 120 and database 128 are programmed using multi-tenant techniques to support multiple independent enterprises or entities with segregated data storage. In such an embodiment, the workflow automation computer 120 can train and use a different ML model for each entity, with training data collected from all agent computers 110 of all agents associated with that entity. For example, event data is stored in training datasets with attribute values specifying the tenant, entity, or instance active in the web-based application at the time that an event occurred and used for training machine learning models. Importantly, tracking and using these attributes enables training models that are customized to particular tenants or instances while still leveraging community-wide data. Thus, as further described in other sections, when workflow automation computer 120 detects a partial or complete sequence of user events, the system can determine a suggestion of a workflow corresponding to those events based on community data for similar events, even if the current user's instance is different than all other instances for which the other similar events were collected. Therefore, even if the system has not learned a user action corresponding to a sequence of events for the current particular instance of the user, the system can suggest an action or workflow corresponding to the user's events based on knowledge derived from other event sequences of other instances.

In an embodiment, the workflow automation application 122 is programmed to create and store workflow training data in a workflow automation database 128 coupled with the workflow automation computer 120. The training data comprises records of interactions of the agent computer 110 with the merchant website 108 and/or the support ticket system 130, which, taken together, represent a workflow of the agent computer to access a support ticket, act on the support ticket, and close the support ticket.

In an embodiment, the workflow automation application 122 is programmed to create and store a plurality of automations 126 in the workflow automation database 128. Each of the automations 126 comprises a set of data and instructions describing or representing an observed workflow that can be replayed or repeated automatically. Each of the automations 126 can be created, in one embodiment, by accumulating a large quantity of the training data and then executing the inference stage of the machine learning model 124 to output predictions of a sequence of operations that are likely to represent a workflow, with a confidence value. If the confidence value is greater than a threshold value specified in a programmed constant or variable or a configuration file, then the sequence of operations can be stored in the workflow automation database 128 as a named or otherwise identified automation. The terms "flow" and "automation" are equivalent in this disclosure.

1.2 Primary Ticketing System

Figure 3:
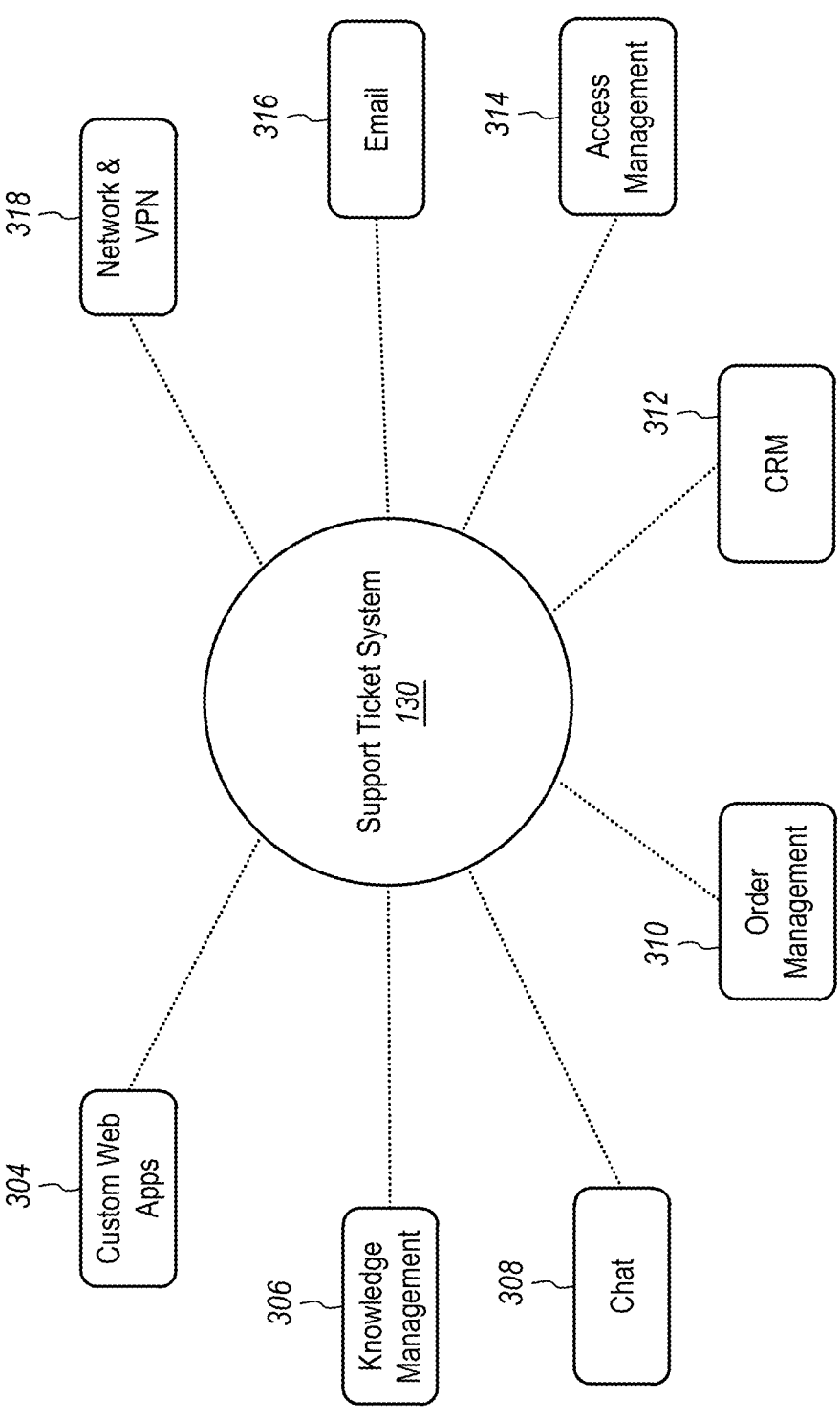
FIG. 3 illustrates a set of software applications with which an embodiment can interoperate.

FIG. 3 illustrates a set of software applications with which an embodiment can interoperate. In one embodiment, the support ticket system 130 is communicatively coupled via one or more internetworks to multiple different networked servers, SaaS systems, and/or web application endpoints or APIs. Different embodiments can include one or more of the systems shown, as examples, in FIG. 3, including but not limited to one or more custom web apps 304, a knowledge management system 306, a chat system 308, an order management system 310, a customer relationship management (CRM) system 312, an access management system 314, an email system 316, and network and VPN servers or system 318. Each of the foregoing elements can be implemented in a different server computer, server process, virtual computing instance, or networked endpoint. In an embodiment, the agent computer 110 may periodically visit any of the systems in FIG. 3 using browser 114 as part of processing a ticket originated in the support ticket system 130, gathering information, or distributing information.

1.3 Example Installation and Execution Process

FIG. 4 illustrates a process of installing and executing a workflow automation program. At block 402, an agent installs a plugin on a browser. In an embodiment, agent computer 110 uses browser 114 to access a copy of the browser extension 116 at a website or server computer and installs the browser extension 116 in association with browser 114. For example, the browser 114 can open a network connection to workflow automation computer 120 and access web pages served from the workflow automation application that enables accessing a download link for the browser extension 116. The workflow automation computer 120 can be programmed as a networked file server to serve copies of the browser extension 116 on demand in response to user input at agent computer 110 to select the link via the browser 114.

Block 404 represents the capability of workflow automation computer 120 to provide essential ticket data, sourced from the support ticket system 130, everywhere that an agent computer 110 executes with a compatible browser extension 116. Block 406 represents the capability of workflow automation computer 120 to intelligently task mine data in the support ticket system 130 to determine what tasks in other systems, such as the systems of FIG. 3, must occur to resolve or close tickets.

At block 408, in response to input from block 406 specifying one or more particular tasks, the workflow automation computer 120 is programmed to generate AI-based automations that can be replayed to execute the particular tasks in the systems of FIG. 3, merchant website 108 (FIG. 1), or other networked systems.

At block 410, during the execution of block 408, the workflow automation computer 120 is programmed to capture behavioral data representing mouse clicks, DOM element selections, copy or paste operations, and other machine interactions of the agent computer 110 with the merchant website 108 or the systems of FIG. 3. The behavioral data can be evaluated using an inference stage of a trained machine learning model to derive new automations.

FIG. 5 illustrates a process of executing an inference stage of a machine learning model to predict a sequence of operations for execution using web-based applications. In an embodiment, a support agent 502 uses agent computer 110, with browser 114 and browser extension 116 interacting with the workflow automation application 122, to form an input sequence of operations 504 with merchant website 108 or one or more of the systems of FIG. 3 that implements a task, such as "Can you create a FedEx shipping label for Jerry?" The workflow automation application 122 programmatically calls one of the machine learning models 124 to execute the inference stage over the input sequence. Sequence tokens 510 are routed to an encoder 512 and decoder 514, resulting in an output sequence 508 of tokens that express other operations to perform with merchant website 108 or one or more of the systems of FIG. 3. Output sequence 508 can be persistently stored in database 128 as one of the automations 126.

In this manner, system 100 can be used to persistently store in networked digital storage the automations 126 of many kinds, all capable of replaying using multiple different networked systems to automatically execute tasks in the systems.

FIG. 6 illustrates four example user workflows involving interactions with and data transfers between multiple web-based applications. To illustrate clear examples, FIG. 6 illustrates four examples of sequences of operations with merchant website 108 or one or more of the systems of FIG. 3 that implement different tasks. In an embodiment, most sequences begin when the support agent 502 or agent computer 110 interoperates with the support ticket system 130 to view a previously created ticket or task.

1.3.1. For example, in the first sequence, at block 602, the agent is assigned a ticket specifying RETURN ORDER associated with a consumer's request to return an order of a tangible product or service. The commercially available ZENDESK system could be used at block 602, but other embodiments can interoperate with ticketing systems of other kinds, and using ZENDESK is not required.

At block 604, with the browser 114 communicatively coupled to ZENDESK as the support ticket system 130, the agent selects a set of data elements such as an order number, customer name, and customer email address. At block 606, the agent enters input to direct the browser 114 to connect to and open an order system, such as SHOPIFY. The agent signals the order system to transfer an order number and selects data such as a customer name, return address of a merchant, and customer address.

At block 608, the agent enters input to direct the browser 114 to connect to and open a shipping system, such as FEDEX and transfers the customer's name, return address, and customer address. The agent selects data such as a shipping confirmation code. At block 610, the agent opens the order system to transfer the shipping confirmation code to confirm the return. At block 612, the agent directs the browser 114 to return to the support ticket system 130 to attach a shipping label to the open ticket, which causes the support ticket system to automatically generate and dispatch an email message to the customer. At block 614, the ticket is closed.

1.3.2. In a second sequence, at block 620, the agent computer 110 is assigned a ticket of the type NEED HELP INSTALLING. At block 622, browser 114 uses support ticket system 130 to select a part of a description from the ticket. At block 624, browser 114 opens a knowledge base and transfers part of the short description from the ticket, using it to find an article, and selects data from the article, such as a passage describing how to install an item and a URL of the article. At block 626, browser 114 opens the support ticket system 130 and transfers the installation passage and article URL to the ticket. At block 628, the ticket is closed.

1.3.3. In a third sequence, at block 630, the agent computer 110 is assigned a ticket of the type CHANGE ADDRESS FOR RECENT ORDER. At block 632, the agent uses the browser 114 to select data such as an order number and new address from the ticket in the support ticket system 130. At block 634, browser 114 opens the order management system and transfers the order number. Input to browser 114 selects a shipping confirmation code from the order. At block 636, input to browser 114 causes the browser to connect to the shipping system, and agent 502 uses agent computer 110 to enter signals to transfer the shipping confirmation code. The agent finds the shipment and edits the details to transfer the new address. The agent selects a new arrival window, which the shipping system reports. At block 638, the agent directs browser 114 to the support ticket system 130 and transfers the shipping confirmation code and new arrival window to update the ticket. At block 639, the ticket is closed.

1.3.4. In a fourth sequence, at block 640, the agent computer 110 is assigned a ticket of the type UNCLEAR WARNING MESSAGE. At block 642, the agent is unsure how to resolve the ticket, so the agent selects a ticket description in the support ticket system 130. At block 644, the browser 114 transfers the description into a ticket search field and provides input to select a search function. In response, the support ticket system 130 finds two similar cases with a knowledge base link attached to each of them. The browser 114 receives input to select one of the links. In response, browser 114 redirects to the knowledge base at block 646 and displays an article. Input via browser 114 selects data consisting of the text of a relevant passage and the article's URL. At block 648, browser 114 opens the support ticket system 130 and transfers the relevant passage and article URL to the ticket. At block 650, the ticket is closed.

2. Implementation Example—Forming Training Data for Machine Learning Models to Support Creating Automations

2.1 Process Flow

FIG. 7A illustrates a program flow of one embodiment of creating and storing data useful in workflow automations and training machine learning models. FIG. 7A presumes that a browser executes and that data collection instructions execute as a browser extension or application.

In an embodiment, the process of FIG. 7A is programmed at block 702 to call a browser event API to detect a new browser event object. The browser event object is associated with or results from a user interaction with an element of a web page of a SaaS application. Section 2.2 below identifies examples of browser events that can be captured by programming the browser extension 116 in one embodiment and the property values or attributes ("properties") that the browser extension detects and stores for specified types of events.

At block 704, the process is programmed to receive the browser event object. At block 706, the process is programmed to extract attribute values from the browser event object and store the attribute values as the next event of a user action time series record.

At block 708, the process is programmed to test whether the user session is complete. If the test of block 708 is FALSE or negative or the equivalent, then control transfers back to block 702 to repeat the subprocess of block 702, 704, 706, or other events of the user session. If the test of block 708 is TRUE or positive or the equivalent, control transfers to block 710. At block 710, the process is programmed to create and store multiple trees having a depth of two, each of the trees comprising a navigate event node with one or more edges directed to one or more child event nodes while recording identifiers of source events for copy-type events.

At block 712, the process is programmed, where a leaf event comprises pasting or form-filling data into a destination, finding an existing tree having a corresponding source node, and joining the root of that existing tree to the leaf event.

At block 714, the process is programmed to group all the trees rooted in navigation events that identify the same hostname under a common root node specifying the first such navigation event. At block 716, the process is programmed to execute when a first navigation event has a second navigation as a direct child node, deleting the second navigation event, adjusting pointers of the first navigation event, and adjusting pointers of the first navigation event and any child nodes of the second navigation event. At block 717, the process is programmed to delete trees with depth=2.

At block 718, the process is programmed to test whether the final tree has more than two navigation events. If the result of block 718 is NO, FALSE, negative, or the equivalent, then control transfers to block 724, at which point the process returns control to a calling process or terminates normally. Under the conditions that cause control to arrive at block 724, creating a stored automation sequence is not possible or useful. If the result of block 718 is YES, TRUE, positive, or the equivalent, then at block 720, the process is programmed to execute a breadth-first traversal of the final tree, output a sequence of nodes as the traversal occurs, and store a named association of identifiers of the nodes in the sequence as a relay or stored automation. In this context, a "relay" may refer to an association of digitally stored data specifying an action, a field, an application, and the next action or application. Examples of relays can include Open Employee ID in Okta; Autofill from Pin Pad in FedEx; Attach Label PDF in Zendesk; Create Jira ticket from ServiceNow; Post Knowledge URL to Slack. A stored automation can combine relays as a named or specified set. An example of an automation is: Name: "Create a FedEx shipping label." Relays: Access Zendesk ticket; access Shopify to find an address and copy the address; access FedEx to autofill the address and get a shipping label; access Zendesk to attach the shipping label and generate a response to the customer.

Thus, block 720 enables automatically creating and storing an automation sequence based on an observed, repeated sequence of user operations. Control then transfers to block 722, where the process is programmed to receive and respond to user input specifying an invocation of the relay or stored automation by replaying the sequence of nodes of the relay or stored automation to the browser. Block 722 can be executed at any time after block 720, and separation in time from seconds to weeks is possible in different use cases.

Asynchronously, with or without executing block 722, the process is programmed to continue from block 720 at FIG. 7B. FIG. 7B illustrates a program flow of one embodiment of training a machine learning model and executing the inference stage of the machine learning model. In an embodiment, the process is programmed at block 730 to store the association of identifiers of the nodes in the sequence as a record in a training dataset, paired with a copy of a corresponding user action time series record.

At block 732, the process is programmed to repeat the execution of FIG. 7A and block 730 for 1,000 or more user sessions to store 1,000 or more records in the training dataset. The number 1,000 is provided as a lower bound to indicate the model training contemplated by FIG. 7B is not practical to execute manually, in the human mind, or in another non-automated manner. Other embodiments could execute training based on many more records of user sessions. At block 734, the process is programmed to train a machine-learning model using the training dataset.

At block 736, in a new session, the process is programmed to execute blocks 702, 704, and 706 of FIG. 7A, to store a sequence of events, denoted e for convenience or as shorthand. At block 738, the process is programmed to execute the inference stage of the trained machine-learning model over the sequence of e events to output a predicted sequence of events corresponding to a predicted workflow of the user. At block 740, the process is programmed to replace the predicted sequence of events in the browser.

In this manner, machine-learning techniques can be used to observe user action, store a large set of database records representing a training set, and train an ML model on the training data. Later, at runtime during another user session, the user execution of a set of operations can be used to infer other events or sequences that should occur next and to replay those events or sequences automatically. Consequently, a user of a software application can initiate only a few manual operations and then allow the machine to complete a workflow automatically, interacting via the browser with the same software application.

Figure 7C:
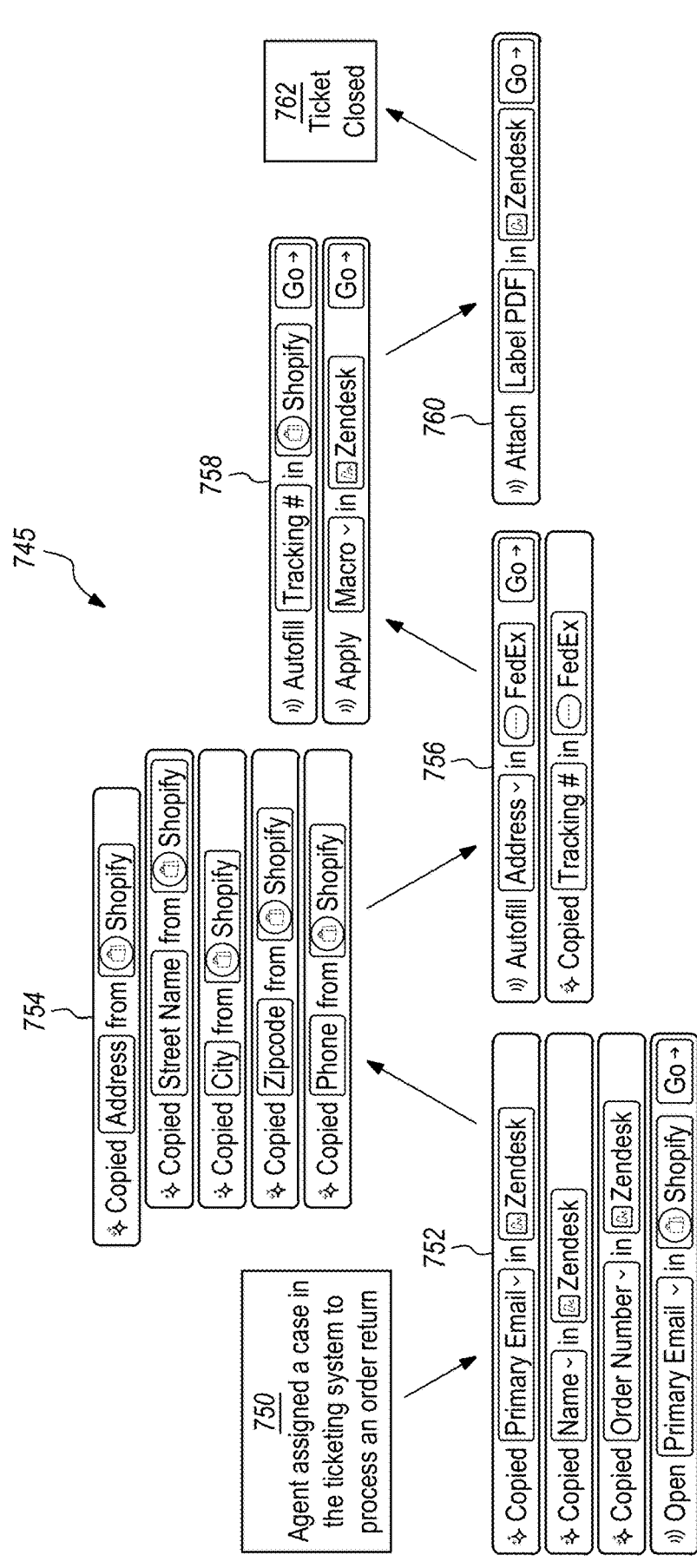
FIG. 7C illustrates a sequence of user actions corresponding to multiple sub-tasks in multiple web-based applications that can be captured as a single automation in training data to train a machine learning model.

FIG. 7C illustrates a sequence of user actions corresponding to multiple sub-tasks in multiple web-based applications that can be captured as a single automation in training data to train a machine learning model. An example workflow 745 begins at block 750 at which an agent is assigned a case in a ticketing system to process an order return. To act on this case, the agent interacts with browser 114 of agent computer 110 (FIG. 1) to conduct a first set of operations 752, comprising copying a primary email address in a ZENDESK ticket, copying a name in Zendesk, copying an order number in Zendesk, and opening a page in a SHOPIFY application based on the primary email.

The agent then switches applications using the browser 114 and conducts a second set of operations 754, comprising copying an address from Shopify, which could include individual copy operations for street name, city, ZIP code, and phone number. The agent next directs the browser 114 to a FEDEX application and conducts a third set of operations 756, comprising auto filling an address and copying a tracking number that the FedEx application generates. The agent returns browser 114 to Shopify and Zendesk to conduct a fourth set of operations 758, including auto-filling the FedEx tracking number in Shopify and applying a macro in Zendesk. Finally, at operation 760, the agent attaches a shipping label PDF to the ticket in Zendesk and closes the ticket at operation 762.

The complete sequences of operations of workflow 745 require numerous mouse clicks and context switching between different applications. Embodiments of the present disclosure can capture all the operations that have been described for this example as a single automation, enabling it to be replayed via the browser 114 with all the different applications to move data more rapidly between the applications to complete a task or ticket. Furthermore, the techniques of the present disclosure can capture variations in the foregoing workflow. Thus, at different times, depending on the nature of a ticket, an agent who is assigned a case in a ticketing system to process an order return could complete the task using a variation of the steps shown above. The techniques of the present disclosure can capture and automate each variation of the same general task by observing differences in web page navigation, UI element selection, copy operations, paste operations, auto-fill operations, and so forth.

2.2 Example Event Objects

TABLE 1 illustrates examples of events that the system can be programmed to detect and act on.

| Event Name | Event Type | Objects and Properties |
|---|---|---|
| Click Event | Browser | Event Type, Common Properties, Current Tab Object properties, Element Metadata Object properties, Event Metadata Object properties, Button (a number that corresponds to buttons on a mouse or other pointing device), Coordinates including X, Y values for offsets, client, page, and screen, and Workstream Selectors |
| Copy Event. A copy is defined when a user uses command-C, right-click copy or edit-copy. | Browser | Event Type, Common Properties, Current Tab Object properties, Element Metadata Object properties, Event Metadata Object properties, and Workstream Selectors |
| Copy from Collection URL. An event for when a URL is copied from a collection title. | Custom | Event Type, Common Properties including Collection ID, Collection Title, Collection URL, Current Tab Object properties, Element Metadata Object properties, Event Metadata Object properties |
| Copy From Pinpad Event | Custom | Event Type, Common Properties including Field Label and Field Source, Current Tab Object properties, Element Metadata Object properties, Event Metadata Object properties, and Workstream Selectors |
| Dropdown Event | Custom | Event Type, Common Properties Current Tab Object properties, Element Metadata Object properties, Event Metadata Object properties, Value (the value chosen in a dropdown menu) |
| Hotkey Event | Custom | Event Type, Common Properties including Collection ID, Collection Title, Collection URL, Current Tab Object properties, Element Metadata Object properties, Event Metadata Object properties, Source ("keystroke"), Meta values for key, keycode, shiftKey, ctrlKey, altKey, metaKey, shiftKey, and Workstream Selectors |
| Idle Event Keypress Event | Custom | |
| Paste Event. A paste is defined when a user uses command-V, right-click paste, menu-edit-paste. | Browser | Event Type, Common Properties, Current Tab Object properties, Element Metadata Object properties, Event Metadata Object properties, Workstream Selectors, Copy Source Object (details for the copy element source), Recorded Events (tracked events that immediately precede the paste), Source URL (URL of source of copy for this paste) |
| Radio Button Event | Custom | Event Type, Common Properties, Current Tab Object properties, Element Metadata Object properties, Event Metadata Object properties, Value (the value chosen via a radio button selection) |
| Relay Clicked | Custom | Event Type, Common Properties including Relay Type (suggested or side panel) and Order (visual order of relay on screen), Current Tab Object properties, Element |

TABLE 1-continued illustrates examples of events that the system can be programmed to detect and act on.

| Event Name | Event Type | Objects and Properties |
|---|---|---|
| | | Metadata Object properties, Event Metadata Object properties, Workstream Selectors |
| Scroll End Event | Browser | Event Type, Common Properties, Current Tab Object properties, Element Metadata Object properties, Event Metadata Object properties |
| Select Double Dash | Custom | Event Type, Common Properties including Copy Source and Source URL, Current Tab Object properties, Element Metadata Object properties, Event Metadata Object properties |
| Switch App. An event for when the user switches to a non-browser app | Browser | Event Type, Common Properties, Current Tab Object |
| Tab Event. The event is captured when the user opens a new tab or clicks on an existing tab, or when the URL in a tab changes | Browser | Event Type, Common Properties, Current Tab Object |
| URL Navigation | Browser | Event Type, Common Properties including total number of tabs and total number of windows, Current Tab Object properties, Element Metadata Object properties, Event Metadata Object properties |

2.3 Example Properties

In an embodiment, the default properties included on every event are: Active Ticket ID, Browser, Browser Version, Current Pinpad ID, Distinct ID, Domain, Event Type, Extension Version, Favicon URL, Field ID (ID of related pin), Instance, Nth-Child Selector, OS, Placeholder, Timestamp, UID, URL, and URL Host.

In an embodiment, the default event metadata properties, which are included when available from browser or DOM events, are Meta Event Name, Source, Timestamp, and Workstream Variables. One or more of the foregoing can be captured optionally.

In an embodiment, the properties obtained for a current tab object are Active, Audible, Auto Discardable, Discarded, Favicon URL, Group ID, Heigh, Highlighted, ID, Incognito, Index, Muted Info, Muted, Pinned, Selected, Status, Title, URL, Width, and Window Id.

In an embodiment, the default element metadata properties, which are included when available, are: autocomplete ("on" or "off"), class, label, id, placeholder, name, data-* properties, and any other attribute of the target element. Optionally, these properties can include fieldID (ID of a related pin), innerText, and label.

Workstream selectors can be captured as an array of selectors in priority or specificity order. These are available on events that have a "target" element.

TABLE 2 illustrates examples of event attributes, values, and descriptions of the attributes, for one embodiment; other embodiments can define different attributes of events.

TABLE 2

EXAMPLE EVENT ATTRIBUTES

| Attribute | Example Value | Description |
|---|---|---|
| active | true | Flag specifying whether this event is actively associated with one or more actions |
| activeTicketid | 165 | Ticket number of an issue tracking system with which this event is associated |
| audible | false | Flag specifying whether the event was audible |
| autoDiscardable | true | |
| currentPinpadID | 165 | Identifier of a pin pad of the system |
| currentTab: { attributes of a tab } | | |
| distinctID | 19ea9b7b-dfdf-4dfd-aa56-0d8a713d9f11 | Unique system ID for the event |
| eventType | click_event | Type of event |
| favIconUrl | https://ssl.gstatic.com/translate/favicon.ico | URL of an icon |
| groupID | −1 | |
| height | 1294 | |
| highlighted | true | |
| id | 1336308316 | Page identifier of a web page of the application in which the event occurred |
| incognito | false | Flag specifying whether the event occurred in a private browsing session |
| index | 1 | |
| instance | dev-8flow | Instance of a system server that was running when the event occurred. |
| isPrelayEvent | false | |
| nthChildSelector | nth-child(2)>: nth-child(2) | |
| OS | Mac OS | User operating system |
| parsedURL | { URL, variables broken out } | JSON block specifying sub-attributes of a URL to enable associating events with tenants or instances of a multi-tenant web application, for example. Importantly, tracking and using these attributes enables training models that are customized to particular tenants or instances, while still leveraging community-wide data. |
| pinned | false | |
| selected | true | |
| source | mouse | Type of user action that produced the event |
| status | complete | |
| timestamp | 2024-02-07T19:55:32.276Z | Date and time of the event |
| title | Ticket: need to return order 00000157 | Title of a page on which the event occurred |
| uid | oCnBs9gkuXcrrUfBqBHK3Fyjef2 | De-identified but unique identifier of a user machine or account |
| url | https://translate.google.com .... | URL at which the event occurred |

TABLE 2-continued

EXAMPLE EVENT ATTRIBUTES

| Attribute | Example Value | Description |
|---|---|---|
| urlHost | translate.google.com | Host service associated with the event |
| version | 1.11.74 | A version of the processing system in use when the event occurred |
| width | 1280 | |
| windowID | 1336308036 | |

3. Execution Example Using Graphical User Interface

Figure 8A:
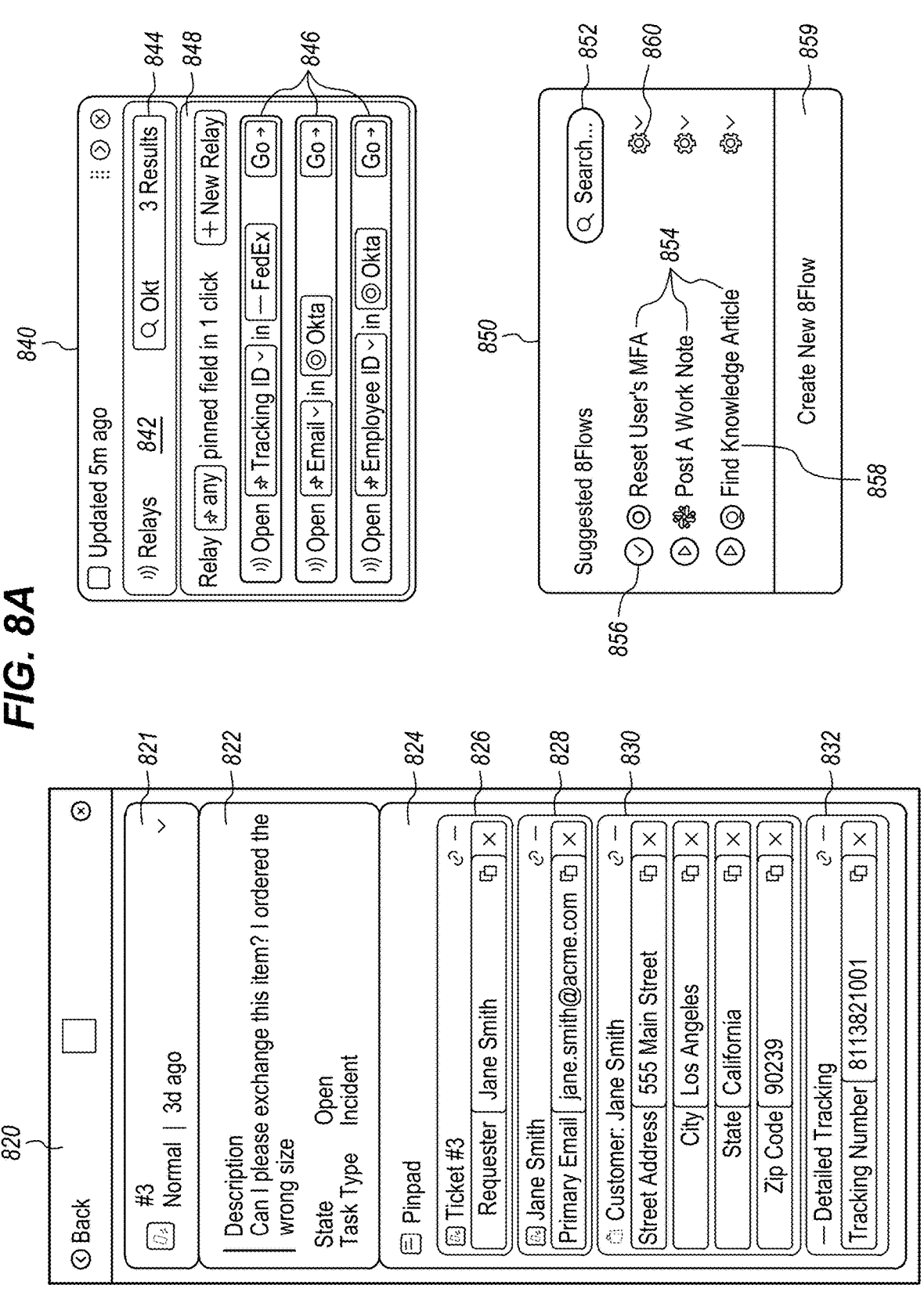
FIG. 8A illustrates examples of an extension panel, a relay panel, and a suggested flows panel that the browser extension may be programmed to generate and display over a web page of a web-based application.

FIG. 8A illustrates examples of an extension panel, a relay panel, and a suggested flows panel that the browser extension may be programmed to generate and display over a web page of a web-based application. In an embodiment, the browser extension 116 is programmed to generate and display one or more of the extension panels, relay panels, and suggested flows panels superimposed over a GUI or web page of a web-based application.

In an embodiment, an extension panel 820 comprises a ticket identifier 821, a description panel 822, and a dynamic, extensible pin pad 824 comprising a plurality of data panels 826, 828, 830, and 832. In an embodiment, description panel 822 displays metadata associated with a particular stored automation, such as a description, state, and task type. In the example, the description is "Can I please exchange this item? I received the wrong size." The state is "Open," and the task type is "Incident." Other embodiments can use other specific data values. Embodiments can streamline how an agent moves between tabs; the browser extension 116 is programmed to always display the extension panel 820, allowing users to access key ticket information regardless of the web application they are viewing. Consequently, users do not need to reopen a ticketing application to obtain the information or perform standard actions to resolve a ticket.

As further described, the browser extension 116 is programmed to automatically pin key fields and field values to the extension panel 820 without user action. Embodiments can be programmed to update a machine learning model based on user action over time to effectively learn what the user pins and uses more often. Pinned fields and values can be collected and reused across systems or web applications without specific integration with those systems or applications. In an embodiment, each field shown in the extension panel 820 is an active hyperlink so that a browser tab from which the field came can be accessed just by clicking the field in the extension panel. In response, the browser extension 116 is programmed to cause the browser to change focus to the correct tab of the application associated with the field.

In an embodiment, a relay panel 840 comprises a title bar 842 having a search box 844, and a relay subpanel 848 that displays one or more previously defined relays 846. Each of the relays 846 comprises an automation that the browser extension 116 has learned, alone or in conjunction with the workflow automation application 122 and machine learning model 124 (FIG. 1). Each relay 846 comprises a stored association of actions, fields, and applications that can be selected to run a repetitive operation on behalf of the user. Consequently, user selection of a relay 846 can execute an action in a web application using a single click rather than the many to dozens of clicks of prior approaches, as noted in the Background section.

Over time, execution of the workflow automation application 122 and machine learning model 124 can instruct the browser extension 116 to create and store one or more flows based on the relays 846. Thus, each automation represented in a relay can become more advanced over time under programmatic control of an advanced, user-driven, AI-powered robotic process automation engine consisting of the workflow automation application 122 and machine learning model 124. By selecting a flow in the suggested flow panel, the agent can allow the browser extension 116 to execute fully automated, complete workflows.

In an embodiment, a suggested flow panel 850 comprises a search box 852 and one or more flow rows 854 that identify flows. Each row 854 comprises a selection widget 856, a name 858, and a configuration widget 860. The selection widget 856 is programmed to receive input from the agent computer 110 specifying whether to use or activate a flow corresponding to the name 858. When a row is not selected, the selection widget 856 can be clicked to expand and show a flow description. The configuration widget 860 is programmed to receive input from the agent computer 110 to change the applications, fields, and/or actions of a flow. In an embodiment, the suggested flow panel 850 also comprises a CREATE FLOW or similarly named widget 859, which, when selected, initiates a dialog, wizard flow, or series of menus and panels to enable the agent computer 110 to manually define a flow.

In an embodiment, all the data visualized in the extension panel 820, relay panel 840, and suggested flow panel 850 corresponds to data digitally stored in rows of tables of a relational table schema of the database 128. For example, for the extension panel 820, the data shown in ticket identifier 821 can correspond to a row in a master ticket table, the description panel 822 can comprise attribute values of that row, and the pin pad 824 can correspond to a plurality of pointers in the same row to other rows in a data panel table that store the data for the plurality of data panels 826, 828, 830, and 832, where each of the data panels corresponds to a different row of the data panel table. Similarly, the relay panel 840 can be backed by a relay table in the database 128, where the relay table has a plurality of rows, each corresponding to one of the relays 846, and where those rows store attribute values identifying the actions, fields, and applications that comprise a relay. Further, a flow table in database 128 can back the suggested flow panel 850, where each row in the flow table stores attribute values for row 854, such as a plurality of pointers to rows in the relay table. Thus, a flow corresponds to a stored association of a plurality of the relays 846 as previously described.

FIG. 8B illustrates an example of a graphical user interface of a web-based software application in association with an extension panel that implements aspects of the present disclosure. For purposes of illustrating a clear example, FIG. 8B shows a GUI 802 that has been generated via browser interaction with the commercially available ZENDESK application, but other embodiments can interoperate with other web-based or SaaS-based online applications that browsers can use. GUI 802 comprises a toolbar 804, a task panel 806, a chat panel 808, an interaction panel 810, and a SUBMIT button 812. Other applications may offer different visual or graphical panels, tools, or widgets.

In the example, the toolbar 804 comprises a plurality of vertically aligned buttons, links, or other widgets which, when selected using a pointing device, access main functions of the platform such as ticket management, user management, statistical data, and configuration functions. In an embodiment, task panel 806 identifies a particular request or ticket that has been assigned to a customer service representative or another user for action, with basic details about the requester, user accounts that are assigned to or following the ticket, tags specifying the nature of the ticket, ticket type, priority, and linked issues. In an embodiment, chat panel 808 provides a workspace for conducting a live electronic chat dialog with a customer or other party that submitted a request or needs assistance. The chat panel 808 can be associated with a reply panel 809 that is programmed to receive a written reply from the agent or user who is interacting with the customer or requester. In an embodiment, interaction panel 810 comprises widgets, data, and selectable elements that are programmed for interacting with other representatives concerning the customer issue. The SUBMIT button 812 can be programmed to persistently save a record of the state of the ticket in a digital database.

In an embodiment, an extension panel 820 is visually displayed superimposed over and floating on the GUI 802. Browser extension 116 (FIG. 1) generates and displays the extension panel 820 using browser functions or services. In an embodiment, browser extension 116 is programmed to display the extension panel 820 with a description panel 822 and a dynamic, extensible pin pad 824 comprising a plurality of data panels 826, 828, 830, and 832. In an embodiment, description panel 822 displays metadata associated with a particular stored automation, such as a description, state, and task type. In the example, the description is "Can I please exchange this item? I received the wrong size." The state is "Open," and the task type is "Incident." Other embodiments can use other specific data values.

In an embodiment, the pin pad 824 is programmed to show, associate, and store together a plurality of data items that have been captured, copied, or pasted from different parts of a form or workflow that the GUI 802 or its underlying application exposes or provides. Each data panel 826, 828, 830, 832 can have a different size or number of attributes and values and a different title. For example, data panel 826 is titled "Ticket #3" and specifies a requester, data panel 828 is titled "Jame Smith" and specifies an email address, data panel 830 is titled "Customer: Jane Smith" and contains address details for the customer, and data panel 832 is titled "Detailed Tracking" and contains a tracking number associated with a shipper application such as the online FEDEX application. Each data item in a data panel can represent a user interaction with a task or workflow within the GUI 802 that could be related, reused, or part of a sequence of events or actions associated with completing the task or workflow.

Thus, embodiments are programmed to streamline how an agent moves between tabs. The extension panel 820 is automatically displayed superimposed over web pages that the agent browses with a web browser, so the extension panel is omnipresent during the processing of a request or ticket. In an embodiment, key information associated with a ticket in an issue tracking or ticket management system is associated together and digitally stored in a ticket record in the database 128. The extension panel 820 graphically displays or visualizes a ticket record and/or the key information associated with a ticket. Consequently, after browsing from the ticketing system to another application, the user never needs to reopen the ticketing system to copy information or perform the standard actions to resolve a ticket. Instead, the key information is associated with the ticket record and shown in the extension panel 820 as one or more pinned fields, values, attributes, or panels, and data can be selected from the extension panel and filled automatically into a field of another application.

In an embodiment, key fields are automatically visually pinned in the extension panel on behalf of the user as the user interacts with the ticketing system. Embodiments are programmed to learn from agent interactions with the GUI of a SaaS application over time so that the fields adjust based on what the user pins and users more often. Further, embodiments are programmed to suggest editable shortcuts driven by an AI-powered RPA engine. This automates steps in the workflow, such as "open Tracking ID in FedEx." An automation can execute repetitive operations on behalf of the user to turn a multi-click process into one click. Workflows can be saved for powerful automations for reuse. The ticket can be resolved without returning to the ticketing system. Pins can be collected and reused across systems with no integrations needed. Also, fields and systems are hyperlinked, so tab navigation becomes seamless directly from the panel.

Figure 9:
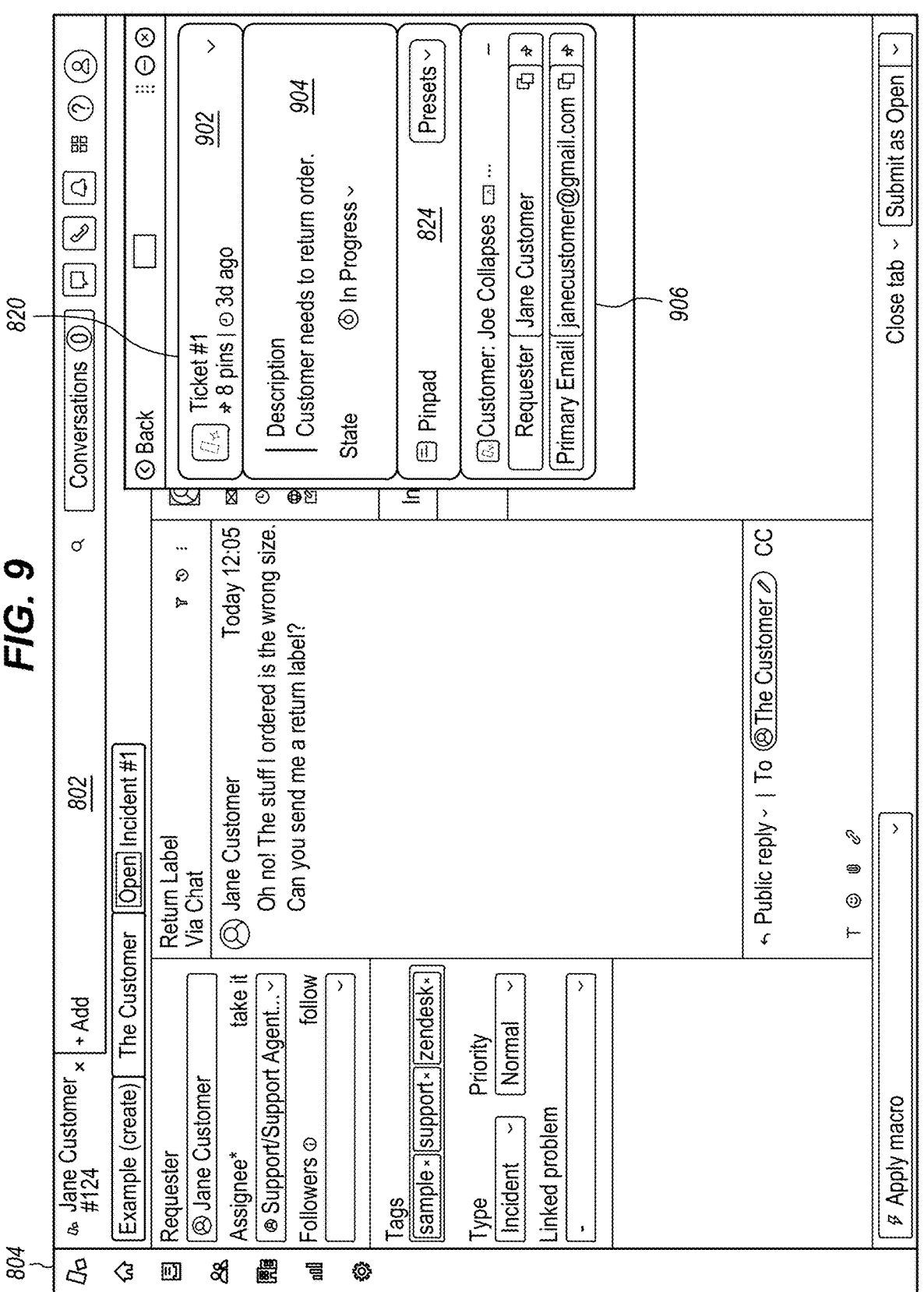
FIG. 9 illustrates an example of initially creating pinned data associated with user action in an application.

FIG. 9 illustrates an example of initially creating pinned data associated with user action in an application. GUI 802 has the same elements as shown in FIG. 9, and the extension panel 820 is displayed superimposed over the GUI. In this example, the assigned agent has recently begun processing a ticket in Zendesk. When the agent accesses the ticket in Zendesk by browsing a web page, the browser 114 automatically creates and stores a document object model (DOM) in the memory of agent computer 110 after downloading HTML for the web page and rendering the web page with GUI 802. The browser extension 116 is programmed to detect data displayed on the screen by programmatically reading and traversing the DOM and to automatically instantiate and display the extension panel 820 based on data obtained from the DOM. For example, the browser extension 116 is programmed to automatically assign the name "Ticket #1" to data panel 902 of the extension panel 820 based on finding "Incident #1" in the DOM. In an embodiment, the attributes of the top-most data panel 902 of extension panel 820 correspond to a record of a ticket or automation in database 128 (FIG. 1). The browser extension 116 is also programmed to create and store a second data panel 904 with a description of the ticket, and to create and store a pin pad 824 in association with the ticket represented in data panel 902. The extension panel 820 can also show one or more other data panels 906 that are automatically populated with attributes and values based on traversing the DOM.

Figure 10A:
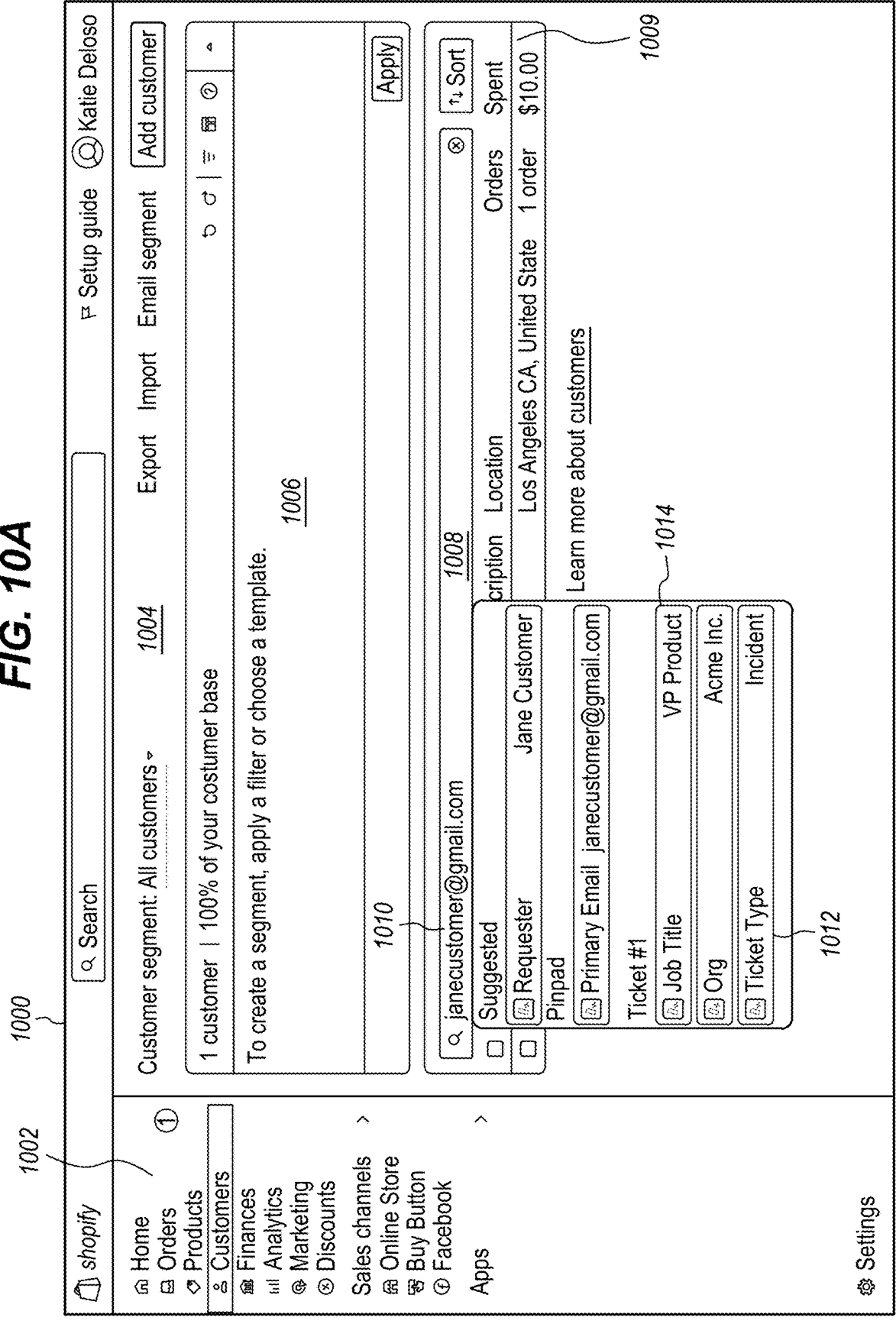
FIG. 10A illustrates an example of a browser extension generating and displaying suggestions of pinned data for entry in fields of a web-based application.

FIG. 10A illustrates an example of a browser extension generating and displaying suggestions of pinned data for entry in fields of a web-based application. In an embodiment, the browser extension 116 is programmed to determine, for each web-based application that the browser 114 accesses, based on the DOM of each web page, one or more form fields or UI widgets of the web page that may correspond to data items in pinned data panels of the extension panel 820. If a match is found, the browser extension 116 is programmed to generate and display a suggestion panel that identifies values that could be automatically entered in the form field or UI widget.

In the example of FIG. 10A, browser 114 has navigated to a web page of the Shopify online application, which has returned dynamic HTML that the browser has rendered as the web page 1000. In an embodiment, the web page 1000 comprises a menu bar 1002, a segment panel 1004, a customer panel 1006, and a search box 1008. In an embodiment, the menu bar 1002 comprises a vertically arranged set of links, buttons, or other UI widgets that, when selected, cause the application to provide access to a respective plurality of different named functions or actions. The segment panel 1004 comprises a GUI widget for selecting a segment of customers for inspection and processing. Attributes of the selected segment can be displayed in the customer panel 1006, and the search box 1008 can be displayed near table 1009, showing one or more records of customers that are in the selection specified via the widget of the segment panel.

In the example, an email address 1010 can be entered in the search box 1008. The browser extension 116 is programmed to determine from the DOM that the search box 1008 can receive an email address. In response, based on data panels of the extension panel 820 or other data in the database 128, the browser extension 116 is programmed to generate and display a suggestion panel 1012 having one or more data panels 1014 corresponding to data panels of the extension panel. The effect of the suggestion panel 1012 is to display data available to the browser extension 116 that could be filled automatically into the search box 1008. In an embodiment, the browser extension 116 chooses the value representing the best match of the available data to the DOM element corresponding to the search box 1008 and automatically fills in a value like the email address 1010. In an embodiment, the suggestion panel 1012 is displayed just below or otherwise near the field corresponding to search box 1008; screen position data can also be obtained programmatically from the DOM. With this arrangement, the agent can rapidly view values in the data panels 1014 of the suggestion panel 1012 and then click on one of the values to select that value. In response, the browser extension 116 is programmed to automatically fill the selected value in the field for search box 1008.

Figure 10B:
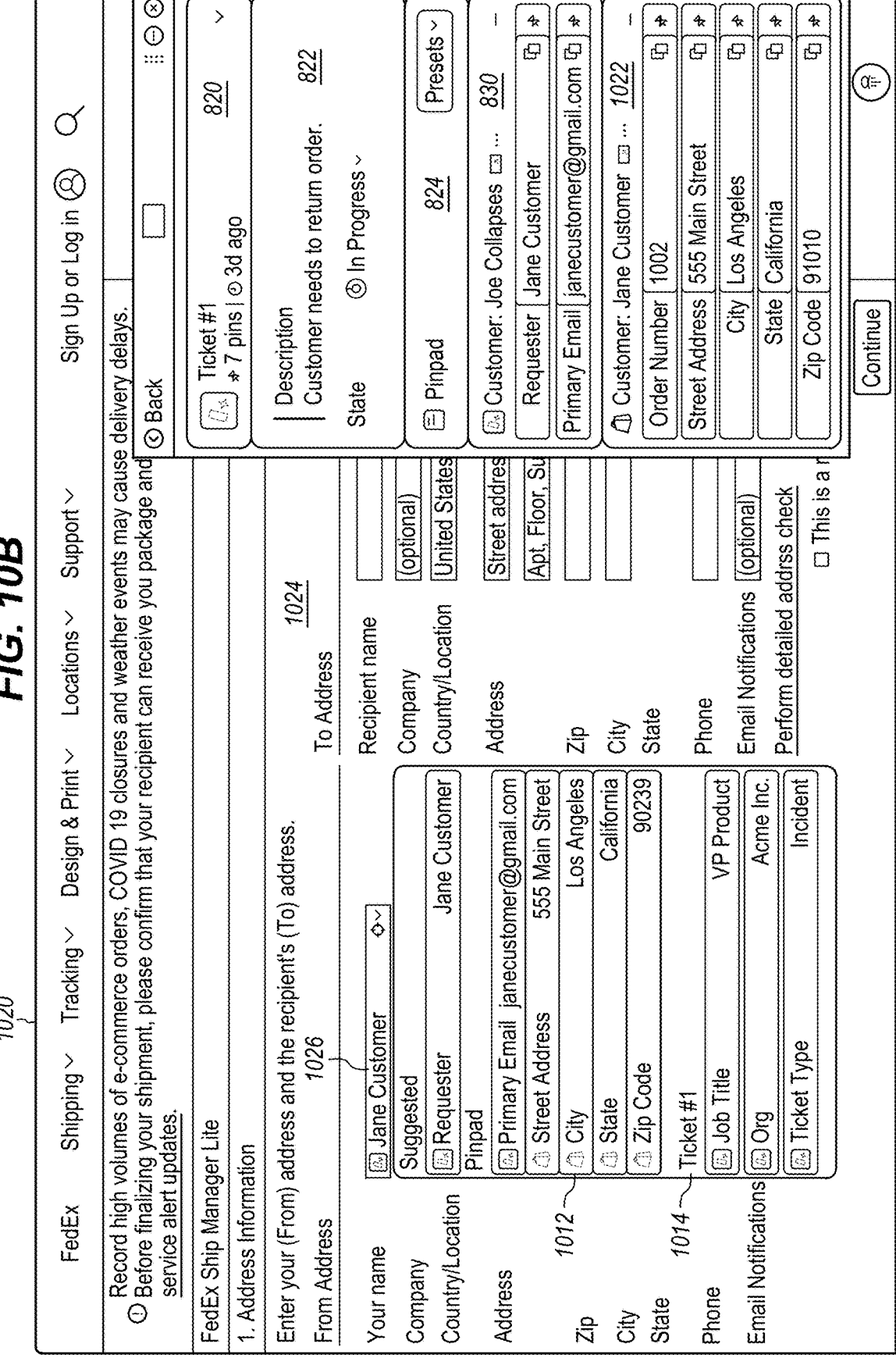
FIG. 10B illustrates an example of a browser extension generating and displaying suggestions of pinned data for entry in fields of a web-based application different from that of FIG. 10A.

FIG. 10B illustrates an example of a browser extension generating and displaying suggestions of pinned data for entry in fields of a web-based application different from that of FIG. 10A. In FIG. 10B, the browser 114 of agent computer 110 has navigated to and accessed the FedEx online application, which has returned dynamic HTML that has been rendered as a GUI 1020. In the example, the GUI 1020 has a shipping address panel 1014 programmed with form fields to enter a name, company, address, and related data, which the FedEx application can use to generate a shipping label. The browser extension 116 is programmed to display the extension panel 820 superimposed over the web page with GUI 1020, and the extension panel has data similar to the previous examples.

In the example of FIG. 10B, under program control, the browser extension 116 has identified, from the DOM of the web page, a field 1026 titled "Your name" that should receive a data value from one of the data panels pinned to the extension panel 820. The browser extension 116 is programmed to generate and display, superimposed over the web page 1000, the suggestion panel 1012 with one or more data panels 1014 of values that could fit the field 1026. In an embodiment, the suggestion panel 1012 is displayed just below or otherwise near field 1026; screen position data can also be obtained programmatically from the DOM. With this arrangement, the agent can rapidly view values in the data panels 1014 of the suggestion panel 1012 and then click on one of the values to select that value. In response, the browser extension 116 is programmed to automatically fill the selected value in the field 1026.

In this manner, the browser extension 116 can dramatically reduce the work of an agent who must move between different applications to conduct the work associated with a single issue, ticket, or request originating in a different first system, like Zendesk. Rather than constantly re-entering the same data values in multiple different systems necessary to resolve a request or ticket or repeatedly copying and pasting values, the browser extension 116 automatically manages and executes the process of determining which values should be pinned to a ticket record represented in the extension panel 820 and which values should be suggested for automatic filling into fields of a new web page.

FIG. 10C illustrates another GUI with the extension panel and an automatic data update in the extension panel. As with prior examples, the extension panel 820 is displayed super-imposed over a web page 1030 of the FedEx system. In a previous step of the shipping process, the FedEx system generated a shipping label confirmation page with a tracking identifier. In the example of FIG. 10C, the tracking identifier 1034 has been automatically pinned to the extension panel 820. Assume that the customer received a shipping label and returned goods to a merchant as an extension of the previously discussed examples. The agent could investigate the status of a ticket and direct the browser 114 to the web page 1030 of FIG. 10C and receive a suggestion to enter the tracking identifier 1034 in a search field. In response, the FedEx system would respond with the tracking history and delivery status of a completed delivery from the customer, as seen on web page 1030. In this manner, the extension panel 820 provides a visualization of persistently stored ticket data that can be recalled and reused in different applications or web pages without manual data re-entry.

Figure 11:
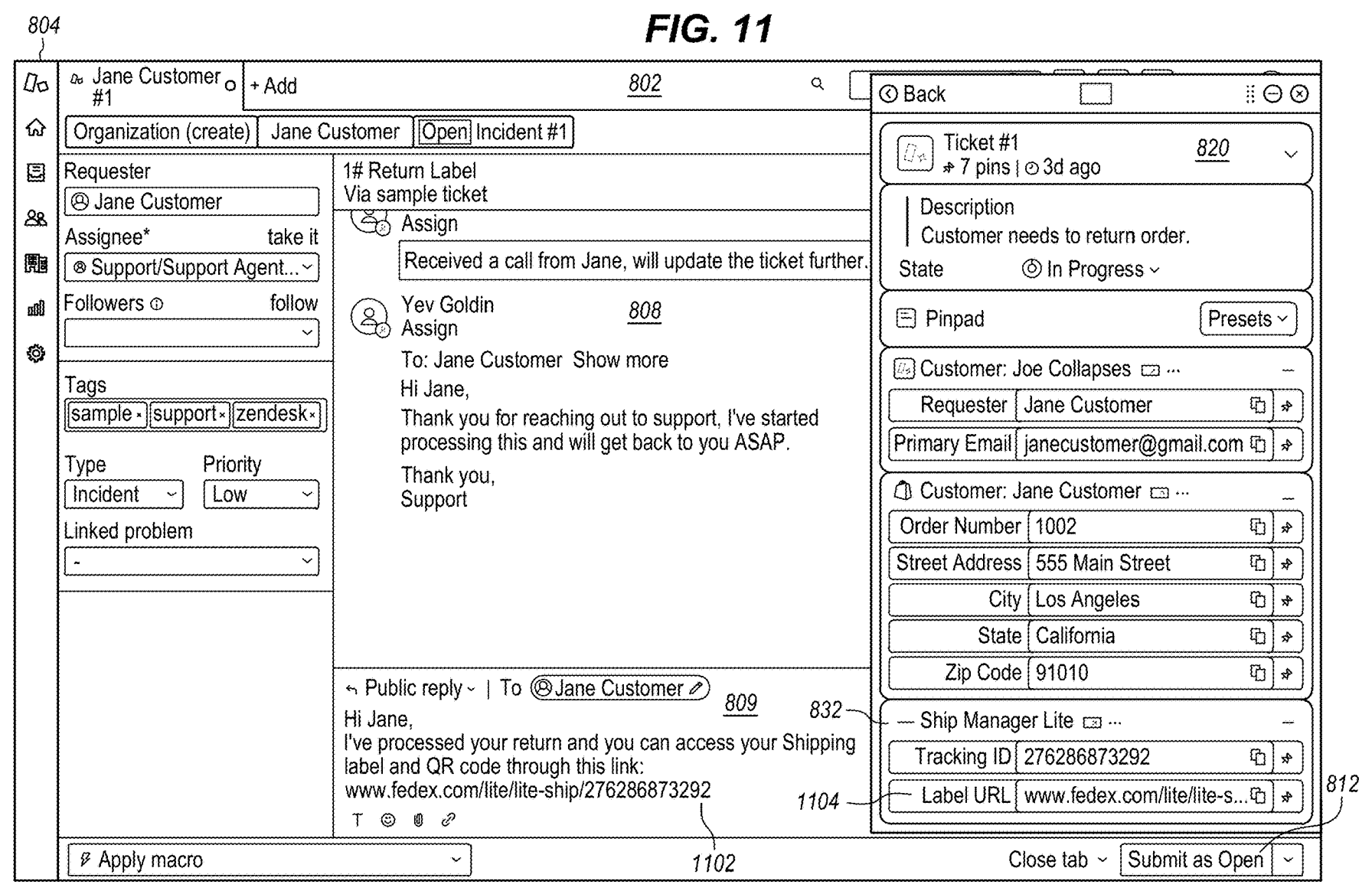

FIG. 11 illustrates the GUI of FIG. 8B and FIG. 9 with updates to the extension panel and a reply from the agent. FIG. 11 represents a state in processing the request or ticket at which the agent has created a return address label for the customer. In response to creating a return label via the FedEx online application, the browser extension 116 has automatically detected the tracking ID and URL of a return label and updated the extension panel 820 in data panel 832 by pinning the URL 1104 of the return label. Therefore, in reply panel 809, the agent has composed, but not sent, a reply message to the customer specifying the URL for the return label. The URL can be placed in the reply message of reply panel 809 automatically by selecting the pinned value of the URL 1104.

FIG. 12 illustrates the GUI of FIG. 11 after the agent has sent the reply message to the customer. In this example, reply panel 809 shows the reply message 1102 as sent and not in the composing state. At this stage, the underlying ticket in the Zendesk system has transitioned to a Closed state. In response, the browser extension 116 is programmed to close the extension panel 820 and display a user-specific panel 1202 comprising a pin pad 1204. "User-specific" means that panel 1202 shows data customized for the user account of the then-current agent or other user who is interacting with the application represented in GUI 802. In an embodiment, the pin pad 1204 comprises a plurality of pinned data panels 1206, 1208 that can show one or more URLs linked to knowledge base data or support information. In this manner, the user retains visual context and awareness that the browser extension 116 is running rather than seeing nothing. In an embodiment, the knowledge base data comprise one or more cross-system knowledge base suggestions based on the current ticket type and articles that the agent assigned to the current ticket previously used.

The content of pin pad 1204 can be specified via configuration data of the workflow automation application 122, records in database 128, or other sources. It can vary based on the agent, user account, agent computer 110, or enterprise in which the agent or user works.

Figure 13A:
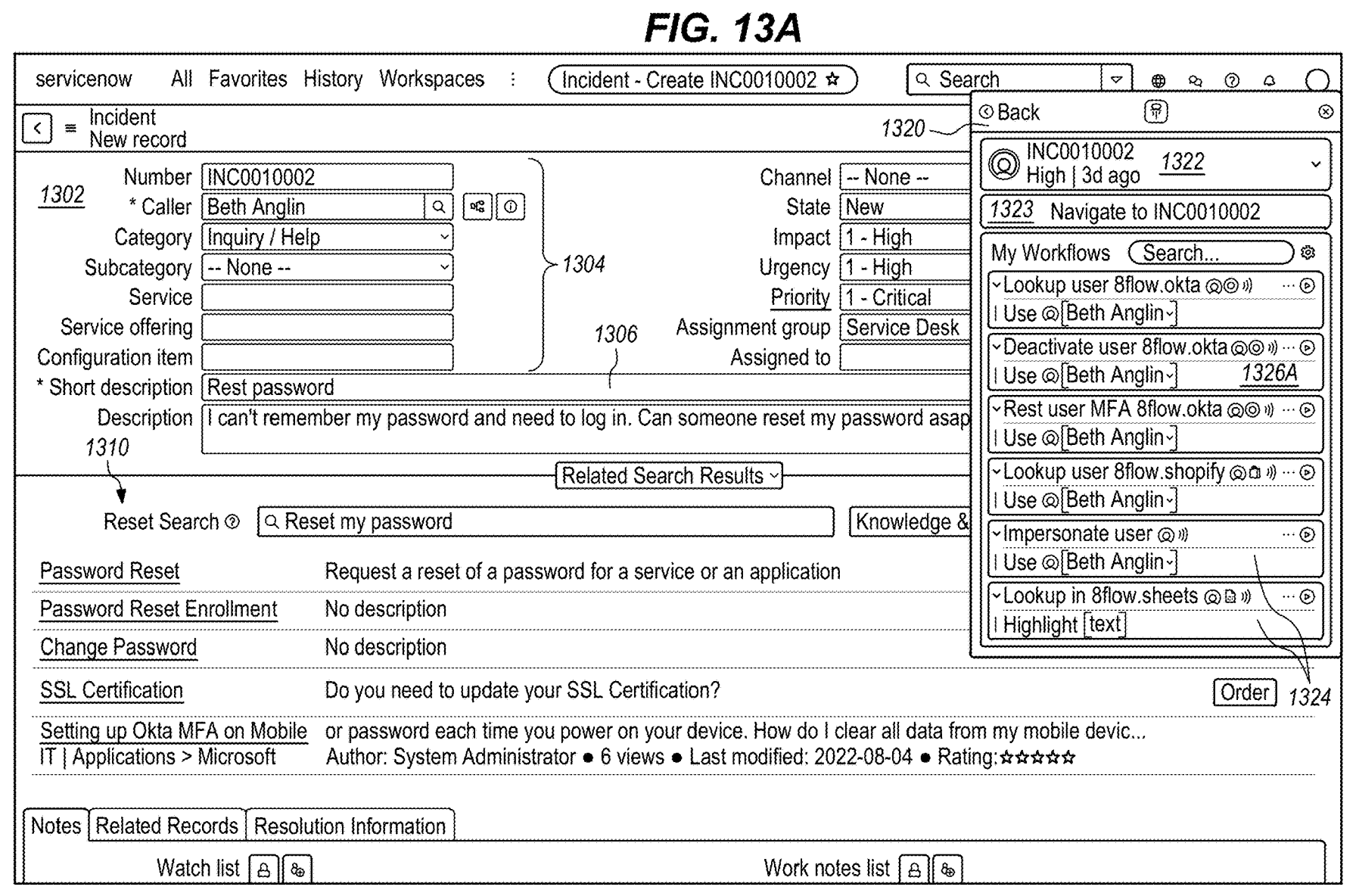
Figure 13B:
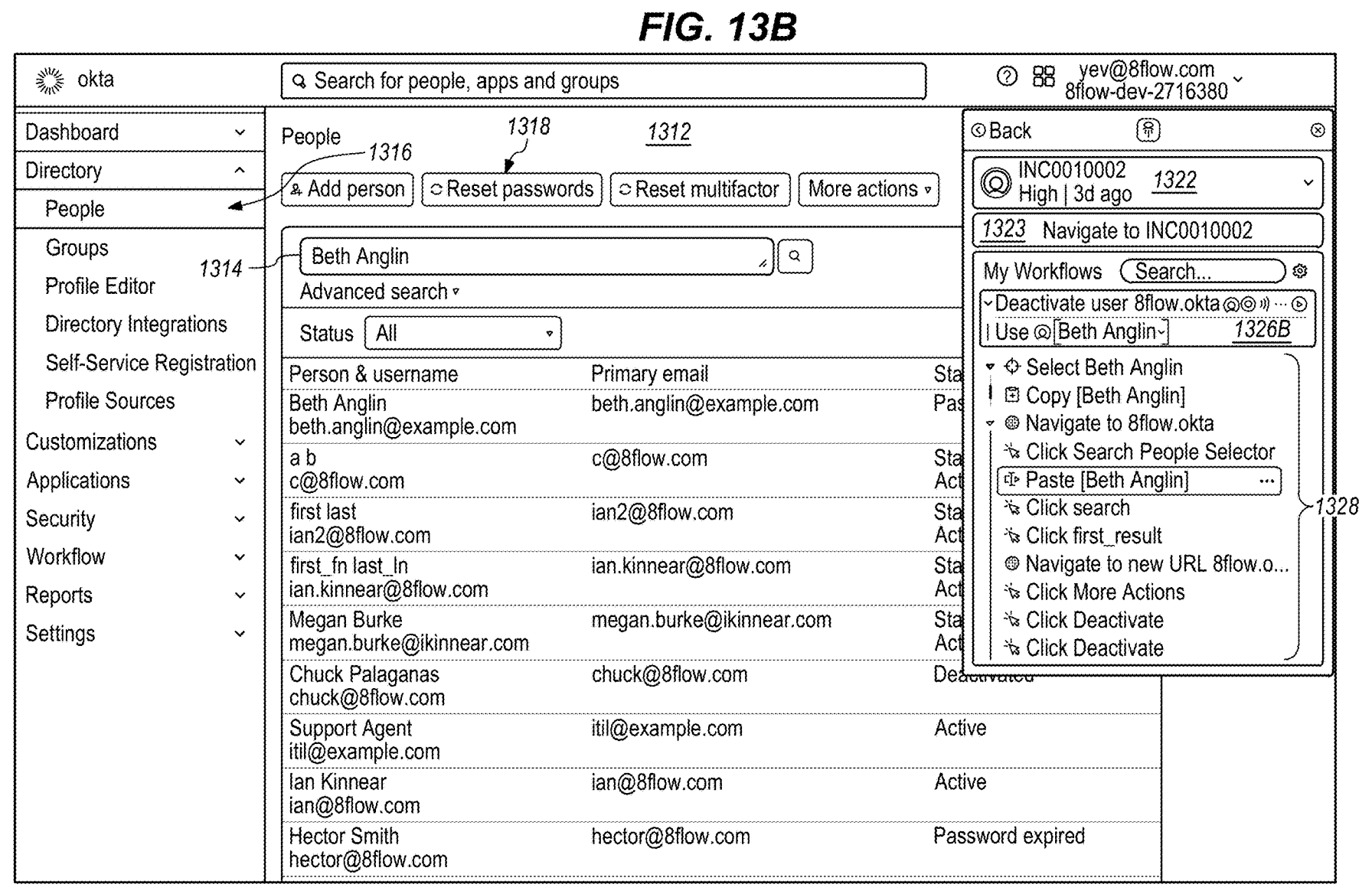
Figure 13C:
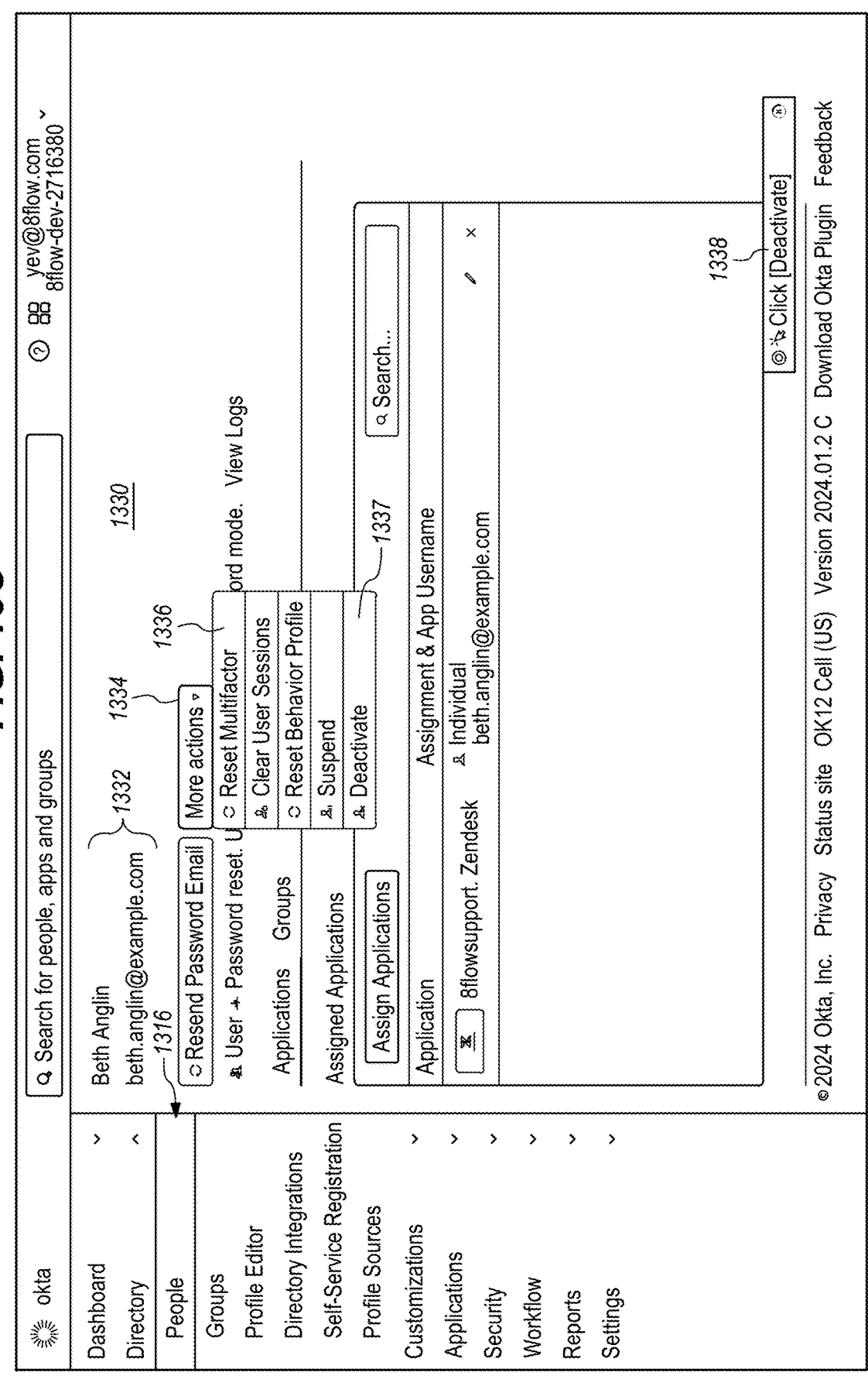

FIG. 13A, FIG. 13B, FIG. 13C, and FIG. 13D illustrate examples of graphical user interfaces that can be used in another embodiment. Referring first to FIG. 13A, in an embodiment, a web page 1302 corresponding to a new record of an incident has been generated by the ServiceNow application and rendered in a browser. The terms incident, ticket, case, and record can be interchangeable for purposes of the present description and the implementation of an embodiment. The web page 1302 comprises a plurality of widgets 1304 that are programmed to receive basic metadata details for an incident and description widgets 1306. A search panel 1310 displays results of related incidents based on the description in the incident and description widgets 1306. The specific form of the web page 1302 can vary in different embodiments and as the ServiceNow application is updated or changed by its provider. Thus, the specific elements of web page 1302 are not critical.

Under the control of the workflow automation application 122, an extension panel 1320 is displayed superimposed over the web page 1302. The extension panel 1320 comprises an incident identifier panel 1322, a link 1323, and a workflow panel having a plurality of rows 1324. The incident identifier panel 1322 comprises an incident identifier value that has been automatically populated from the widgets 1304. The link 1323 comprises a hyperlink identifying the same incident and, when selected via user input, redirects the browser 114 to the web page 1302 if a different web page is being displayed in the browser. Each row of the plurality of rows 1324 corresponds to a different workflow that has been previously identified, based on user events, and stored. Thus, each of the rows 1324 corresponds to a workflow that the workflow automation application 122 has automatically learned based on receiving and analyzing events that the extension panel 1320 has detected and relayed. Examples of processes for automatic, programmed learning of workflows are described herein in other sections.

Workflow 1326A is labeled "Deactivate user" and corresponds to a stored series of steps or actions in one or more web-based applications that collectively result in deactivating a user. Assume, for purposes of clearly explaining one operational example, and not as a limitation, that the workflow automation application 122 detects user input to select the workflow 1326A of the extension panel 1320. In response, the extension panel 1320 is programmed to update automatically to the form of the extension panel 1322 seen in FIG. 13B and to initiate replaying the stored actions and events of the workflow 1326A by programmatically instructing the browser 114 to access one or more web pages, enter data in widgets, select buttons or controls, or execute other functions of a web page that the browser is capable of executing.

The first step of the workflow 1326A is to execute an action in the Okta web-based application. Therefore, as an example, FIG. 13B shows a web page 1312 that the Okta application has generated and the browser 114 has rendered in response to a redirection instruction from the extension panel 1322 under the control of the workflow 1326A. The web page 1312 can comprise any combination of widgets corresponding to the functions of the web page, such as a list 1316 of links to functions, buttons 1318, and a text entry box 1314. In an embodiment, the extension panel 1322 comprises the same incident identifier as in extension panel 1320, the same link 1323 as in the prior extension panel, and an expanded workflow 1326B comprising a list of actions 1328 corresponding to the workflow 1326A. In this manner, the extension panel 1322 enables a user to see the forth-coming actions that the workflow will execute automatically. Further, in an embodiment, as the actions of the list of actions 1328 execute, the specific action that is currently executing is highlighted in the list.

The automatic execution of actions of a workflow can include instructing the browser 114 to access and render different web pages of the same application or a different application. Referring now to FIG. 13C, in an embodiment, the actions 1328 of the expanded workflow 1326B or extension panel 1322 have caused the browser to access and display a second web page 1330 of the Okta application. In an embodiment, the second web page 1330 comprises the list 1316 of links to functions, data 1332 identifying a user for which a deactivation operation is proceeding, and a pull-down menu widget 1334. In the example of FIG. 13C, the actions 1328 of the expanded workflow 1326B or extension panel 1322 have caused the browser to automatically, programmatically select the pull-down menu widget 1334, thereby rendering a list 1336 of selectable functions, and to automatically, programmatically select a Deactivate function 1337. In response, the extension panel 1322 generates and displays a step message 1338 on the second web page 1330; the step message specifies the step of workflow 1326B that the system is currently executing.

Figure 13D:
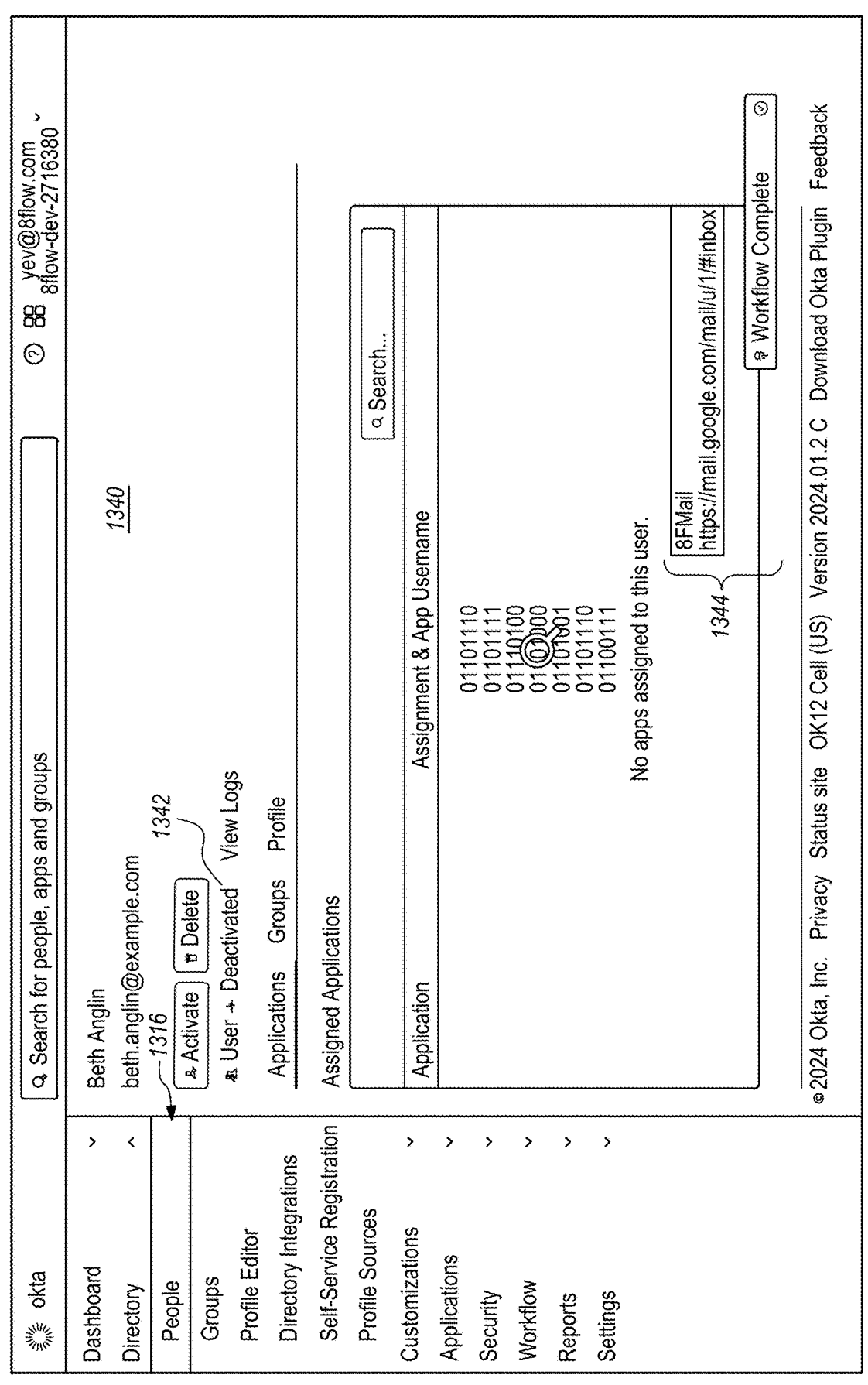

Referring now to FIG. 13D, in an embodiment, the actions 1328 of the expanded workflow 1326B or extension panel 1322, specifically selecting the Deactivate function 1337, have caused the browser to access and display a third web page 1340 of the Okta application. In an embodiment, the third web page 1340 comprises a list 1316 of links to functions and a status value 1342 confirming that the specified user has been deactivated. In an embodiment, the actions 1328 of the expanded workflow 1326B or extension panel 1322 conclude by causing rendering and displaying a second step message 1344 superimposed over the third web page 1340. In this example, the second step message 1344 indicates that the selected workflow is complete, and the user can close the corresponding ticket or take other actions.

Figure 14A:
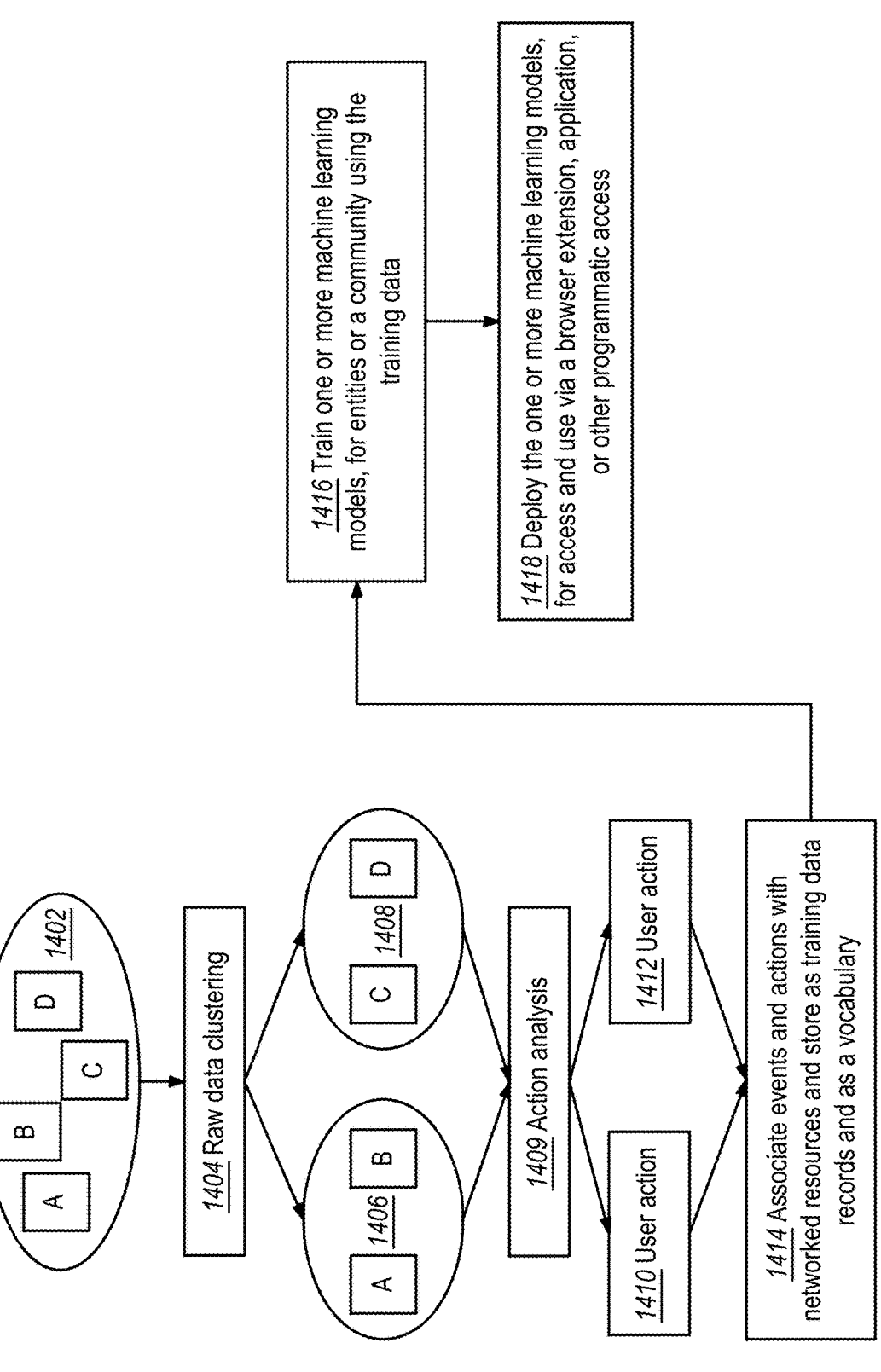

FIG. 14A, FIG. 14B, and FIG. 14C illustrate examples of programmed processes, of one embodiment, to train and use machine-learning models to automatically learn workflows in web-based applications from user events and to generate suggestions of workflows in response to sequences of user events or natural language input. In one embodiment, the workflow automation application 122 is programmed to execute the steps of FIG. 14A, FIG. 14B, and FIG. 14C. Referring first to FIG. 14A, in one embodiment, at block 1402, the workflow automation application 122 is programmed to receive a plurality of user events. For purposes of one clear example, user events are labeled A, B, C, and D. User events are collected automatically via the extension panel 820 as users navigate a website to accomplish a task. Examples have been given previously but can include click event, paste event, and navigation event. In the aggregate, the system can analyze the usage of many different users on a specific website. An example of this would be a support agent responding to a ticket and resetting a user's password. All events are captured initially as unstructured data, generally consisting of a timestamp, a website or URL, and an event type. Event data can be stored in the database 128.

At block 1404, the workflow automation application 122 is programmed to execute raw data clustering. For example, events A and B are assigned to cluster 1406, and events C and D are assigned to cluster 1408. Clustering can comprise inspecting all events of all users represented in the database for the same website and determining which sets of events occur repeatedly and, therefore, appear similar. In an embodiment, each cluster comprises from two to 10 events that have been observed, across multiple users, as repeatedly used in the same sequence and therefore associated.

At block 1409, the workflow automation application 122 is programmed to execute action analysis. Using data analysis at block 1409, the workflow automation application 122 is programmed to determine that certain combinations of user events are equivalent to a specific user action. For example, events A and B are found by analysis to be used to look up a user by the user identifier. Those events can be digitally stored in association with a named workflow titled "Lookup user by ID," represented in FIG. 14A as user action 1410. Or, events C and C are found by analysis to be used to reset a user's password and can be stored as a workflow named "Reset user password by id," corresponding to user action 1412. User actions 1410, 1412 correspond to higher-level views of sequences of events and are roughly equivalent to API calls. An association of a sequence of otherwise unstructured events to a user action comprises an item of structured data that can be stored separately in the database 128 and used to solve future problems.

In some embodiments, clustering at block 1404 and action analysis at block 1409 could be implemented by executing the inference stage of a commercial, trained, web application action-based machine-learning model over the events of block 1402 rather than using a programmed clustering algorithm and analysis steps. In some cases, supervised learning may be needed to label training data for such a model to ensure accurate results in classifying sequences of events as actions; supervised learning can be used to kick-start a model to achieve good results followed by unsupervised learning over time as further described for other blocks of the flow diagram. Or, one or more of the clustering at block 1404 and action analysis at block 1409 could be implemented by submitting data describing the events of block 1402 to a public LLM API, such as Open AI Operator or Claude Computer Use by Anthropic, with an engineered prompt that requests the LLM to identify an action to which the events correspond. Any of the foregoing implementations can be supplemented with manual labeling of events to associate the events with clusters or actions.

For example, a prompt to an LLM could specify three different events that are known to correspond to a particular event and then ask the LLM to assess thousands of other event records to identify any other events that are similar to the three events. Based on the output from that prompt, another prompt could request identifying sequences of events in the data that correlate to the same action(s) with which the first three events are associated. Or, the other events that the LLM indicates to be similar to the three events could be added to the training data in association with the same actions. In this manner, prompts to an LLM can be effectively used to synthesize new training data. An example prompt is: "I am going to share with you unstructured JSON data of a series of events that describe an optimal way to accomplish an action in the browser. I would like you to analyze these events and explain to me what they are trying to accomplish. Please group them any way you like and explain to me the limits of what you can determine."

An example partial response of an LLM to the foregoing prompt is:

"Based on the detailed sequence of browser events you've provided, it appears that the user is engaging in a multi-step process that involves using various applications and services to manage customer service tasks and perhaps communication of translation tasks as well. Here's a high-level analysis of the actions and possible sequences these events suggest: 1. Navigation and Interaction in Customer Service Platform (Zendesk) . . . a. Events: multiple tab activations and navigations in Zendesk, focusing on specific customer support tickets . . . b. Purpose: Managing customer service tickets, possibly viewing or responding to customer inquiries. The frequent activation of specific ticket tabs suggests repeated referencing or updating of information related to a particular customer issue . . . 2. Use of Google Translate Possible Sequence: 1. Review Ticket in Zendesk: The user starts by retrieving details of a ticket in Zendesk; 2. Translation of Communications: Text from the ticket or a proposed response is translated using Google Translate . . . ."

At block 1414, the workflow automation application 122 is programmed to associate one or more events and actions with networked resources and store the events, actions, and resource identifiers as training data records and as a vocabulary for use in other processing based on natural language. For example, after analysis at block 1409, the workflow automation application 122 is programmed to build a list of common websites and the specific user actions that are associated with these sites. Therefore, each website or URL can be associated with a plurality of specific user actions. In effect, this step defines a structured vocabulary that can be used to train a machine learning model or an API that can be used deterministically. The foregoing process can be used for any number of websites. For any given website, selecting a named user action can retrieve the specific events that can be replayed to execute the user action for that website.

At block 1418, the workflow automation application 122 is programmed to use the vocabulary as structured data to train and deploy one or more machine learning models. Various embodiments can use different forms of ML model; in one embodiment, a Transformer-based neural network is used, but in other embodiments, a linear classifier or action-based model could be used. After deployment, the trained ML models can be accessed and used via a browser or browser extension.

FIG. 14B represents a programmed process of using the trained ML model(s) in response to a user action to interact with one or more websites. Thus, FIG. 14B typically executes after an ML model is trained and deployed as previously described. In an embodiment, at block 1424, the workflow automation application 122 is programmed to receive a sequence of one or more user events at block 1420. For example, events A, B, C, and D could be received sequentially as a user interacts with one or more websites and selects tabs, selects widgets, enters data, copies, pastes, or executes other actions.

At block 1426, the workflow automation application 122 is programmed to execute the inference stage of one or more machine learning models over the sequence of one or more user events. For example, one or more events among the events A, B, C, and D are programmatically transmitted to the ML model that was trained as described for FIG. 13A, as part of a request to execute the inference stage of the model. Such a request will cause the ML model to receive the events as input and output a suggestion of a stored or known workflow that most accurately matches the sequences of one or more user events, as block 1428 indicates. As the phrase "most accurately matches" suggests, the programmed logic of block 1428 can include receiving a plurality of ranked suggestions or predictions, each suggestion identifying a workflow using a workflow identifier and having an associated confidence value, then selecting the suggestion having the highest confidence value. The selected suggestion can be output in the extension panel 820 or another user interface element that is superimposed, via the browser extension, over the web page that browser 114 is currently presenting. The particular manner of presenting the selected suggestion to the user is not critical.

The process of FIG. 14B, starting at block 1426, can execute repeatedly as each sequential event is received without waiting for all events of a sequence to occur. For example, FIG. 14B can execute immediately after event A is received via the browser extension or extension panel; if the results of other blocks of the process are inconclusive or the confidence level of a suggestion is too low, then the process of FIG. 14B, starting at block 1426, can execute after both events A and B, or all of events A, B, and C, and so forth, until the output generates a suggestion with a confidence level that is sufficiently high.

At block 1430, the workflow automation application 122 is programmed to receive input corresponding to a user action in response to or after the suggestion. Block 1430 represents detecting any user action after a suggestion is presented, whether or not the user action could be interpreted as a response to the suggestion. For example, the user action could comprise clicking on the suggestion in a workflow panel or extension panel or any other user action such as selecting a browser tab, selecting a browser widget, pasting data, copying data, etc.

At block 1432, the workflow automation application 122 is programmed to test whether the user input indicates selecting the suggested workflow. If so, then model reinforcement training data is generated based on the input and added to the training dataset that was used in FIG. 14A. In this case, the workflow automation application 122 has correctly predicted the user task or intent associated with one or more events that were received at block 1420. The user's selection of the suggested workflow indicates that the suggested workflow was correct, so the machine-learning model should be reinforced with added training data.

At block 1434, if the user input corresponds to one or more other user events—that is, the suggested workflow was not selected-then the workflow automation application 122 is programmed to capture and store an updated sequence of user events as new training data. In this case, the user's action to ignore the suggestion and take other actions indicates that the user's task or intent does not closely match the suggestion and the initial events of block 1420, with the events executed after the suggestion should be considered as new training data for the model. Any new training data created in this manner can also serve as reference data for the clustering operation of block 1404 (FIG. 14A).

In this manner, in an embodiment, the system is programmed to send its current activity as a raw stream of events to the deployed model. The deployed model uses its training to suggest the actions the user should take to accomplish their goal. Based on the accuracy of the suggestion, the system can determine if the user was successful, as indicated by using the suggestion one or more times. This information then reinforces the model. In addition, new events are reintroduced back into the training cycle used for clustering, as previously described. Furthermore, the machine-learning model(s) can improve with new training data whether the user elects to execute some of a suggested workflow, all of a suggested workflow, or elects to undertake other actions manually.

FIG. 14C illustrates an example in which a large language model (LLM) supports certain aspects of workflow automation. In an embodiment, at block 1440, the workflow automation application 122 is programmed to receive user input specifying a natural language instruction for an action. For example, using a chat interface, or a text entry box widget of the extension panel 120, the workflow automation application 122 could receive an input like "Please process ticket 123 in my ticketing system and show your work." The text of this form expresses a request or goal at a high level without indicating the nature or description of the ticket. However, an LLM is able to analyze the high-level request and then use the specific vocabulary created in FIG. 14A to accomplish the user's goal.

In an embodiment, at block 1442, the workflow automation application 122 is programmed to form a prompt to an LLM. In an embodiment, the prompt comprises (a) instructions to generate an output sequence of workflow steps, (b) the vocabulary as context and (c) the user input as portions of the prompt. The instructions are typically static and can comprise text like: "Below I am giving you a vocabulary consisting of actions in web-based applications and the user tasks to which the actions correspond. I am also giving you a text string that specifies a proposed user task. Based on this information, give me a precise description in five words or less of what task the text spring specifies in a form similar to the terms used in the vocabulary. Also, give me an ordered list of web-based applications and actions in those applications that will complete the proposed user task. Be specific in terms of identifying functions or widgets in the applications and what actions to take using a browser." The vocabulary provided as context at (b) can be the specific vocabulary created in FIG. 14A. The user input of (c) can be the same string that the user entered as their task, goal, or instruction.

At block 1444, the workflow automation application 122 is programmed to programmatically call an API of the LLM using the prompt. For example, the workflow automation application 122 is programmed to generate a parameterized HTTP request directed to an endpoint of an LLM like GPT4, GPT3.5, GEMINI, CLAUDE, etc., in which one parameter is a request type, and another parameter is the prompt of block 1442. Block 1444 also can comprise entering a wait state, receiving a response from the API call, and at least transiently storing the response in memory.

At block 1446, the workflow automation application 122 is programmed to output a suggestion of a stored or known workflow that most accurately matches the natural language instruction and comprises the sequence of workflow steps and/or a new sequence of workflow steps. Block 1446 can comprise applying post-processing to the response that was received from the LLM via block 1444 and then creating and storing a new, named workflow corresponding to the user task and identifying the workflow steps that block 1446 identified. Or, block 1446 can comprise identifying an existing, known workflow by name, represented in the output from the LLM that was received via block 1444, and suggesting this workflow to the user in the extension panel or another UI window, panel, or widget. At this point, the process of FIG. 14C can continue as described in FIG. 14B, starting at block 1430.

As noted earlier, in an embodiment, the event data is stored in training datasets with attribute values specifying the tenant, entity, or instance active in the web-based application at the time that an event occurred and used for training machine learning models. These attributes enable training ML models that are customized to particular tenants or instances while still leveraging community-wide data. Thus, when workflow automation computer 120 detects a partial or complete sequence of user events, the system can determine a suggestion of a workflow corresponding to those events based on community data for similar events, even if the current user's instance is different than all other instances for which the other similar events were collected. Therefore, even if the system has not learned a user action corresponding to a sequence of events for the current particular instance of the user, the system can suggest an action or workflow corresponding to the user's events based on knowledge derived from other event sequences of other instances.

4. Automatically Determining Workstreams from Common Actions in Online Applications In an embodiment, workflow automation application 122 (FIG. 1) is programmed to interoperate with the browser extension 116 to continuously create user experience data as a basis for generating automated actions. As further described, using a continuous feedback look, embodiments can generate automations to offload human actions to compute instances. Further, if stored automation operates correctly to substitute for human agent action, the same automation can be integrated with a chatbot to enable chat-based invocation of complex workflows and workstreams.

Figure 15A:
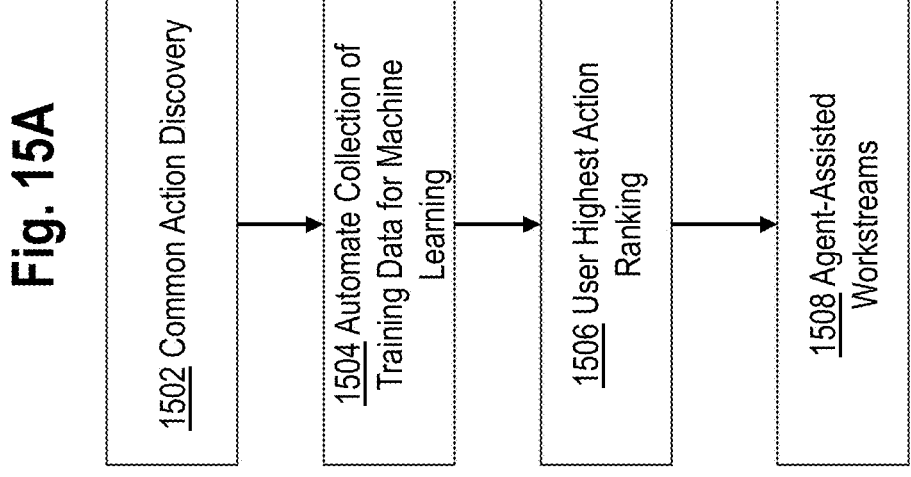
FIG. 15A illustrates a computer-implemented method of automatically determining workstreams from common actions in online applications in one embodiment.

FIG. 15A illustrates a computer-implemented method of automatically determining workstreams from common actions in online applications in one embodiment. At block 1502, workflow automation application 122 is programmed to execute common action discovery. At block 1504, the workflow automation application 122 is programmed to automate the collection of training data for use in machine learning model training. At block 1506, workflow automation application 122 is programmed to perform the user's highest action ranking. At block 1508, workflow automation application 122 is programmed to manage agent-assisted workstreams. Each block of FIG. 15A is now described in further detail with reference to other views of the drawings.

Figure 15B:
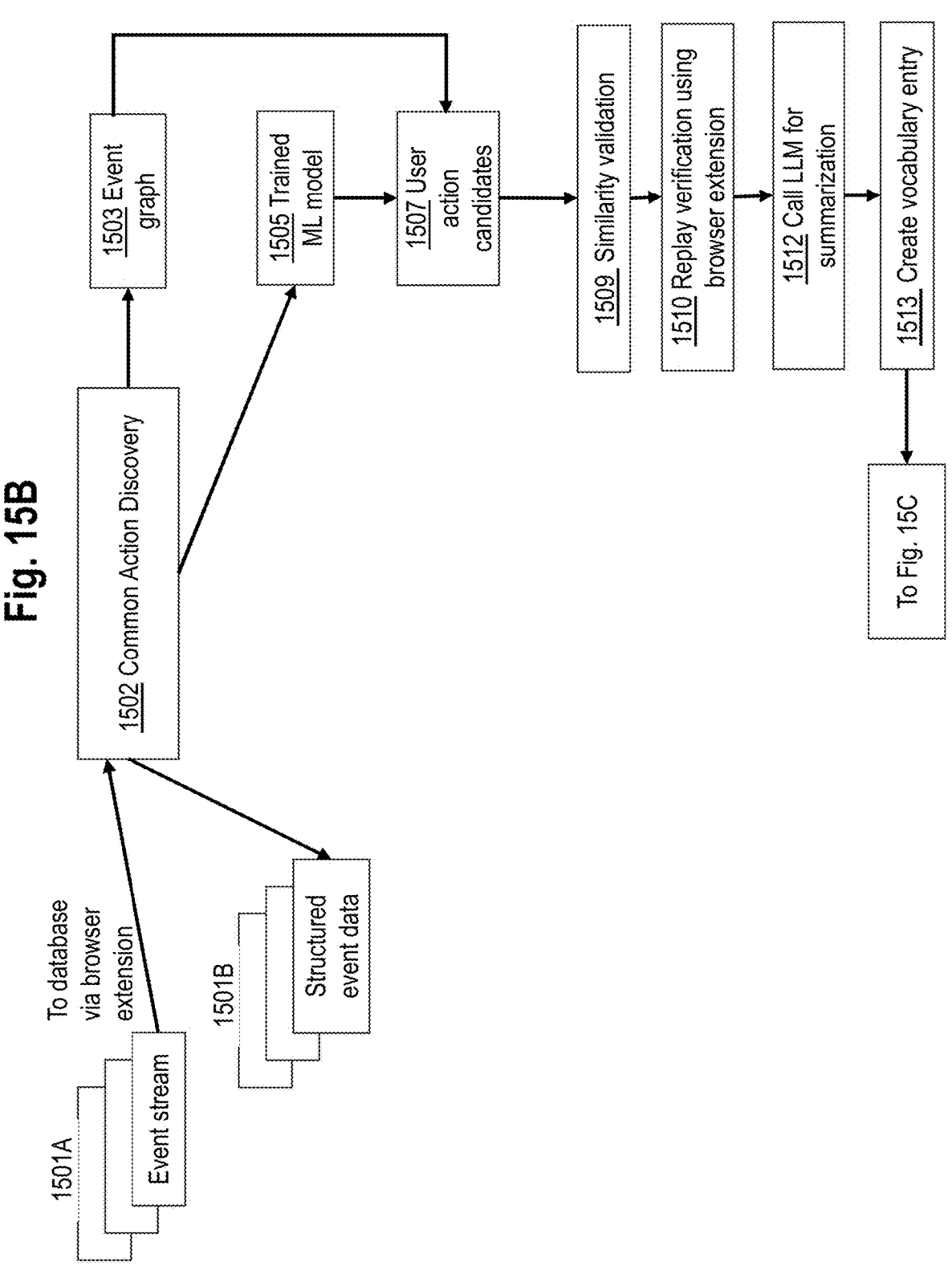
FIG. 15B illustrates a computer-implemented method of executing common action discovery.

FIG. 15B illustrates a computer-implemented method of executing common action discovery. FIG. 15B can correspond to block 1502 of FIG. 15A. In one embodiment, common action discovery comprises receiving a plurality of discrete user events of an event stream 1501A, storing data representing the events in database 128, preprocessing the event data to form structured event data 1501B, and organizing the structured event data in a plurality of separate data structures or storage locations, which can be termed buckets.

Figure 21:
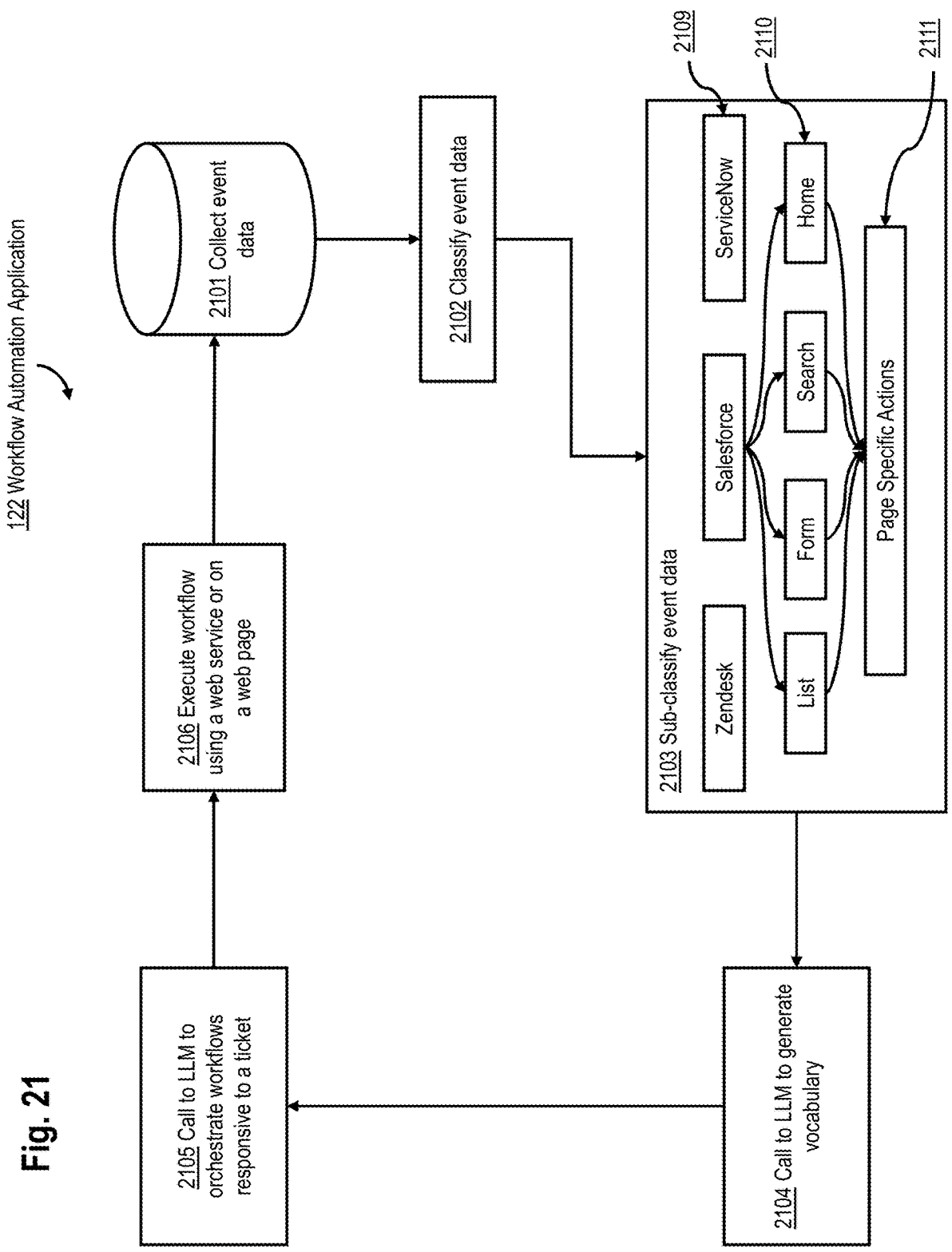
FIG. 21 illustrates an example of a workflow automation application utilizing an LLM to generate vocabulary and execute workflows.

FIG. 21 further illustrates how each bucket may organize data according to different classifications of structured event data. FIG. 21 is further described in other sections herein. Generally, in an embodiment, a workflow automation application can be programmed to collect event data at block 2101, classify event data at block 2102, sub-classify the event data at block 2103, call an LLM at block 2104 to generate a vocabulary based on the event data with classification data, call the same or a different LLM at block 2105 to orchestrate workflows responsive to a ticket and execute the workflow at block 2106 on a web service or web page. Sub-classifying event data at block 2103 can execute in relation to a relational database table that organizes data using identifiers of web services, identifiers of pages associated with page visits that the user conducted, and identifiers of specific actions on the pages that the user performed. For example, in one embodiment, a relational database table schema can store structured event data organized by web service 2109, page groupings 2110 within each web service, each page specific action 2111 that occurred within each page visit.

As previously described in other sections, events can comprise mouse clicks, navigation events, copy operations, selecting UI widgets, and key presses. Preprocessing events can comprise mapping event data from raw browser events, received via a publish-subscribe interface or event hook, to structured event data 1501B in which each structured event data item comprises a set of attributes with field values like parsed_url, selectors, height, etc. As part of the mapping, wildcard values can be substituted for specific values that appear in events. For example, a ticket number, tokenized URL, or UUID can be transformed into a constant or variable identifier using a wildcard form, like $ticket_number. This approach works because the specific value of the original event is unimportant and only the fact that the event referenced a ticket number is important. This approach also greatly reduces the cardinality of the model.

In each bucket, the first event is a navigation event or nav_event, representing the browser 114 visiting a page of a networked resource such as the merchant website 108. Subsequent events within the bucket capture all machine actions that agent computer 110 executes until navigating to a different page, such as through a browser redirect operation. Events are arranged chronologically in a bucket, with later-occurring events appearing further down. In an embodiment, UUIDs in a URL or event body are substituted with common variables, enabling a machine learning model trained on the data to reason about a collection of web pages.

Figures 16A, 16B:
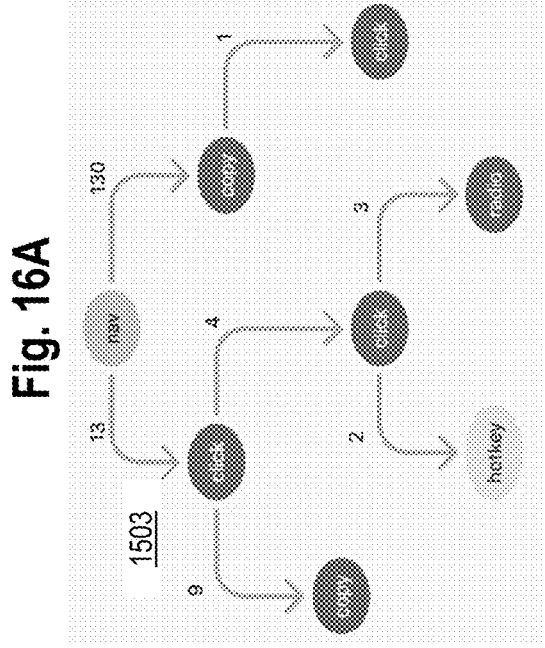
FIG. 16A illustrates an example of graph database storage of a plurality of events in an event graph.
FIG. 16B illustrates an example of graph database storage of a plurality of events in an event graph.

In another embodiment, event data can be stored in a graph database as an event graph 1503. FIG. 16A illustrates an example of graph database storage of a plurality of events in an event graph. A navigation or nav_event denoted "nav" in FIG. 16A comprises the root node of the event graph 1503, and all nodes represented as ovals are connected via acyclic edges having count values. Nodes depicted in lower positions represent events that the user of agent computer 110 performed later in time compared to events in upper positions. A count value of an edge is incremented as the same transition corresponding to the edge is observed repeatedly across multiple buckets. In the example of FIG. 16A, hypothetical count values indicate that a user account used the agent computer 110 to follow the nav_event with a mouse click "13" times and a copy action "130" times. Specific values obviously will vary across users, sessions, web pages, and actions.

The workflow automation application 122 can be programmed to query a subgraph of nodes with connections greater than N. FIG. 16B illustrates an example of a graph that the workflow automation application 122 is programmed to output in response to a query like "Show me a tree with connections>5." In an embodiment, workflow automation application 122 is programmed to execute one or more similar queries of the event graph 1503 to yield a set of user action candidates 1507. Each user action candidate comprises a sequence of events corresponding to a broader user action.

Referring again to FIG. 15B, in an embodiment, common action discovery uses a trained machine learning model 1505 to determine the user action candidates 1507. Each user action candidate 1507 represents a discrete high-level user action, which can be termed an HLA for high-level action. For example, the workflow automation application 122 is programmed to query the trained ML model 1505 for the top K probabilities, starting from a particular root nav_event. Both techniques yield a ranked list of candidate sequences from highest to lowest probability. In an embodiment, the trained ML model 1505 comprises a Gated Restricted Unit (GRU) model with a GRU layer with two hidden layers, a dropout layer for answer flexibility, an output layer as only the last prediction for the sequence is used, and a softmax layer for normalization of all possible alternatives. In one embodiment, the GRU model can be defined in code as:

```
def forward(self, src):
    #Ensure the source tensor is on the correct device
        src=src.to(next(self.parameters( )).device)
    #GRU Layer
    gru_output, self.gru(src) #Shape: (batch size, seq
        length, hidden size)
    #Apply dropout
    gru_output=self.dropout(gru_output)
    #Only use the output from the last time step for
        prediction
    output=self.fc_output(gru_output [:, −1, :]) #Shape:
        (batch_size, output_dim)
    output=self.softmax(output)
    return output
```

Other embodiments can use a dynamic connection layer to cut infeasible output in the model, a Markov model with a hidden state, or a Transformer model without or with a minimal encoder/decoder.

In an embodiment, additional validation steps are performed on these candidates, including checking if candidates have been seen before and determining whether the browser extension 116 could reproduce them. For example, at block 1509, the workflow automation application 122 is programmed to determine whether a particular user action candidate is like a previously seen candidate. At block 1510, the workflow automation application 122 is programmed to verify that the browser extension 116 can replay the sequence of events. Replaying can include verifying replayed steps to ensure an action is useful and high-quality.

If a candidate appears valid, at block 1512, the workflow automation application 122 is programmed to call a large language model (LLM) to generate a summary as a response from the LLM. The public API endpoints of commercial LLMs like OpenAI, Bard, and Claude by Anthropic can be called at block 1512. FIG. 17A and FIG. 17B illustrate examples of prompts to an LLM followed by example responses. FIG. 17A shows a first example of a prompt 1702 and a first example of a response 1704. FIG. 17B shows a second example of a prompt 1706 and a second example of a response 1708. In general, a summary can be like: Title: "SF: Copy Username"; Description: "User is navigating to Salesforce and copying the username/"

At block 1513, the workflow automation application 122 is programmed to create and store a vocabulary entry in a vocabulary store of the workflow automation system, which can use tables in database 128. The summary forms a part of a new vocabulary entry. Each vocabulary entry comprises a set of actions that can be performed on a target web service, webpage, or other networked resource. Each vocabulary entry can be a machine-readable JSON file that organizes the validated actions by URL host, specific URL, and the frequency with which they have been observed. Alternatively, vocabulary entries can be stored in a vector database in vector data form. Examples of data associated with vocabulary entries or items include:

Salesforce Vocabulary Entries

Title: "SF: Copy Username"
Description: "User navigates to Salesforce and copies the user name"
1. Nav
2. Copy
Title: "SF: Open Lead"

Figure 20:
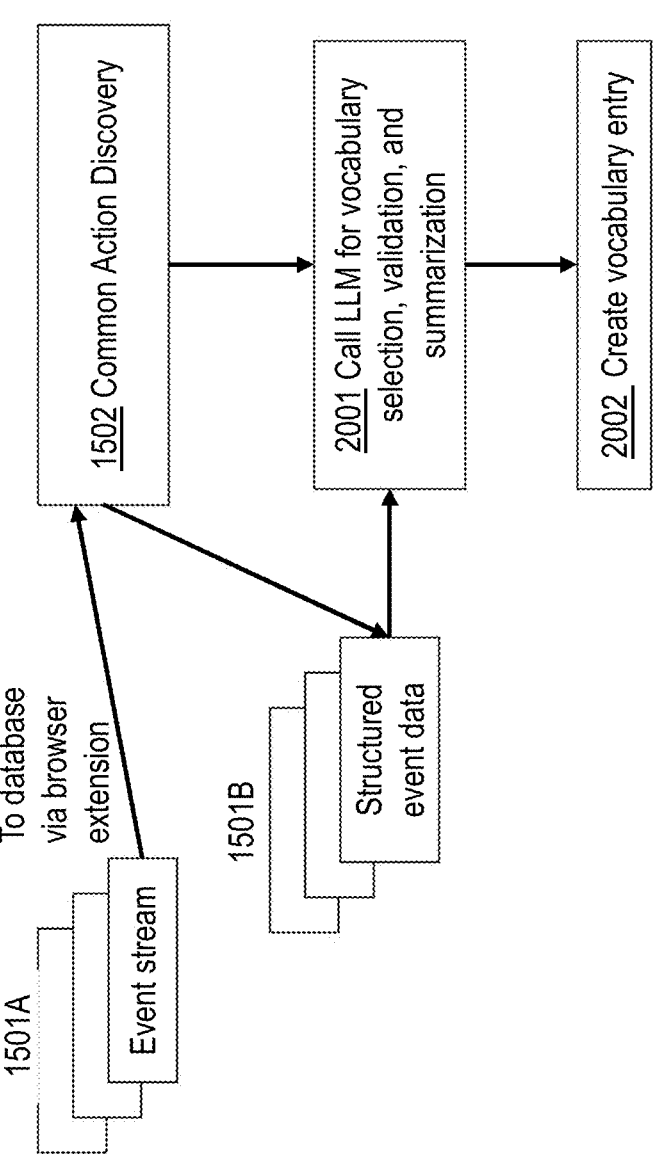
FIG. 20 illustrates a computer-implemented method of executing common action discovery using an LLM.

Description: "User navigates to Salesforce and opens a new lead"
1. Nav
2. Copy
3. Paste Okta Vocabulary Entries Title: "Okta: Reset MFA"
Description: "User is navigating to okta and resetting a user's MFA"
1. Nav
2. Click
3. Click
Title: "Okta: Lookup user"
Description: "User is navigating to okta and looking up a user"
1. Nav
2. Click
3. Paste Common action discovery can also leverage LLM support. FIG. 20 illustrates an embodiment in which common action discovery uses an API call to an LLM to determine the vocabulary based on the structured event data, validate the vocabulary, and summarize the vocabulary. In an embodiment, the workflow automation application 112 is programmed to programmatically call the LLM at block 2001 and supply structured event data 1501B as context data and a prompt instructing the LLM to select a vocabulary term representing a set of actions that can be performed on a target web service. At block 2001, the public API endpoints of commercial LLMs like Open AI Operator and Claude Computer Use by Anthropic can be called programmatically. Block 2001 also can comprise validating the vocabulary based on a determination that the actions are like previously detected actions within the structured event data 1501B and summarizing the vocabulary.

The process of FIG. 20 enables the system to effectively identify, per target web service or system, per page type (like a home page or record inspection page), all the actions that end-users have executed on them. For example, a particular target web service could have N agents that generated 1,000 events on a particular profile page; the system can group the events by number of times that each event has been executed, then prompt the LLM at block 2001 to name what action the events represent. Events can be stored in the database using page groupings and relationships between pages. For each page, instances of visits can be stored, with an instance associated with a plurality of events. Concurrently, in the database schema, a generic view of a page can aggregate all visits, events, and actions associated with the page. With data structured in this manner, prompts to the LLM at block 2001 can name or augment the events to facilitate re-executing the correct events when an action is selected later.

At block 2002, the workflow automation application 112 is programmed to create and store the vocabulary entry in a vocabulary store of the workflow automation system, which can use tables in database 128. Each vocabulary entry comprises a set of actions that can be performed on a target web service, webpage, or other networked resource.

FIG. 15C illustrates a computer-implemented method of automating the collection of training data for machine learning. FIG. 15C can correspond to block 1504 of FIG. 15A. In one embodiment, at block 1520, once an action is entered in the vocabulary, workflow automation application 122 is programmed to return to the source data in the buckets to re-inspect the event data. Block 1520 can execute immediately in response to storing a new vocabulary entry or offline as a scheduled job to assess a plurality of prior vocabulary entries. For the new action, workflow automation application 122 is programmed to count the number of buckets the action appears in relative to the total number of buckets. This count helps determine how commonly users are performing the corresponding action.

Additionally, at block 1520, workflow automation application 122 is programmed to store the identified action and other data as a training sequence in a training data set. Storing a training sequence can combine the original source events from each bucket into a machine-readable file, associating them with the discovered action, represented as a simplified event sequence. This process automates much of the collection for a supervised training dataset, which is often a costly step in specialized model creation.

In an embodiment, at block 1522, the workflow automation application 122 is programmed to initiate ML model training using the training sequences and, optionally, previous sequences from a current ticket shown in a web service as context data. Block 1522 can use the supervised training dataset to train a custom machine-learning model that can analyze a raw stream of user events and return a higher-order action that the user is taking. In one embodiment, the machine learning model trained from the supervised dataset can observe user interactions with browser 114 and agent computer 110, such as clicks, copies, and pastes, and classify them as actions like "Search for the user in Okta" or "Reset Password." Suitable ML models for training at this stage include Enhanced PrefixSpan with Dynamic Gaps and Time Distance. The simple algorithm defines the match between the ideal sequence and the actual (contaminated) sequence. Alternatives include logistic regression, SVM (support vector machine) with non-linear kernel, and RNN (recurrent neural networks) ranging from a CNN (convolutional neural network) to Transformer-type models.

FIG. 15D illustrates a computer-implemented process of the user's highest action ranking. FIG. 15D can correspond to block 1506 of FIG. 15A.

At block 1524, the workflow automation application 122 is programmed to inspect the vocabulary of actions associated with a particular user account and to identify common groupings of actions at block 1526. Each user account can have a record in database 128 with column values specifying common groupings of actions and, as described later, Workstreams or workflows. The terms Workstream, workflow, and action sequence are considered equivalent, and other embodiments can use other functionally equivalent terms. "Common," in this context, can mean frequently performed, as determined by comparing counts of sequences of actions to a threshold value. For example, a user might need to perform a group of actions ten times repeatedly to be considered common, or the magnitude of the counts on the edges of the graph can be tested against a threshold value such as 10 or 100. In one embodiment, a graph like that of FIG. 16A is traversed to find user action candidates. For example, with the example graph of FIG. 16A, traversal might result in a first user action candidate comprising nav, click, and copy events and a second user action candidate comprising nav and copy events.

In another embodiment, workflow automation application 122 is programmed, based on a classifier model, to continuously send a stream of raw user events to classify them into higher-level actions and gather statistics on how often the user performs them with agent computer 110 and browser

114. In either approach, the workflow automation application 122 is programmed to identify that a user frequently performs a specific action.

In response, at block 1528, the workflow automation application 122 is programmed to store each common grouping of actions as a Workstream or workflow associated with the user action. In an embodiment, workflow automation application 122 is programmed to suggest a Workstream that groups common actions, receives user input to confirm the Workstream, and stores the Workstream after confirmation. The Workstream can be saved in database 128 with data identifying the user or a user account, in columns of a user account row in the database, or with a reference to a user record or user account in the database. The particular table schema, reference mechanism, and storage mechanism are not critical if a Workstream can be bound to or associated with a particular user account. Or, Workstreams can be associated with user groups or teams associated with the same enterprise.

Further, workflow automation application 122 is programmed the next time the user account visits a website where they typically perform the actions represented in the Workstream 116 to present a suggestion via the browser extension 116 to automate the steps by executing the Workstream. As shown in block 1530, in one embodiment, the workflow automation application is programmed, in response to detecting the same user accessing the same web service, to generate and cause displaying a visual list of one or more Workstreams that correspond to the web service and at least one action that the user account has currently performed. The browser extension 116 can perform the detection and signal the workflow automation application 122 to generate and provide the display. FIG. 13A and FIG. 13B provide examples of graphical user interfaces with displays that could be generated. In this manner, as noted in block 1532, the process of FIG. 15D effectively forms a pattern recognition algorithm to find the same actions in a current event stream.

Figure 18A:
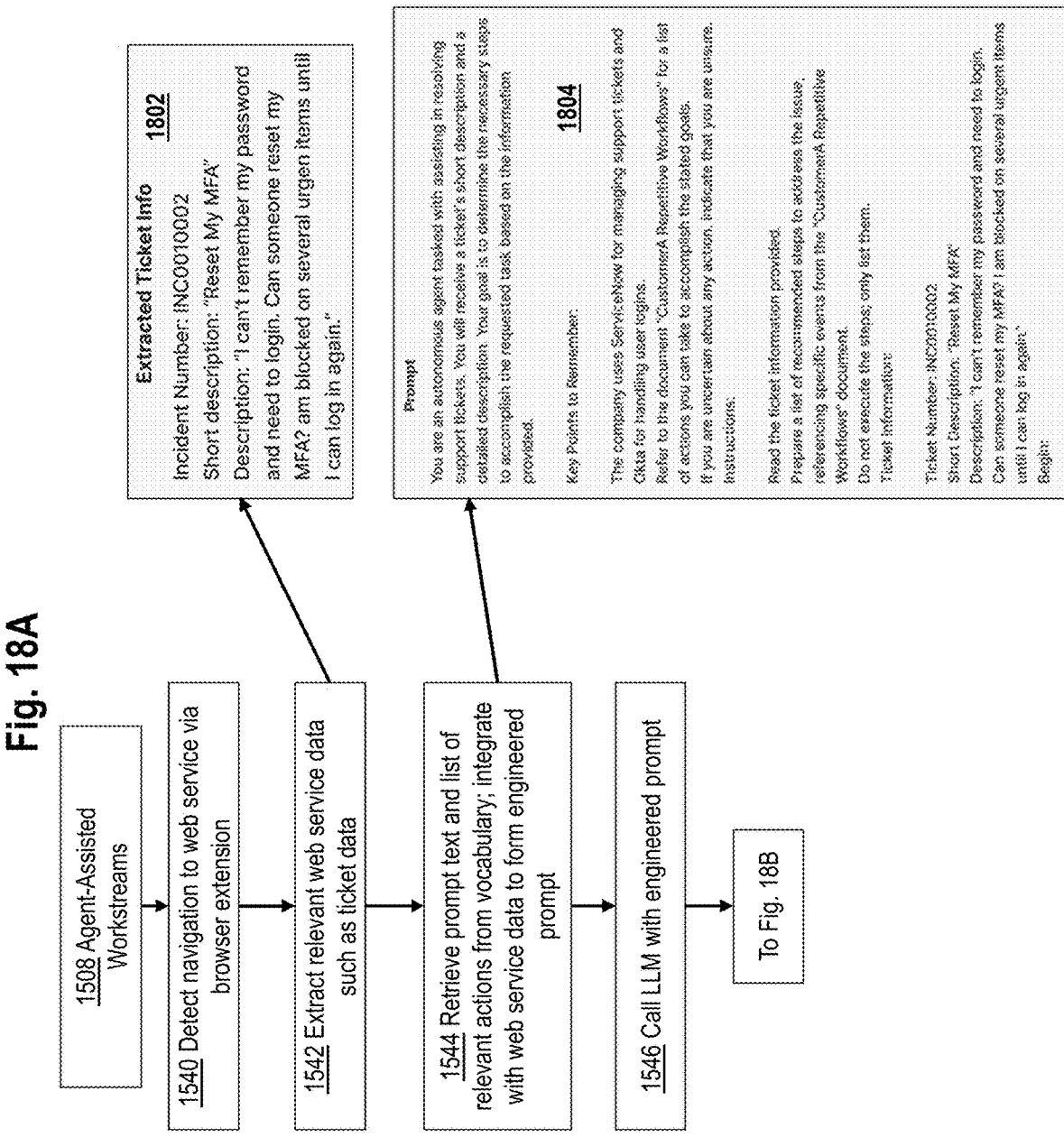

FIG. 18A and FIG. 18B illustrate a computer-implemented process of agent-assisted workflows. FIG. 18A and FIG. 18B can correspond to block 1508 of FIG. 15A.

Referring first to FIG. 18A, in an embodiment, at block 1540, the process is programmed to detect navigation to a web service via the browser extension. For example, the browser extension 116 is programmed to determine that the browser 114 accessed the support ticket system 130.

In response, at block 1542, the process is programmed to extract relevant web service data. For example, with the support ticket system 130, workflow automation application 122 is programmed to extract an incident or ticket number, description, and ticket body. The extracted ticket info 1802 of FIG. 18A shows an example.

In an embodiment, at block 1544, the process is programmed to retrieve prompt text and a list of relevant actions from the vocabulary, integrate the prompt text and relevant actions with the web service data, and thereby generate an engineered LLM prompt. For example, prompt 1804 of FIG. 18A shows that an engineered prompt can comprise instructions on handling a ticket, combining the instructions with the relevant ticket information.

As shown in block 1546, the process is programmed to call an LLM with the engineered prompt. The prompt can be enhanced with a corresponding vocabulary item as a machine-readable document or through a vector database. Before submitting the prompt, workflow automation application 122 is programmed to retrieve relevant actions from the vector database and supply them to the LLM along with the prompt and ticket information. In some embodiments, the models trained via the training steps previously described can be used alone or combined with decision trees to perform event classification. To predict the next user step an embodiment can use Enhanced PrefixSpan with Dynamic Gaps to find the relevant candidate sequence and then check which steps had been performed to define recommendations.

Referring now to FIG. 18B, the LLM generates the appropriate sequence of actions and the specific events the user needs to execute, which workflow automation application 122 is programmed to receive as a response from the LLM at block 1548. LLM output 1806 shows an example response.

At block 1550, the process is programmed to cause the web service to execute each action in the list of actions via the browser extension 116, including navigating to services or web pages, inserting field values, and selecting UI widgets as appropriate, to result in completing a task in the web service. Thus, the user acts as an intermediary to execute the specified actions step-by-step, adjusting them as needed; the LLM thereby supports providing an agent experience to remediate and close a ticket.

Figure 19A:
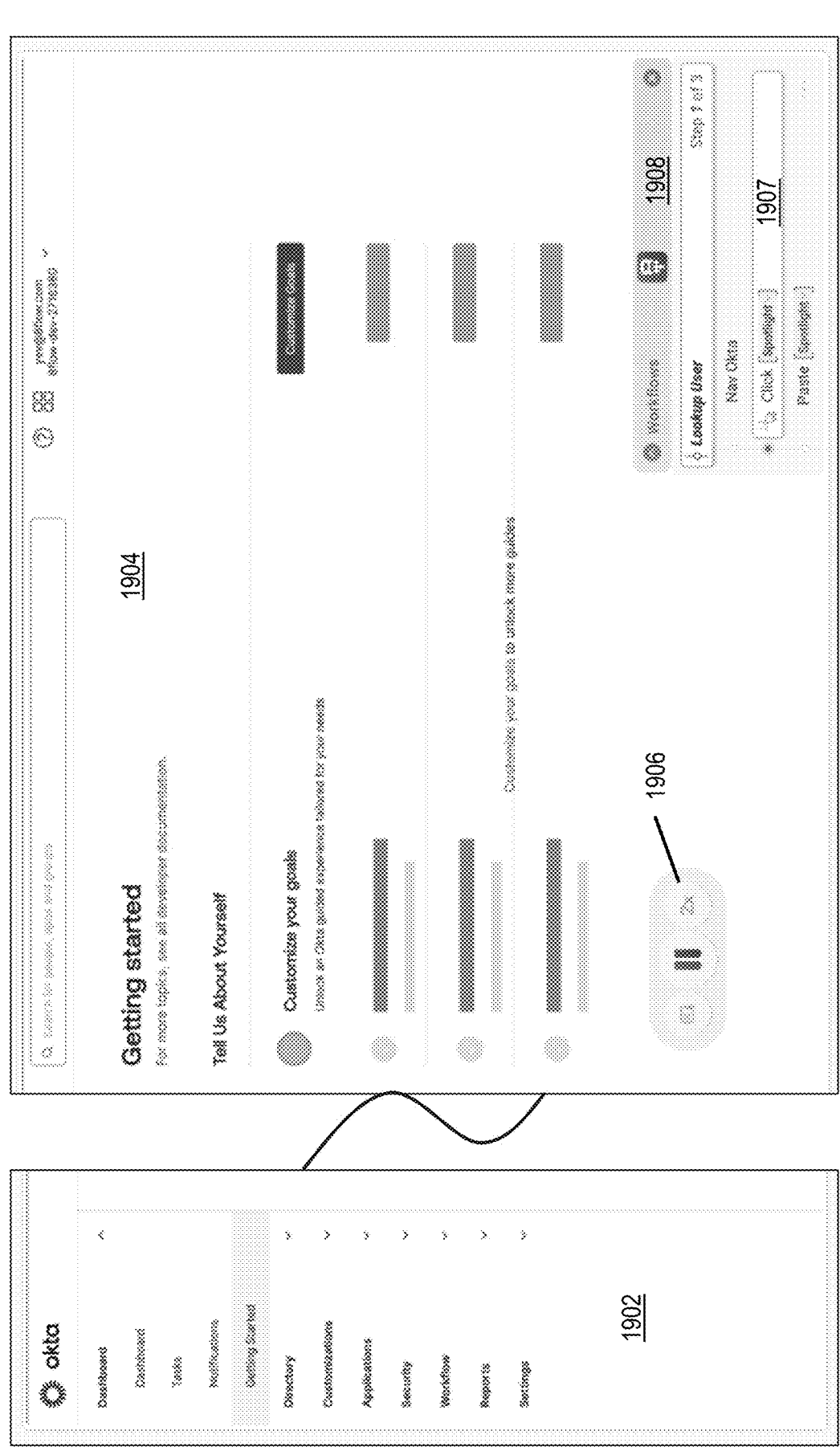

FIG. 19A, FIG. 19B, FIG. 19C, and FIG. 19D illustrate computer display devices showing example graphical user interfaces during the execution of agent-assisted actions based on the techniques that have been described for FIG. 18A and FIG. 18B. Referring first to FIG. 19A, as one example, using the browser 114 to access the OKTA service can result in receiving and rendering a webpage at agent computer 110 comprising a dashboard panel 1902 and a main window 1904. In an embodiment, the browser extension 116 is programmed to display a workflow play control 1906 floating or superimposed over the main window 1904 and comprising a plurality of play controls such as a play/pause button and a fast action (2X) button, each programmed as active links or widgets to signal input to the browser extension. Thus, in FIG. 19A, a user-assisted agent is suggesting steps to perform tasks desired in a ticket. The user can pause, speed up, or stop the workflow at any time, and adjust operations or entries if the workflow operates incorrectly or contrary to user expectations.

The browser extension 116 is further programmed to interoperate with the workflow automation application 122 to generate and display a workflow panel 1908. In the example of FIG. 19A, the workflow panel 1908 shows one workflow titled "Lookup User" that consists of three steps: Nav Okta, Click, and Paste. The "Nav Okta" step refers to navigating the browser automatically to the Okta server, for example, by automatically calling a browser service, function, or API and providing a URL of a known endpoint of the Okta service. The Click and Paste steps each are parameterized to specify operating on a "Spotlight" pull-down menu on the Okta page.

Figure 19B:
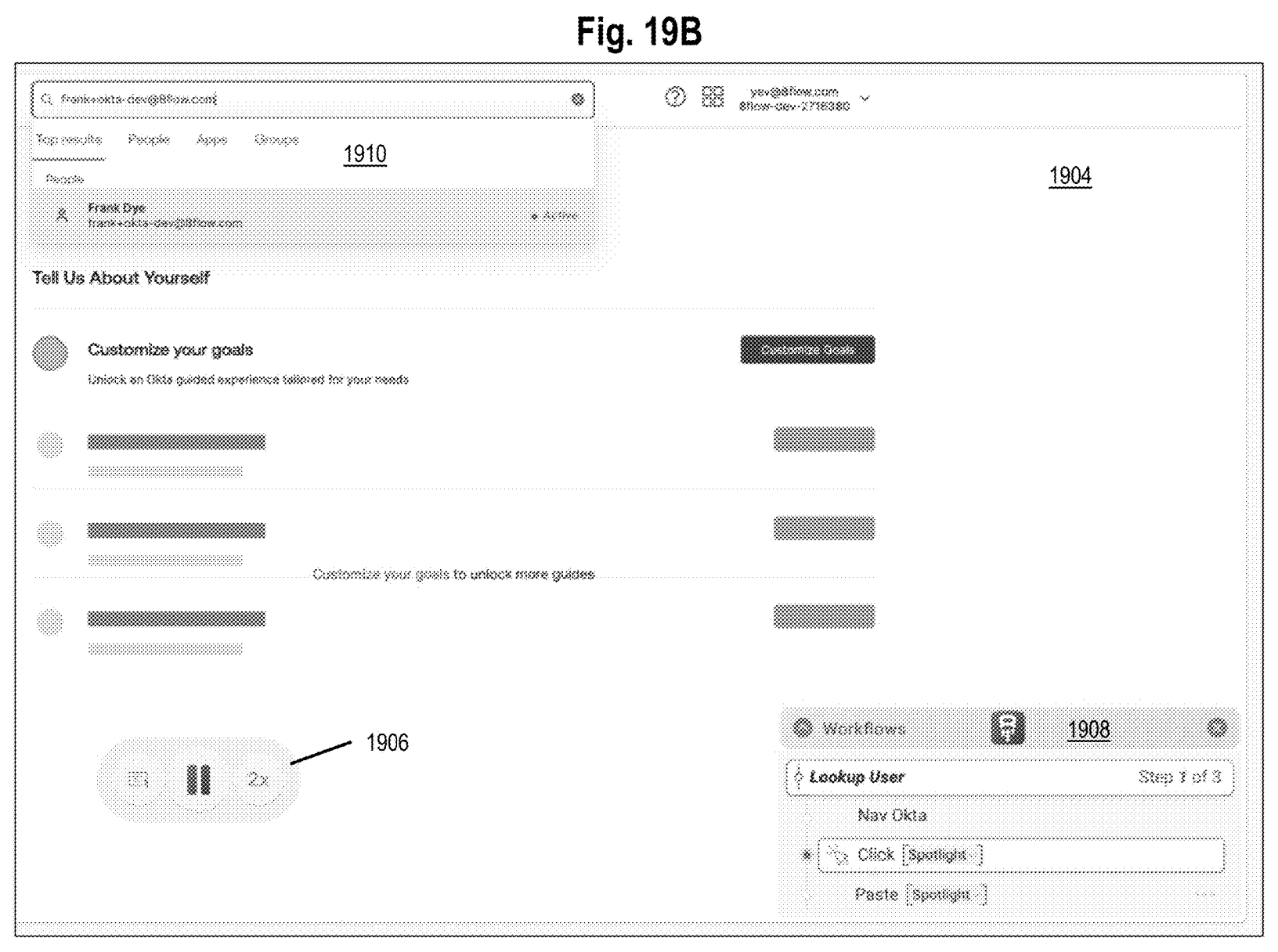

FIG. 19B shows the same view as FIG. 19A in a state after the Click step has been executed and during the Paste step. A spotlight panel 1910 on the Okta page has been accessed automatically and a user identifier has been pasted automatically into a field of the panel.

Figure 19C:
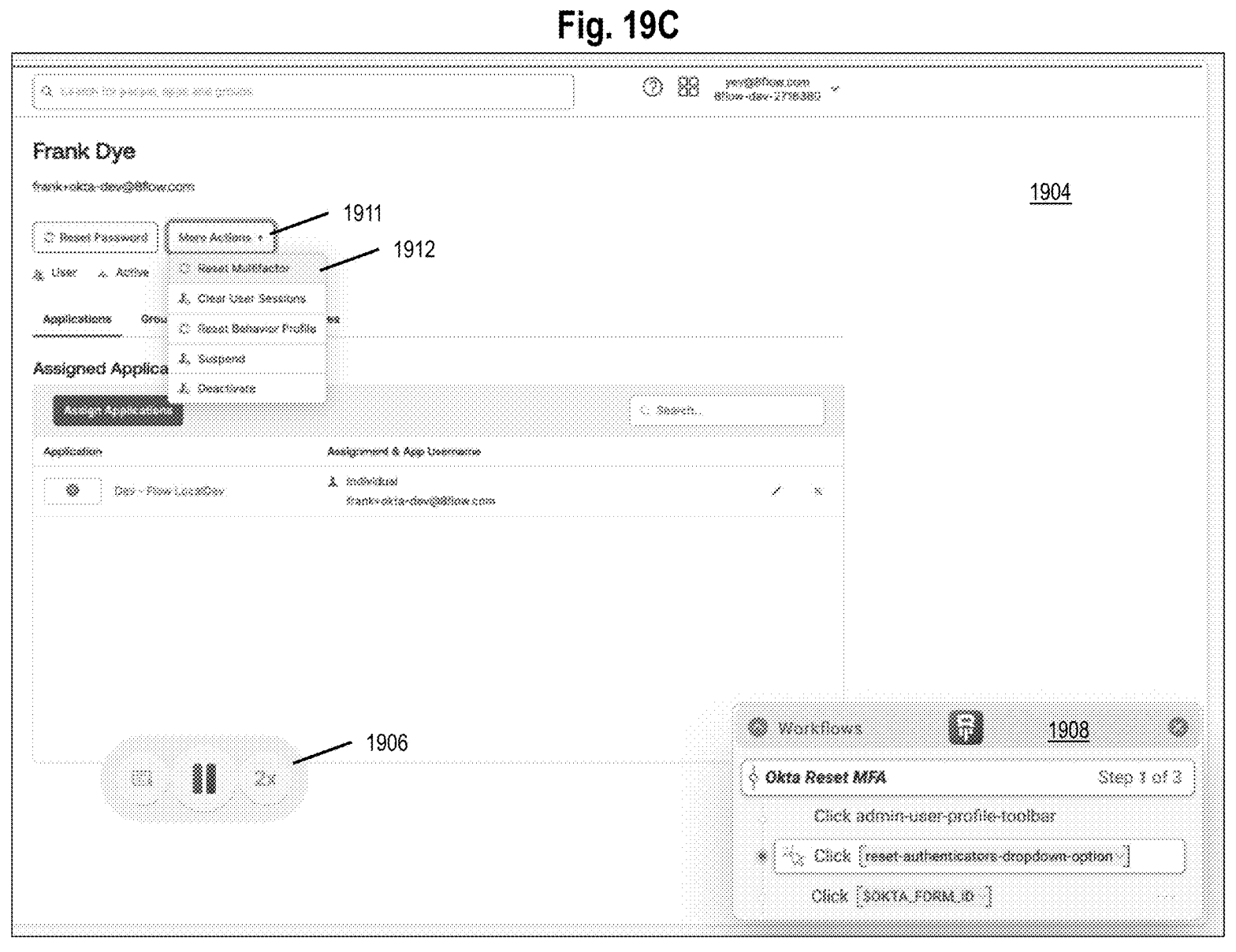

FIG. 19C shows a similar view as in FIG. 19A, FIG. 19B in which a different workflow titled "Okta Reset MFA" is running as shown in workflow panel 1908. The workflow comprises three or more steps. A first step, "Click admin-user-profile-toolbar" has been executed. The value "admin-user-profile-toolbar" can correspond to a name or label of a DOM tree element of the Okta webpage that has been accessed. A second step, "Click [reset-authenticators-drop-down-option," is executing and has resulted in automatically selecting a drop-down widget 1911 over the spotlight panel 1910 and showing options 1912, of which the first, "Reset Multifactor," is highlighted.

Figure 19D:
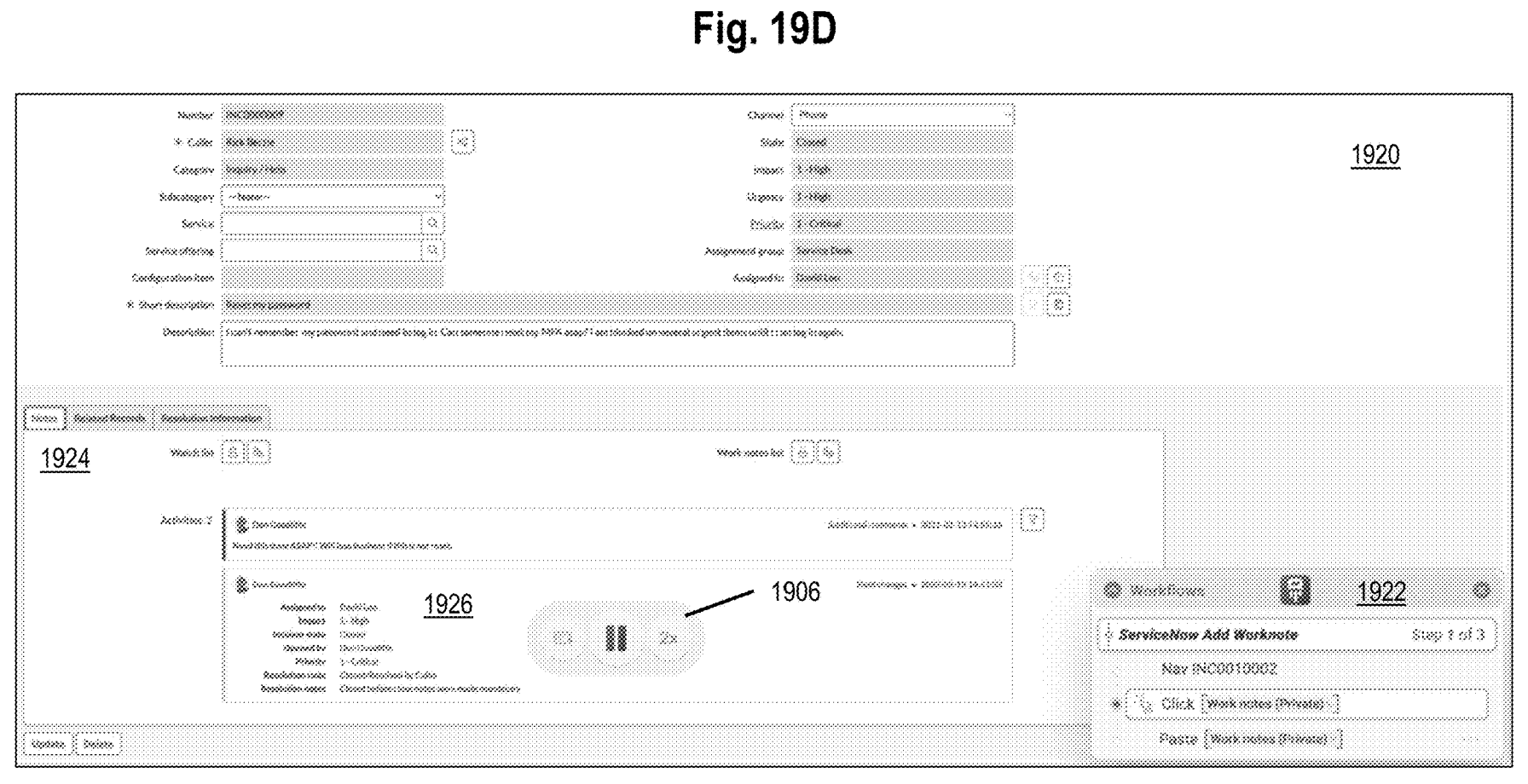

FIG. 19D shows a view of an incident record of another service. The workflow panel 1922 is updated to show a "ServiceNow Add Worknote" workflow with three steps comprising navigating to a specified incident record, clicking on a Work Notes tab, and pasting data in the tab. In response, a work notes panel 1924 of the main window 1920 has been selected and data has been pasted in a notes detail panel 1926.

The foregoing views represent selected examples but embodiments are programmed to accommodate any web-based service and sequence of user actions that a user can conduct using browser 114 and agent computer 110. For example, in one experimental embodiment, the system operated as follows:

1. Reads the relevant fields from the ticket.
2. Uses a prompt with instructions on how to use "High-Level Actions" (HLAs) with relevant info on the user and organization, such as what web services instances they use.
3. Calculate an embedding based on the above prompt and retrieve relevant HLAs via RAG techniques for the ticket request combined with the organization's specific details (Okta Reset MFA, Add APP, Search user).
4. These relevant HLAs are appended to the previous prompt along with the extension's Action Space definition; this fully formed prompt is sent to the LLM. Embodiments are LLM-agnostic, and any LLM can be used.
5. LLM returns a response on how to solve the ticket, along with a sequence of actions to accomplish the goal. These actions are an amalgamation of the steps defined in the HLAS.
6. Browser extension parses and executes the actions.

FIG. 21 illustrates an overview of the processes within an embodiment of a workflow automation application utilizing an LLM to automatically execute workflows. In an embodiment, at block 2101, the workflow automation application 112 is programmed to collect event data. For example, the workflow automation application 112 can passively observe and collect event data representing user events such as mouse clicks, tab selections, or other online activity in web-based applications or web services. User events can be generated by an agent interacting with a browser 114 on an agent computer 110 or by automations 126 generated by an LLM and executed by browser extension 116 to perform user events on a web service at block 2106. At block 2102, the workflow automation application 112 classifies the collected event data based on the techniques that have been described above for FIG. 7A.

At block 2103, the workflow automation application 112 sub-classifies the event data into buckets organized by the system from which the event data was collected. In an embodiment, the systems may be different web services 2109 or software applications frequently used by agents such as Zendesk, Salesforce, or ServiceNow. Examples of sub-classification buckets may include the web service 2109, where the event data was collected, page groupings 2110 within each web service, and each page-specific action 2111 that occurred within each page visit.

At block 2104, the workflow automation application 112 is programmed to programmatically call an API endpoint of an LLM and supply a first prompt instructing the LLM to generate and store in a database 128 vocabulary representing a set of actions that can be performed on a target web service. For example, the workflow automation application 112 may retrieve a copy of the first prompt and event data from the database 128 and provide a first engineered prompt comprising the first prompt and event data to the LLM. The workflow automation application 112 is programmed to receive a response to the first engineered prompt from the LLM comprising vocabulary that is stored in the database 128.

At block 2105, the workflow automation application 112 is programmed to programmatically call an API endpoint of an LLM and supply a second prompt instructing the LLM to select a vocabulary from database 128 that is responsive to resolving a specified task. In an embodiment, the workflow automation application 112 may retrieve both a copy of the second prompt from the database 128 and previously extracted web service data representing an incident or ticket number, description, and body from the ticket support system 130 and provide a second engineered prompt comprising the second prompt and extracted web service data to the LLM. The second engineered prompt can be generated by the techniques described above for FIG. 18A and FIG. 18B. In an embodiment, the workflow automation application 112 is programmed to receive a response to the second engineered prompt from the LLM comprising a workflow based on a selected vocabulary representing a list of actions to be executed on the web service. The public API endpoints of commercial LLMs like Open AI Operator and Claude Computer Use by Anthropic can be called at blocks 2104 and 2105.

At block 2106, the workflow automation application 112 is programmed to execute the vocabulary selected by the LLM on the web service. For example, the workflow automation application 112 may supply the vocabulary to a browser extension 116 configured to perform the listed actions within the vocabulary on the web service. In an embodiment, the browser extension 116 may generate a graphical user interface on an agent computer 110 during the execution of the vocabulary that represents a workflow panel 1908 configured to control the execution of the workflow. For example, an agent may observe the simultaneous automatic execution of a plurality of workflows on the agent computer 110 and interrupt, stop, or resume a specific workflow by using the workflow panel 1908 to signal input to the browser extension 116.

In an embodiment, the workflow automation application 112 is programmed to return to block 2101 and collect event data generated by the execution of the workflow.

5. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. To accomplish the described techniques, such computing devices may also combine custom hard-wired logic, ASICs, or FPGAs with custom programming. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 2:
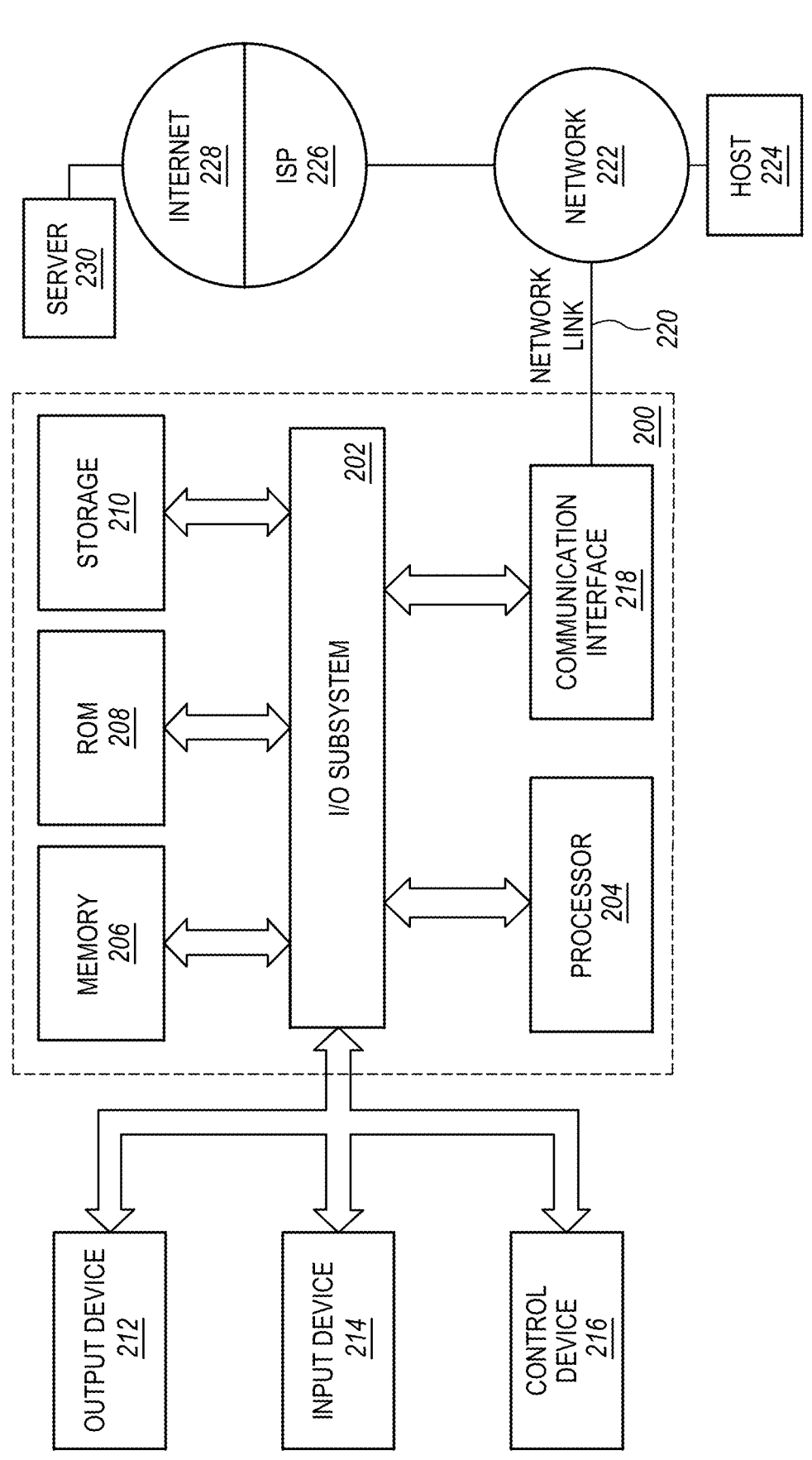
FIG. 2 illustrates a computer system with which one embodiment could be implemented.

FIG. 2 is a block diagram that illustrates an example computer system with which an embodiment may be implemented. In the example of FIG. 2, a computer system 200 and instructions for implementing the disclosed technologies in hardware, software, or a combination of hardware and software, are represented schematically, for example, as boxes and circles, at the same level of detail that is commonly used by persons of ordinary skill in the art to which this disclosure pertains for communicating about computer architecture and computer systems implementations.

Computer system 200 includes an input/output (I/O) subsystem 202, which may include a bus and/or other communication mechanism(s) for communicating information and/or instructions between the components of the computer system 200 over electronic signal paths. The I/O subsystem 202 may include an I/O controller, a memory controller, and at least one I/O port. The electronic signal paths are represented schematically in the drawings, for example, as lines, unidirectional arrows, or bidirectional arrows.

At least one hardware processor 204 is coupled to I/O subsystem 202 for processing information and instructions. Hardware processor 204 may include, for example, a general-purpose microprocessor or microcontroller and/or a special-purpose microprocessor such as an embedded system or a graphics processing unit (GPU), or a digital signal processor or ARM processor. Processor 204 may comprise an integrated arithmetic logic unit (ALU) or be coupled to a separate ALU.

Computer system 200 includes one or more units of memory 206, such as a main memory, which is coupled to I/O subsystem 202 for electronically digitally storing data and instructions to be executed by processor 204. Memory 206 may include volatile memory such as various forms of random-access memory (RAM) or other dynamic storage device. Memory 206 may also be used for storing temporary variables or other intermediate information during the execution of instructions to be executed by processor 204. Such instructions, when stored in non-transitory computer-readable storage media accessible to processor 204, can render computer system 200 into a special-purpose machine that is customized to perform the operations specified in the instructions.

Computer system 200 further includes non-volatile memory such as read-only memory (ROM) 208 or other static storage devices coupled to I/O subsystem 202 for storing information and instructions for processor 204. The ROM 208 may include various forms of programmable ROM (PROM), such as erasable PROM (EPROM) or electrically erasable PROM (EEPROM). A unit of persistent storage 210 may include various forms of non-volatile RAM (NVRAM), such as FLASH memory, solid-state storage, magnetic disk, or optical disks such as CD-ROM or DVD-ROM and may be coupled to I/O subsystem 202 for storing information and instructions. Storage 210 is an example of a non-transitory computer-readable medium that may be used to store instructions and data, which, when executed by the processor 204, cause performing computer-implemented methods to execute the techniques herein.

The instructions in memory 206, ROM 208, or storage 210 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer, such as a relational database system using structured query language (SQL) or no SQL, an object store, a graph database, a flat file system, or other data storage.

Computer system 200 may be coupled via I/O subsystem 202 to at least one output device 212. In one embodiment, output device 212 is a digital computer display. Examples of a display that may be used in various embodiments include a touchscreen display, a light-emitting diode (LED) display, a liquid crystal display (LCD), or an e-paper display. Computer system 200 may include other types(s) of output devices 212, alternatively or in addition to a display device. Examples of other output devices 212 include printers, ticket printers, plotters, projectors, sound cards or video cards, speakers, buzzers or piezoelectric devices or other audible devices, lamps or LED or LCD indicators, haptic devices, actuators or servos.

At least one input device 214 is coupled to I/O subsystem 202 for communicating signals, data, command selections, or gestures to processor 204. Examples of input devices 214 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 216, which may perform cursor control or other automated control functions such as navigation in a graphical interface on a display screen, alternatively or in addition to input functions. The control device 216 may be a touchpad, a mouse, a trackball, or cursor direction keys for communicating direction information and command selections to processor 204 and controlling cursor movement on an output device 212 such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other type of control device. An input device 214 may include a combination of multiple different input devices, such as a video camera and a depth sensor.

In another embodiment, computer system 200 may comprise an Internet of Things (IoT) device in which one or more of the output device 212, input device 214, and control device 216 are omitted. Or, in such an embodiment, the input device 214 may comprise one or more cameras, motion detectors, thermometers, microphones, seismic detectors, other sensors or detectors, measurement devices or encoders, and the output device 212 may comprise a special-purpose display such as a single-line LED or LCD display, one or more indicators, a display panel, a meter, a valve, a solenoid, an actuator or a servo.

When computer system 200 is a mobile computing device, input device 214 may comprise a global positioning system (GPS) receiver coupled to a GPS module that is capable of triangulating to a plurality of GPS satellites, determining and generating geo-location or position data such as latitude-longitude values for a geophysical location of the computer system 200. Output device 212 may include hardware, software, firmware, and interfaces for generating position reporting packets, notifications, pulse or heartbeat signals, or other recurring data transmissions that specify a position of the computer system 200, alone or in combination with other application-specific data, directed toward host computer 224 or server computer 230.

Computer system 200 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 200 in response to processor 204 executing at least one sequence of at least one instruction contained in main memory 206. Such instructions may be read into main memory 206 from another storage medium, such as storage 210. Execution of the sequences of instructions contained in main memory 206 causes processor 204 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 210. Volatile media includes dynamic memory, such as memory 206. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise a bus of I/O subsystem 202. Transmission media can also be acoustic or light waves, such as those generated during radio-wave and infrared data communications.

Various forms of media may carry at least one sequence of at least one instruction to processor 204 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 200 can receive the data on the communication link and convert the data to a format that can be read by computer system 200. For instance, a receiver such as a radio frequency antenna or an infrared detector can receive the data carried in a wireless or optical signal, and appropriate circuitry can provide the data to I/O subsystem 202 such as place the data on a bus. I/O subsystem 202 carries the data to memory 206, from which processor 204 retrieves and executes the instructions. The instructions received by memory 206 may optionally be stored on storage 210 either before or after execution by processor 204.

Computer system 200 also includes a communication interface 218 coupled to a bus of I/O subsystem 202. Communication interface 218 provides a two-way data communication coupling to a network link(s) 220 that are directly or indirectly connected to at least one communication network, such as network 222 or a public or private cloud on the Internet. For example, communication interface 218 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 222 broadly represents a local area network (LAN), wide-area network (WAN), campus network, internetwork, or any combination thereof. Communication interface 218 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 218 sends and receives electrical, electromagnetic, or optical signals over signal paths that carry digital data streams representing various types of information.

Network link 220 typically provides electrical, electromagnetic, or optical data communication directly or through at least one network to other data devices, using, for example, satellite, cellular, Wi-Fi, or BLUETOOTH technology. For example, network link 220 may connect through network 222 to a host computer 224.

Furthermore, network link 220 may provide a connection through network 222 or to other computing devices via internetworking devices and/or computers that are operated by an Internet Service Provider (ISP) 226. ISP 226 provides data communication services through a worldwide packet data communication network represented as Internet 228. A server computer 230 may be coupled to Internet 228. Server computer 230 broadly represents any computer, data center, virtual machine, or virtual computing instance with or without a hypervisor or computer executing a containerized program system such as DOCKER or KUBERNETES. Server computer 230 may represent an electronic digital service that is implemented using more than one computer or instance, and that is accessed and used by transmitting web services requests, uniform resource locator (URL) strings with parameters in HTTP payloads, API calls, app services calls, or other service calls. Computer system 200 and server computer 230 may form elements of a distributed computing system that includes other computers, a processing cluster, a server farm, or other organization of computers that cooperate to perform tasks or execute applications or services. Server computer 230 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 230 may comprise a web application server that hosts a presentation layer, application layer, and data storage layer, such as a relational database system using a structured query language (SQL) or no SQL, an object store, a graph database, a flat file system or other data storage.

Computer system 200 can send messages and receive data and instructions, including program code, through the network(s), network link 220, and communication interface 218. In the Internet example, server computer 230 might transmit a requested code for an application program through Internet 228, ISP 226, local network 222, and communication interface 218. The received code may be executed by processor 204 as it is received and/or stored in storage 210 or other non-volatile storage for later execution.

The execution of instructions, as described in this section, may implement a process in the form of an instance of a computer program that is being executed, consisting of program code and its current activity. Depending on the operating system (OS), a process may comprise multiple threads of execution that execute instructions concurrently. In this context, a computer program is a passive collection of instructions, while a process may execute those instructions. Several processes may be associated with the same program; for example, opening up several instances of the same program often means more than one process is being executed. Multitasking may be implemented to allow multiple processes to share processor 204. While each processor 204 or core of the processor executes a single task at a time, computer system 200 may be programmed to implement multitasking to allow each processor to switch between tasks that are being executed without having to wait for each task to finish. In an embodiment, switches may be performed when tasks perform input/output operations when a task indicates that it can be switched or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims issued from this application in the specific form in which such claims issue, including any subsequent correction.

What is claimed is:

1. One or more non-transitory computer-readable storage media storing a workflow automation application comprising one or more sequences of instructions which, when executed using one or more processors, the one or more processors being communicatively coupled to one or more network interfaces that are communicatively coupled to one or more internetworks and capable of network communication with a program hosted on an agent computer that also hosts a browser, cause the one or more processors to execute:

receiving browser tab event data indicating a change to a new or different browser tab associated with navigation of the browser to a web service;

in response to receiving the browser tab event data indicating the change, extracting web service data from a web page served to the browser from the web service;

retrieving, from digital data storage, a first prompt text for a first prompt to a large language model (LLM) and a first list of actions from a vocabulary of common user actions;

programmatically calling the LLM and providing a first engineered prompt comprising the first prompt text, the first list of actions, and the web service data;

receiving a response to the first engineered prompt from the LLM, the response comprising a second list of actions; and posting a plurality of requests to the web service, each request among the plurality of requests specifying to execute a different successive action in the second list of actions.

2. The one or more non-transitory computer-readable storage media of claim 1, wherein the vocabulary of common user actions comprises actions selected by a trained machine learning model.

3. The one or more non-transitory computer-readable storage media of claim 2, wherein the actions selected by the trained machine learning model are validated based on a determination that the actions are similar to previously detected actions.

4. The one or more non-transitory computer-readable storage media of claim 3, wherein the actions selected by the trained machine learning model are summarized by the LLM.

5. The one or more non-transitory computer-readable storage media of claim 4, wherein the trained machine learning model is trained with a training data set comprising an additional set of actions summarized by the LLM.

6. The one or more non-transitory computer-readable storage media of claim 1, wherein the vocabulary of common user actions comprises second actions, and wherein the one or more sequences of instructions, when executed using the one or more processors, cause the one or more processors to execute:

retrieving, from digital data storage, a second prompt text and structured event data representing discrete user events of an event stream;

programmatically calling the LLM and providing a second engineered prompt comprising the second prompt text and the structured event data;

receiving a response to the second engineered prompt from the LLM, the response comprising the vocabulary of common user actions and a summary of the vocabulary; and storing the vocabulary and summary in digital data storage.

7. The one or more non-transitory computer-readable storage media of claim 6, wherein the program comprises a browser extension.

8. The one or more non-transitory computer-readable storage media of claim 7, wherein the browser extension is configured to monitor and record an execution of the second actions on the web service and store the second actions in digital data storage.

9. The one or more non-transitory computer-readable storage media of claim 1, wherein the one or more sequences of instructions, when executed using the one or more processors, cause the one or more processors to execute:

inspecting the vocabulary of common user actions;

identifying frequently performed groups of actions in the vocabulary of common user actions; and storing a selected group of actions from the frequently performed groups of actions as a workstream.

10. The one or more non-transitory computer-readable storage media of claim 9, wherein storing a selected group of actions further comprises:

prompting a user to confirm the workstream; and storing the workstream in response to receiving user confirmation.

11. The one or more non-transitory computer-readable storage media of claim 9, wherein identifying frequently performed groups of actions comprises comparing a number of times an action has been performed to a threshold value.

12. The one or more non-transitory computer-readable storage media of claim 9, further comprising:

detecting, by the program, an additional navigation to the web service; and displaying, by the program, a visual list of one or more workstreams corresponding to the web service.

13. The one or more non-transitory computer-readable storage media of claim 12, further comprising:

executing a displayed workstream in the visual list of one or more workstreams by executing the selected group of actions grouped in the workstream.

14. A computer-implemented method, comprising:

detecting, by a program hosted on an agent computer, a change to a new or different browser tab associated with a navigation to a web service;

in response to detecting the change, extracting, by a workflow automation computer communicatively coupled to one or more internetworks and capable of network communication with the program hosted on an agent computer, web service data from the web service;

retrieving, by the workflow automation computer, prompt text for a large language model (LLM) and a first list of actions from a vocabulary of common user actions;

calling, by the workflow automation computer, the LLM with an engineered prompt comprising prompt text, the first list of actions, and the web service data;

receiving by the workflow automation computer, a response to the engineered prompt from the LLM, the response comprising a second list of actions; and executing, by the program, instructions to the web service to execute each action in the second list of actions.

15. The computer-implemented method of claim 14, wherein the vocabulary of common user actions comprises actions selected by a trained machine learning model.

16. The computer-implemented method of claim 15, wherein the actions selected by the trained machine learning model are validated based on a determination that the actions are similar to previously detected actions.

17. The computer-implemented method of claim 16, wherein the actions selected by the trained machine learning model are summarized by the LLM.

18. The computer-implemented method of claim 17, wherein the trained machine learning model is trained with a training data set comprising an additional set of actions summarized by the LLM.

19. The computer-implemented method of claim 14, further comprising:

retrieving, from digital data storage, a second prompt text for a second prompt to the LLM and structured event data representing discrete user events of an event stream;

programmatically calling the LLM and providing a second engineered prompt comprising the prompt text and the structured event data;

receiving a response to the engineered prompt from the LLM, the response comprising the vocabulary of common user actions and a summary of the vocabulary; and storing the vocabulary and summary in digital data storage.

20. The computer-implemented method of claim 14, further comprising:

inspecting, by the workflow automation computer, the vocabulary of common user actions;

identifying, by the workflow automation computer, frequently performed groups of actions in the vocabulary of common user actions; and storing, by the workflow automation computer, a selected group of actions from the frequently performed groups of actions as a workstream.

21. The computer-implemented method of claim 20, wherein storing a selected group of actions further comprises:

prompting a user to confirm the workstream; and storing the workstream in response to receiving user confirmation.

22. The computer-implemented method of claim 20, wherein identifying frequently performed groups of actions comprises comparing a number of times an action has been performed to a threshold value.

23. The computer-implemented method of claim 20, further comprising:

detecting, by the program, an additional navigation to the web service; and displaying, by the program, a visual list of one or more workstreams corresponding to the web service.

24. The computer-implemented method of claim 23, further comprising:

executing a displayed workstream in the visual list of one or more workstreams by executing the selected group of actions grouped in the workstream.

* * * * *